(12) United States Patent
Limberg

(10) Patent No.: US 9,124,396 B2
(45) Date of Patent: Sep. 1, 2015

(54) COFDM DIGITAL TELEVISION RECEIVERS FOR ITERATIVE-DIVERSITY RECEPTION

(76) Inventor: Allen LeRoy Limberg, Port Charlotte, FL (US)

(*) Notice: Subject to any disclaimer, the term of this patent is extended or adjusted under 35 U.S.C. 154(b) by 427 days.

(21) Appl. No.: 13/615,697

(22) Filed: Sep. 14, 2012

(65) Prior Publication Data
US 2013/0028271 A1 Jan. 31, 2013

Related U.S. Application Data

(63) Continuation-in-part of application No. 13/524,614, filed on Jun. 15, 2012.

(60) Provisional application No. 61/574,138, filed on Jul. 28, 2011, provisional application No. 61/574,640, filed on Aug. 6, 2011, provisional application No. 61/575,179, filed on Aug. 16, 2011, provisional application No. 61/626,437, filed on Sep. 27, 2011, provisional application No. 61/627,495, filed on Oct. 13, 2011, provisional application No. 61/628,832, filed on Nov. 7, 2011, provisional application No. 61/685,020, filed on Mar. 10, 2012, provisional application No. 61/631,180, filed on Dec. 28, 2011.

(51) Int. Cl.
| | |
|---|---|
| H04J 13/00 | (2011.01) |
| H04N 7/12 | (2006.01) |
| H04N 11/02 | (2006.01) |
| H04N 11/04 | (2006.01) |
| H04L 1/00 | (2006.01) |
| H04L 25/00 | (2006.01) |
| H04N 21/438 | (2011.01) |
| H04N 21/61 | (2011.01) |
| H04N 21/643 | (2011.01) |
| H04L 25/03 | (2006.01) |
| H04L 27/26 | (2006.01) |

(52) U.S. Cl.
CPC .............. *H04L 1/005* (2013.01); *H04L 1/0057* (2013.01); *H04L 1/0066* (2013.01); *H04L 1/0071* (2013.01); *H04L 25/00* (2013.01); *H04N 21/4382* (2013.01); *H04N 21/6112* (2013.01); *H04N 21/6131* (2013.01); *H04N 21/64322* (2013.01); *H04L 25/03203* (2013.01); *H04L 25/03318* (2013.01); *H04L 27/2647* (2013.01); *H04L 2001/0093* (2013.01)

(58) Field of Classification Search
None
See application file for complete search history.

(56) References Cited

U.S. PATENT DOCUMENTS

| | | | | |
|---|---|---|---|---|
| 6,130,922 | A * | 10/2000 | Stott et al. | 375/344 |
| 6,240,146 | B1 * | 5/2001 | Stott et al. | 375/344 |
| 6,320,917 | B1 * | 11/2001 | Stott et al. | 375/344 |
| 6,483,553 | B1 * | 11/2002 | Jung | 348/731 |
| 7,388,922 | B2 * | 6/2008 | Yamagata | 375/260 |
| 2002/0051501 | A1 * | 5/2002 | Demjanenko et al. | 375/298 |
| 2002/0186797 | A1 * | 12/2002 | Robinson | 375/341 |

(Continued)

*Primary Examiner* — Chirag Shah
*Assistant Examiner* — Suk Jin Kang

(57) ABSTRACT

Receivers with capability for iterative-diversity reception of COFDM digital television transmissions of repeated similarly coded data are described. Also described are receivers with capabilities for receiving COFDM digital television transmissions in which earlier transmissions of coded data are later followed by subsequent transmissions of the same data differently coded. The receivers use maximal-ratio code combining techniques for repeated components in the COFDM digital television transmissions. The receivers use turbo decoding techniques for concatenated coding of data in the COFDM digital television transmissions.

19 Claims, 37 Drawing Sheets

(56) References Cited

U.S. PATENT DOCUMENTS

| | | |
|---|---|---|
| 2003/0138060 A1* | 7/2003 | Alcouffe ................... 375/324 |
| 2003/0156654 A1* | 8/2003 | Blat ........................... 375/260 |
| 2003/0210749 A1* | 11/2003 | Asjadi ........................ 375/260 |
| 2004/0101046 A1* | 5/2004 | Yang et al. ............. 375/240.08 |
| 2004/0156450 A1* | 8/2004 | Auranen et al. ............ 375/324 |
| 2005/0213680 A1* | 9/2005 | Atungsiri et al. ........... 375/260 |
| 2006/0088111 A1* | 4/2006 | Ye et al. ..................... 375/260 |
| 2007/0183514 A1* | 8/2007 | Iancu et al. ................ 375/260 |
| 2007/0206687 A1* | 9/2007 | Ananth et al. .............. 375/260 |
| 2008/0025424 A1* | 1/2008 | Yang et al. ................. 375/260 |
| 2008/0052753 A1* | 2/2008 | Huang et al. ............... 725/151 |
| 2008/0212711 A1* | 9/2008 | Auranen et al. ............ 375/295 |
| 2008/0239940 A1* | 10/2008 | Ye et al. ..................... 370/207 |
| 2009/0161773 A1* | 6/2009 | Rajagopal ................... 375/260 |
| 2010/0040092 A1* | 2/2010 | Chang ........................ 370/516 |
| 2010/0079678 A1* | 4/2010 | Chang ........................ 348/726 |
| 2012/0224651 A1* | 9/2012 | Murakami et al. .......... 375/295 |
| 2012/0300877 A1* | 11/2012 | Murakami et al. .......... 375/296 |

* cited by examiner

Fig. 5 First Embodiment of Encoder for One-third-code-rate PCCC

Fig. 6  Second Embodiment of Encoder for One-third-code-rate PCCC

Fig. 7  Third Embodiment of Encoder for One-third-code-rate PCCC

Fig. 36  Method of Turbo Decoding with Receiver Apparatus Modified per Figures 34 & 35

COFDM DIGITAL TELEVISION RECEIVERS FOR ITERATIVE-DIVERSITY RECEPTION

This application is a continuation-in-part of U.S. patent application Ser. No. 13/524,614 filed on 15 Jun. 2012 and amended to claim the benefit of the filing dates of provisional U.S. Pat. App. Ser. No. 61/574,138 filed 28 Jul. 2011, of provisional U.S. Pat. App. Ser. No. 61/574,640 filed 6 Aug. 2011, of provisional U.S. Pat. App. Ser. No. 61/575,179 filed 16 Aug. 2011, of provisional U.S. Pat. App. Ser. No. 61/626, 437 filed 27 Sep. 2011, of provisional U.S. Pat. App. Ser. No. 61/627,495 filed 13 Oct. 2011, of provisional U.S. Pat. App. Ser. No. 61/628,832 filed 7 Nov. 2011 and of provisional U.S. Pat. App. Ser. No. 61/685,020 filed 10 Mar. 2012. This application further claims the benefit of the filing dates of provisional U.S. Pat. App. Ser. No. 61/626,437 filed 27 Sep. 2011, of provisional U. S. Pat. App. Ser. No. 61/627,495 filed 13 Oct. 2011 and of provisional U. S. Pat. App. Ser. No. 61/631, 180 filed 28 Dec. 2011.

FIELD OF THE INVENTION

In general, the invention relates to systems of over-the-air broadcasting of digital television (DTV) signals suited for iterative-diversity reception by mobile and handset receivers commonly referred to collectively as "M/H" receivers and by "stationary" receivers that customarily remain at one reception site. Each system employs forward-error-correction (FEC) coding of the DTV signals, which are subsequently transmitted using coded orthogonal frequency-division multiplexing (COFDM) of a plurality of carrier waves. The various aspects of the invention more specifically concern both stationary and M/H receivers for such systems.

BACKGROUND OF THE INVENTION

DTV broadcasting in Europe has employed coded orthogonal frequency-division multiplexing (COFDM) that employs a multiplicity of RF carrier waves closely spaced across each 8-MHz-wide television channel, rather than a single RF carrier wave per television channel. Adjacent carrier waves are orthogonal to each other. Successive multi-bit symbols are selected from a serial data stream and used to modulate respective ones of the multiplicity of RF carrier waves in turn, in accordance with a conventional modulation scheme—such as quaternary phase shift keying (QPSK) or quadrature amplitude modulation (QAM). QPSK is preferably DQPSK, using differential modulation that is inherently insensitive to slowly changing amplitude and phase distortion. DPSK simplifies carrier recovery in the receiver. Customarily, the QAM is either 16QAM or 64QAM using square 2-dimensional modulation constellations. In actual practice, the RF carrier waves are not modulated individually. Rather, a single carrier wave is modulated at high symbol rate using QPSK or QAM. The resulting modulated carrier wave is then transformed in a fast inverse discrete Fourier transform (I-DFT) procedure to generate the multiplicity of RF carrier waves each modulated at low symbol rate.

In Europe, broadcasting to hand-held receivers is done using a system referred to as DVB-H. DVB-H (Digital Video Broadcasting—Handheld) is a digital broadcast standard for the transmission of broadcast content to handheld receivers, published in 2004 by the European Telecommunications Standards Institute (ETSI) and identified as EN 302304. DVB-H, as a transmission standard, specifies the physical layer as well as the elements of the lower protocol layers. It uses a power-saving technique based on the time-multiplexed transmission of different services. The technique, called "time slicing", allows substantial saving of battery power. Time slicing allows soft hand-over as the receiver moves from network cell to network cell. The relatively long power-save periods may be used to search for channels in neighboring radio cells offering the selected service. Accordingly, at the border between two cells, a channel hand-over can be performed that is imperceptible by the user. Both the monitoring of the services in adjacent cells and the reception of the selected service data can utilize the same front-end tuner.

In contrast to other DVB transmission systems, which are based on the DVB Transport Stream adopted from the MPEG-2 standard, the DVB-H system is based on Internet Protocol (IP). The DVB-H baseband interface is an IP interface allowing the DVB-H system to be combined with other IP-based networks. Even so, the MPEG-2 transport stream is still used by the base layer. The IP data are embedded into the transport stream using Multi-Protocol Encapsulation (MPE), an adaptation protocol defined in the DVB Data Broadcast Specification. At the MPE level, DVB-H employs an additional stage of forward error correction called MPE-FEC, which is essentially (255, 191) transverse Reed-Solomon (TRS) coding. The transverse direction is orthogonal to the direction of the "lateral" (204, 188) Reed-Solomon (RS) coding employed both in DVB-H and in DVB-T terrestrial broadcasting to stationary DTV receivers. This TRS coding reduces the S/N requirements for reception by a handheld device by a 7 dB margin compared to DVB-T. The block interleaver used for the TRS coding creates a specific frame structure, referred to as the "MPE-FEC frame" or simply the "FEC frame", for incorporating the incoming data of the DVB-H codec.

The physical radio transmission of DVB-H is performed according to the DVB-T standard and employs OFDM multicarrier modulation. DVB-T employed coded orthogonal frequency division multiplexing (COFDM) in which an 8-MHz-wide radio-frequency (RF) channel comprises somewhat fewer than 2000 or somewhat fewer than 8000 evenly-spaced carriers for transmitting to stationary DTV receivers. DVB-T2, an upgrade of DVB-T proposed in 2011, further permits somewhat fewer than 4000 evenly-spaced carrier waves better to accommodate transmitting to mobile receivers using DVB-H. These three choices as to number of carrier waves are commonly referred to as 2K, 8K and 4K options. DVB-H uses only a fraction (e.g., one quarter) of the digital payload capacity of the RF channel.

COFDM has been considered for DTV broadcasting in the United States of America (US), where 6-MHz-wide, rather than 8-MHz-wide, RF channels are employed for such broadcasting. The 2K, 8K and 4K options are retained in proposals for such DTV broadcasting, with bit rates being scaled back to suit 6-MHz-wide RF channels. COFDM of plural carrier waves may eventually supplant the 8-VSB amplitude-modulated single-carrier-wave system of DTV broadcasting used in the US at the time this specification was written. A driving force behind the adoption of COFDM for DTV broadcasting in the US is apt to be that its performance in single-frequency networks (SFNs) is superior to that of the 8-VSB AM single-carrier-wave system of broadcasting used in the US.

The DVB-T and DVB-H standards for European broadcasting employ Reed-Solomon (RS) coding followed by convolutional coding in the forward-error-correction (FEC) coding of DTV data. Decoding of the convolutional coding is effective in overcoming corruption caused by Johnson noise, which has additive white Gaussian noise (AWGN) characteristics, but occasionally decoding generates a running error. Subsequent RS coding after a byte de-interleave can suppress such running error and can also suppress burst errors in the COFDM demodulation results.

If COFDM is adopted for DTV broadcasting in the US, the convolutional coding used together with Reed-Solomon (RS) coding in the forward-error-correction (FEC) coding of DTV data is apt to be replaced by some form of coding that can be decoded using iterative soft-decision decoding procedures referred to as "turbo" decoding. Such forms of coding are commonly referred to as "turbo coding" and comprise parallel concatenated convolutional coding (PCCC), serial concatenated convolutional coding (SCCC), and product coding composed of concatenated block and convolutional coding. Low-density parity-check (LDPC) codes that are parallel concatenated provide another type of turbo coding that is decoded using iterative soft-decision decoding procedures. The iterative soft-decision decoding procedures used for turbo coding reduce errors in DTV data caused by additive white Gaussian noise (AWGN) significantly better than the decoding of simple convolutional coding can. This permits increasing the number of lattice points in the QAM symbol constellations used to modulate COFDM carriers by a factor of four, which exceeds the factor of 3/2 or 2 by which code rate is reduced by using turbo coding rather than simple convolutional coding. Accordingly, digital payload can be increased by a factor of 2 or 8/3 without sacrificing capability to withstand AWGN. Furthermore, turbo decoding is better able to overcome inter-symbol interference (ISI) than Viterbi decoding of simple convolutional coding can, which allows shortening of the COFDM guard interval and some additional increase in digital payload.

Turbo coding is less susceptible to running errors than simple convolutional coding because the component codes of the turbo coding exhibit temporal diversity between their respective coding algorithms. This phenomenon is referred to as "interleaver gain", and the interleaving between the component codes of the turbo coding can be designed to obtain substantially as much interleaver gain as possible.

COFDM is able to overcome frequency-selective fading quite well, but reception will fail when there is severe flat-spectrum fading. Such flat-spectrum fading is sometimes referred to as a "drop-out" in received signal strength. Such drop-out occurs when the receiving site changes such that a sole effective signal transmission path is blocked by an intervening hill or structure, for example. Because the signaling rate in the individual OFDM carriers is very low, COFDM receivers are capable of maintaining reception despite drop-outs that are only a fraction of a second in duration. However, drop-outs that last as long as a few seconds disrupt television reception perceptibly. Such protracted drop-outs are encountered in a vehicular receiver when the vehicle passes through a tunnel, for example. By way of further example of a protracted drop-out in reception, a stationary DTV receiver may briefly discontinue COFDM reception when receiver synchronization is momentarily lost during dynamic multipath reception conditions, such as caused by aircraft flying over the reception site.

The ATSC standard directed to broadcasting digital television and digital data to M/H receivers used TRS coding that extended over eighty dispersed-in-time short time-slot intervals, rather than being confined to a single longer time-slot interval. A principal purpose of the TRS coding that extended over eighty time-slot intervals was overcoming occasional protracted drop-outs in received signal strength. Confining TRS coding to a single longer time-slot interval as done in DVB-H is advantageous, however, in that error-correction is completed within a shorter time. This helps speed up changes in RF-channel tuning, for example.

Iterative-diversity transmissions were proposed to ATSC to facilitate alternative or additional techniques for dealing with flat-spectrum fading of 8-VSB signals. Some of these proposals were directed to separate procedures being used for decoding earlier and later transmissions of the same coded data to generate respective sets of data packets, each identified after such decoding either as being probably correct or probably incorrect. Corresponding data packets from the two sets were compared, and a further set of data packets was chosen from the ones of the compared data packets more likely to be correct. A. L. R. Limberg proposed delaying earlier transmissions of concatenated convolutionally coded (CCC) data so as to be concurrently available with later transmissions of similar CCC data, then decoding the contemporaneous CCC data with respective turbo decoders that exchanged information concerning soft data bits to secure coding gain. These various iterative-diversity transmission techniques, although comparatively robust in regard to overcoming additive White Gaussian noise (AWGN), halve available digital payload.

The parallel iterative operation of two turbo decoders consumes more power than is desirable, particularly in battery-powered receivers. Maximal-ratio code combining is a technique that has been used for combining similar transmissions from a plurality of transmitters in multiple-input/multiple-output (MIMO) networks. Searching for a way to avoid parallel iterative operation of two turbo decoders, A. L. R. Limberg considered the use of maximal-ratio code combining of later transmissions of CCC with earlier similar CCC transmissions from the same 8-VSB transmitter. The hope was that a combined signal would be generated that could be decoded by iterative operation of a single turbo decoder. One problem encountered when trying to implement such an approach is that the coding of M/H-service data is not independent of the coding of main-service data in 8-VSB broadcasting per the ATSC standard. The inner convolutional coding of the M/H signal is part of a one-half-rate convolutional coding that intersperses main-service signal components with M/H-service signal components. Accordingly, practically considered, the inner convolutional coding of the later transmissions of CCC and the inner convolutional coding of the delayed earlier transmissions of CCC still have to be decoded separately. The outer convolutional coding of the M/H signal is affected by the pre-coding of the most-significant bits of 8-VSB symbols responding to main-service data interspersed among the most-significant bits of 8-VSB symbols responding to M/H-service data. There are also some problems with measuring the energies of the later transmissions of CCC and the delayed earlier transmissions of CCC to provide the information needed for weighting these transmissions for maximal-ratio code combining.

In a replacement system for DTV broadcasting in the United States of America that uses COFDM of a plurality of carrier waves, the FEC coding of main-service data and the FEC coding of M/H-service data can be kept independent of each other. Also, the inclusion of unmodulated carrier waves among the COFDM carrier waves facilitates measurements of their total root-mean-square (RMS) energy in later transmissions and in earlier transmissions of similar data to provide the information needed to weight later and delayed earlier transmissions appropriately for maximal-ratio code combining.

The reduction in overall code rate that results from repeating COFDM transmissions for iterative-diversity reception can be counteracted by increasing the size of the symbol constellations associated with quadrature amplitude modulation (QAM) of the plural carriers. Increasing the size of the QAM symbol constellations tends to reduce the capability of DTV receivers to decode COFDM transmissions received over the air when accompanied by additive white Gaussian noise (AWGN). FEC coding of data bits is used to facilitate DTV receivers being better able to decode COFDM transmissions accompanied by AWGN. Various types of FEC coding are particularly effective for enabling DTV receivers to overcome AWGN by using iterative decoding procedures called "turbo decoding" because of a fancied resemblance to turbocharging in automobile engines. The various types of FEC coding that can use turbo decoding procedures are collectively referred to as "turbo coding" in this specification, although the term was originally applied specifically to what is now called parallel concatenated convolutional coding (PCCC). By way of specific examples, turbo decoding procedures are also applicable to serial concatenated convolutional coding (SCCC), to product coding and to parallel concatenated low-density parity-check (LDPC) coding.

Iterative-diversity reception implemented at the transfer-stream (TS) data-packet level does not require as much delay memory for the earlier transmitted data as delaying complete earlier transmissions to be concurrent with later transmissions of the same data. This is because the redundant parity bits associated with FEC coding contained in those complete earlier transmissions is removed during its decoding and so do not need to be delayed. However, implementation of diversity reception at the TS data-packet level sacrifices the substantial coding gain that can be achieved by decoding delayed earlier transmissions concurrently with later transmissions of similar data and interchanging preliminary decoding results between the concurrent decoding procedures. Implementation of diversity reception at the TS data-packet level is also incompatible with code-combining of delayed earlier transmissions and later transmissions of similar data being used to improve signal-to-noise ratio (SNR).

European engineers have updated the COFDM transmissions used in DVB-H standard for European broadcasting so as to support a form of iterative-diversity reception. The orthogonal coordinates of lattice points in 16QAM symbol constellations are rotated so the imaginary-axis coordinates duplicate the real-axis coordinates. Then the imaginary-axis coordinates of successive 16QAM symbol constellations are delayed a prescribed period of time respective to their real-axis coordinates to provide iterative diversity between the two sets of coordinates. The rotation of the axes of the orthogonal coordinates decreases by a factor of four the spacing between lattice-point coordinates along each axis. It is observed here that it is preferable to repeat 256QAM symbol constellations without rotation, rather than using rotated 16QAM symbol constellations. The spacing between lattice-point coordinates along each axis is reduced by a factor of four by going from 16QAM symbol constellations to 256QAM symbol constellations, too. The duplication of the 256QAM symbol constellations halves their digital payload. However, sixteen times as many lattice points are available in each 256QAM symbol constellation as in each 16QAM symbol constellation. So, overall, a pair of the repeated 256 QAM symbol constellations provides eight times the digital payload of the rotated 16QAM symbol constellation of same duration as each of the 256 QAM symbol constellations. This eight times larger digital payload can support more forward-error-correction (FEC) coding, if such be desired.

SUMMARY OF THE INVENTION

Various aspects of the invention are embodied in COFDM digital television receivers with capability for iterative-diversity reception of signals that employ concatenated coding, that transmit the same outer-coded data bits twice, and that use inner coding of the outer-coded data bits that supports turbo decoding thereof. The outer coding may be two-dimensional cross-interleaved Reed Solomon coding (CIRC) or one-dimensional Reed-Solomon (RS) coding, by way of specific examples.

BRIEF DESCRIPTION OF THE DRAWING FIGURES

FIGS. 1 and 2 combine to provide a schematic diagram of a portion of a COFDM transmitter for transmitting turbo-coded Reed-Solomon codewords to be received by stationary DTV receivers.

FIGS. 3 and 4 combine to provide a schematic diagram of a portion of a COFDM transmitter for transmitting turbo-coded Reed-Solomon codewords to be received by mobile and handheld DTV receivers.

FIGS. 5, 6 and 7 are schematic diagrams each depicting a respective encoder for one-third-code-rate PCCC that can be used in either of the portions of a COFDM transmitter depicted in FIGS. 2 and 4, which respective encoder is novel in construction and operation.

FIGS. 8 and 9 combine to provide a schematic diagram of a portion of a COFDM transmitter for transmitting pairs of one-half-code-rate convolutional-coded Reed-Solomon codewords for iterative-diversity reception by stationary DTV receivers.

Figure 13:
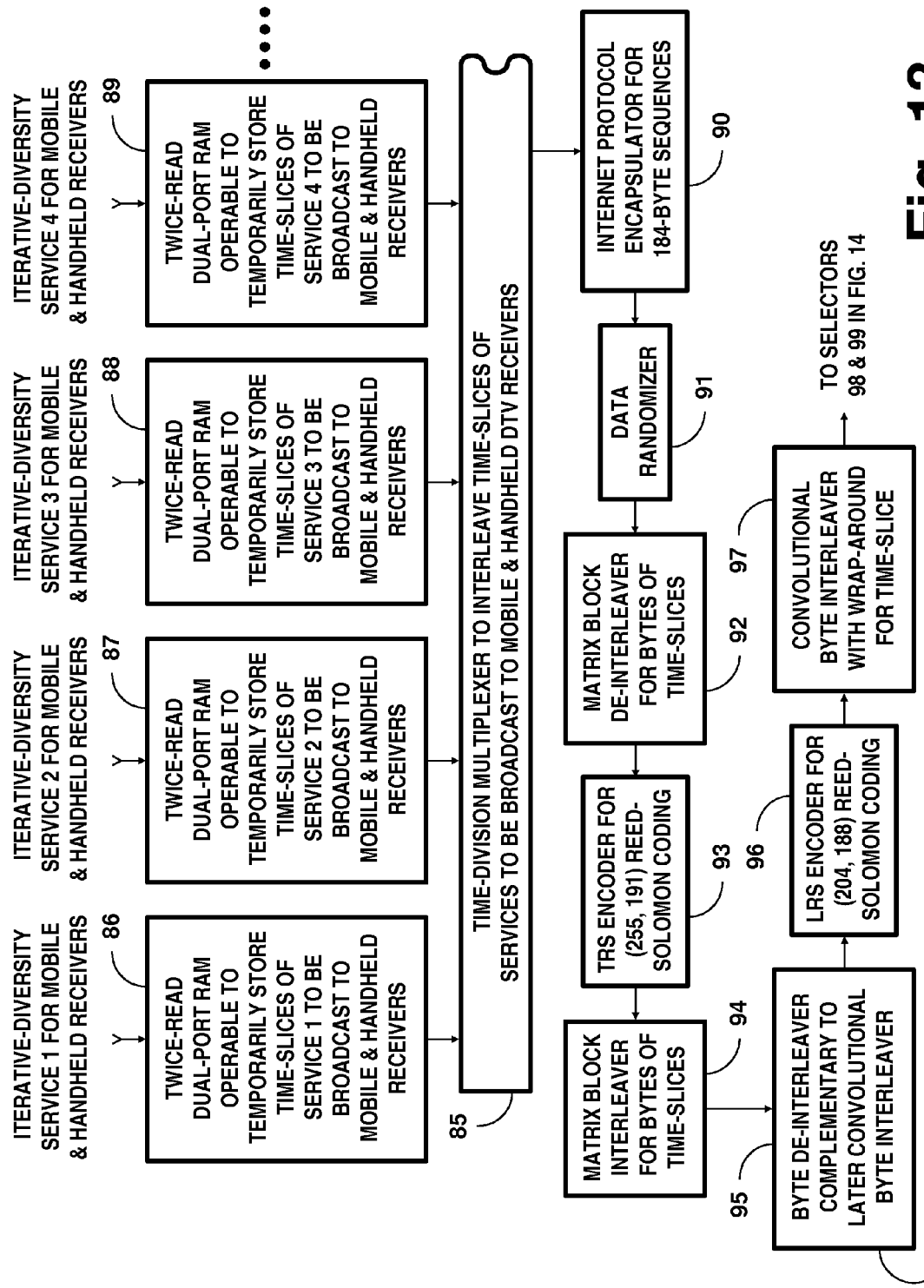
Figure 14:
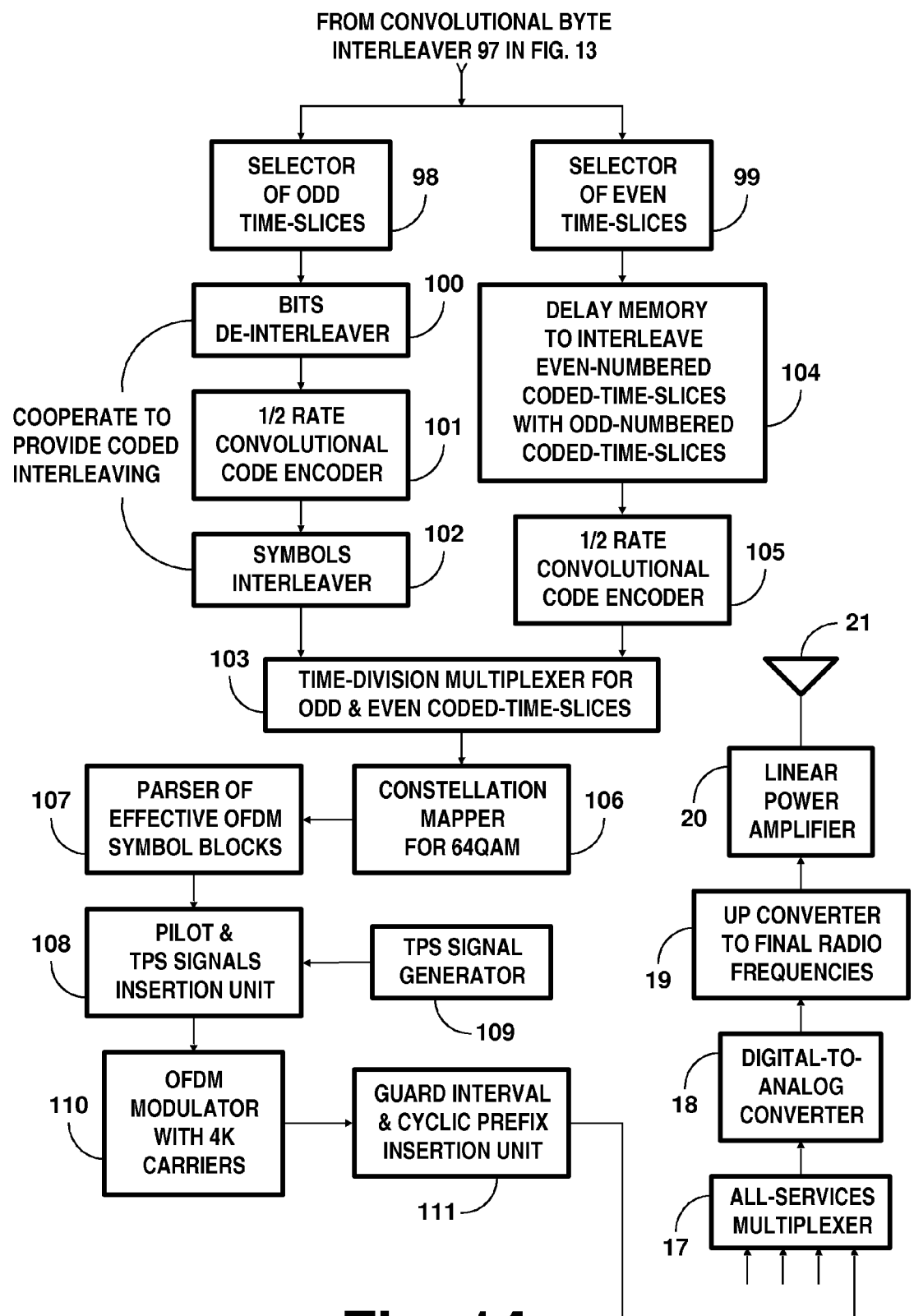

FIGS. 13 and 14 combine to provide a schematic diagram of a portion of a COFDM transmitter for transmitting pairs of one-half-code-rate convolutional-coded Reed-Solomon codewords for iterative-diversity reception by mobile and handheld DTV receivers.

Figure 15:
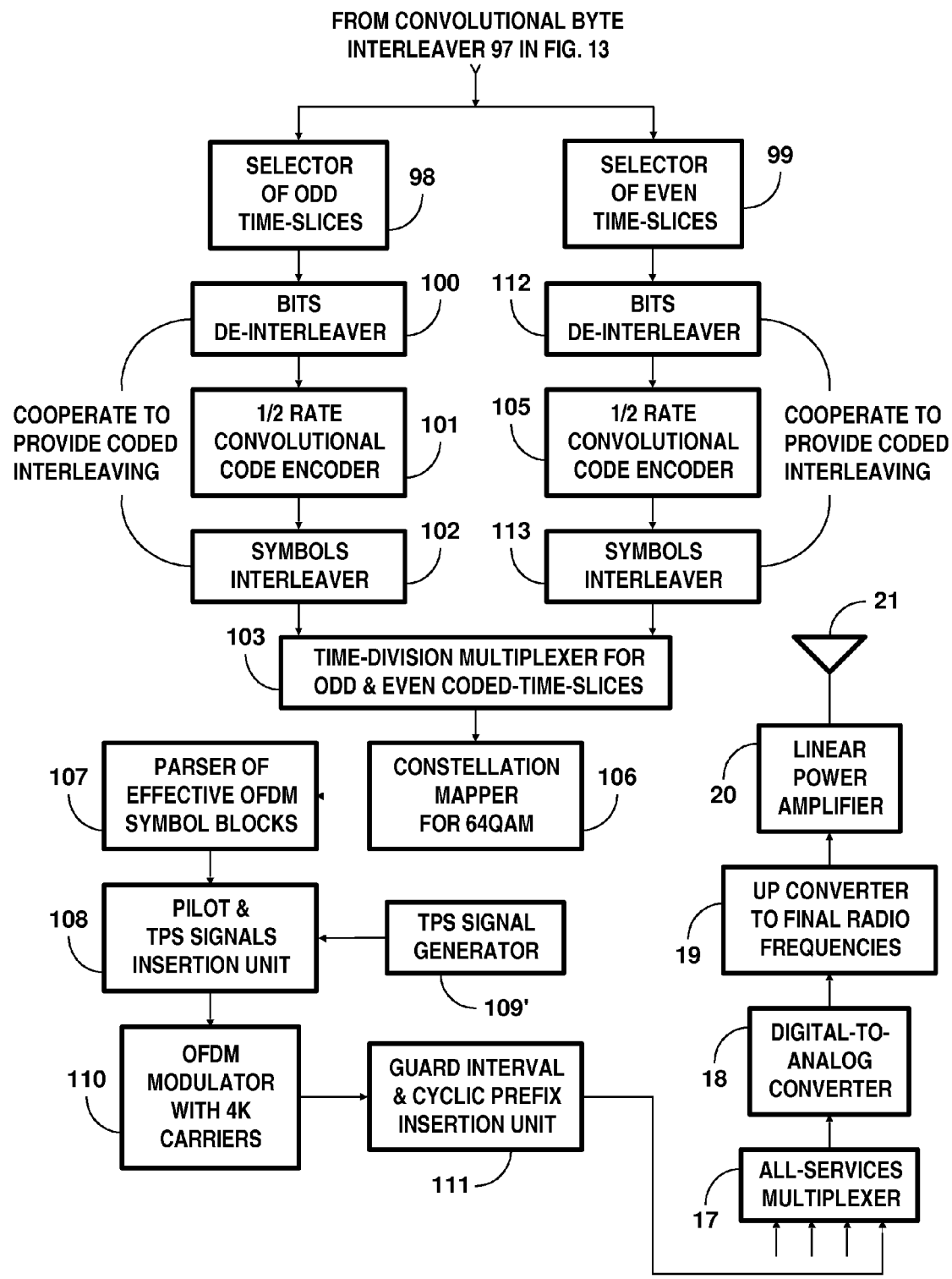

FIG. 15 is a schematic diagram of a modification of the FIG. 14 portion of a COFDM transmitter for a DTV system, in which both one-half-code-rate convolutional-coded Reed-Solomon codewords transmitted for iterative-diversity reception employ coded bit interleaving.

Figure 16:
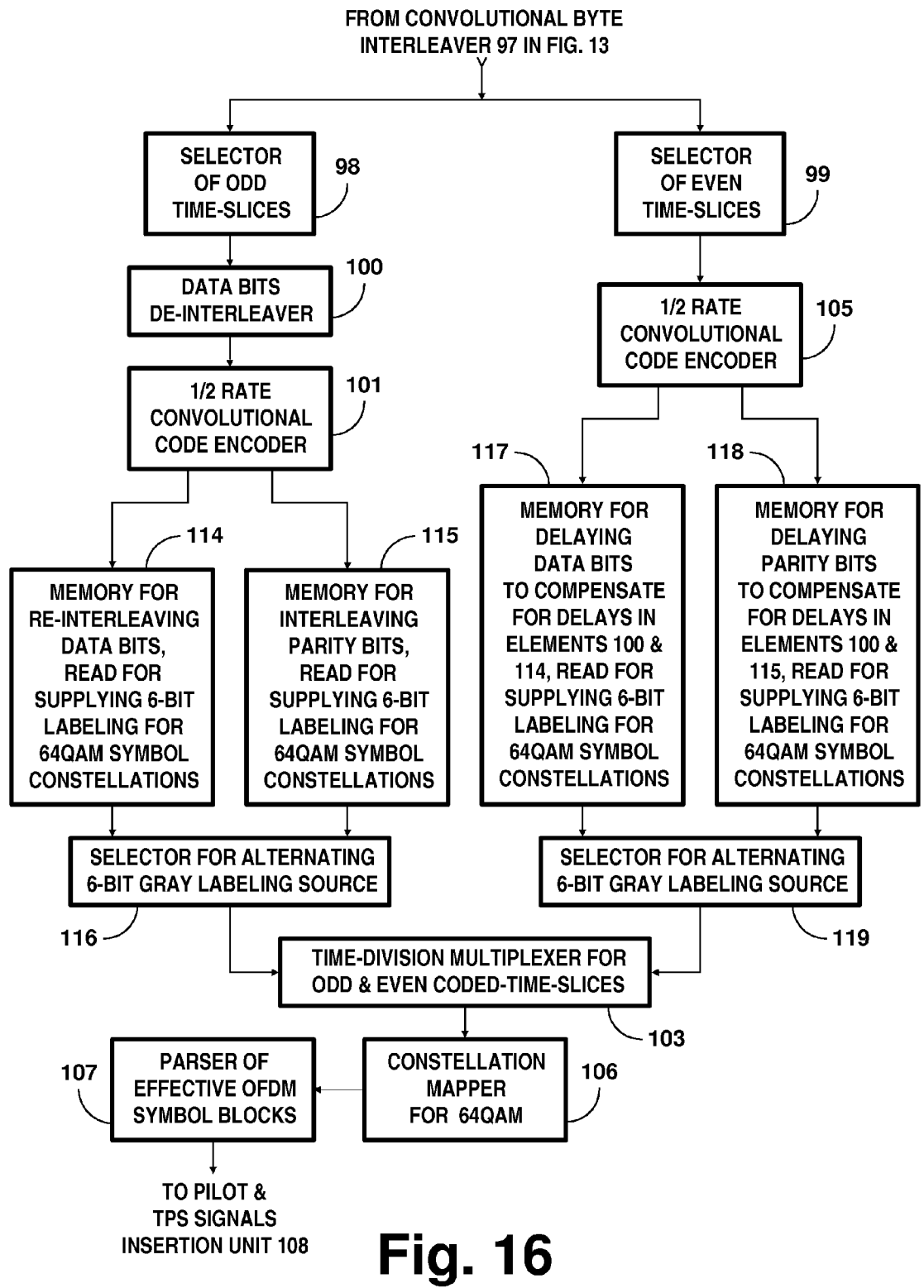

FIG. 16 is a schematic diagram of a modification of the FIG. 14 portion of a COFDM transmitter for a DTV system, in which the data bits of the one-half-code-rate convolutional-coded Reed-Solomon codewords are mapped into different QAM symbol constellations than the parity bits are for modulating COFDM carriers.

Figure 17:
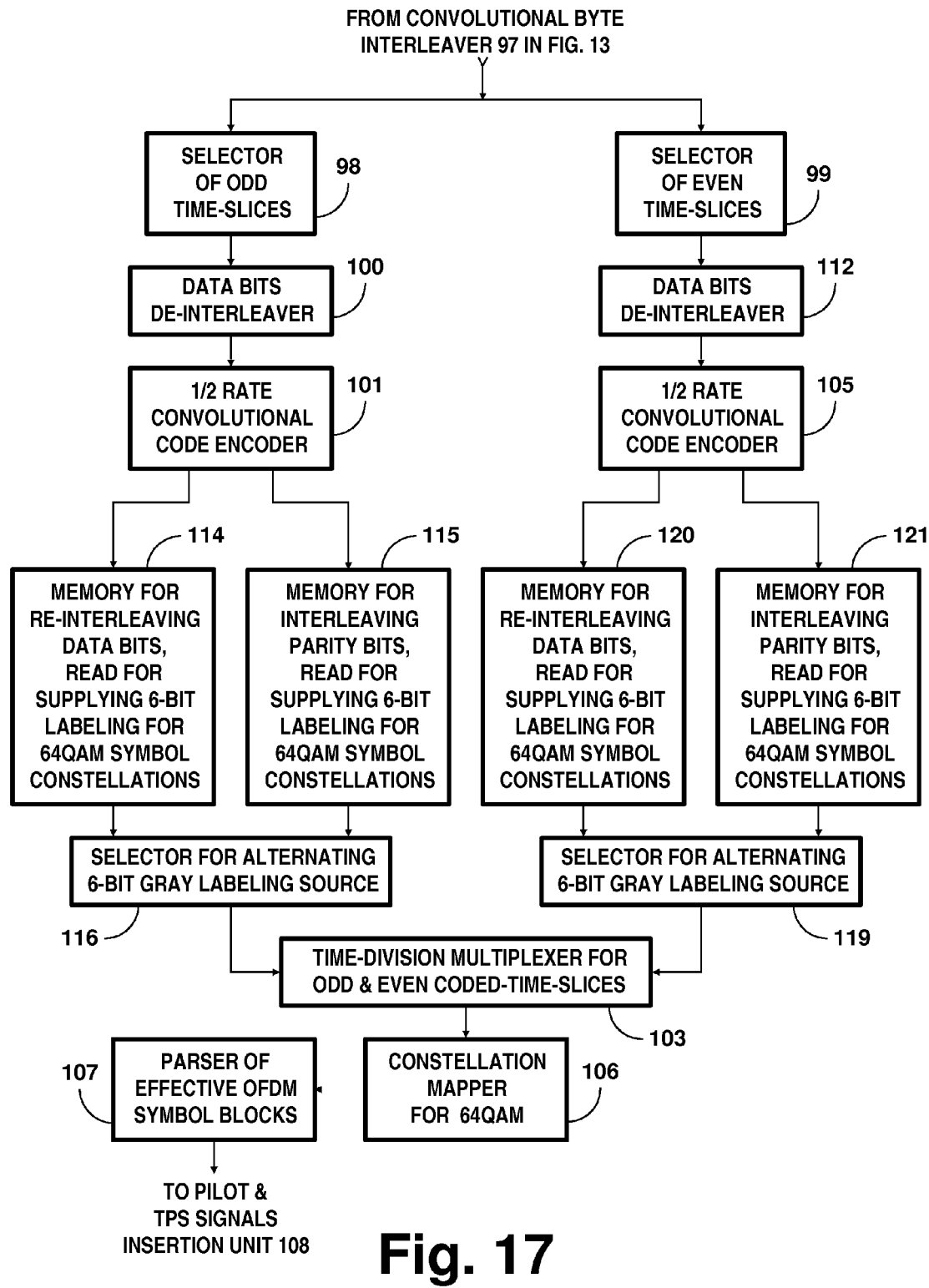

FIG. 17 is a schematic diagram of a modification of the FIG. 15 portion of a COFDM transmitter for a DTV system, in which the data bits of the one-half-code-rate convolutional-coded Reed-Solomon codewords are mapped into different QAM symbol constellations than the parity bits are for modulating COFDM carriers.

Figure 18:
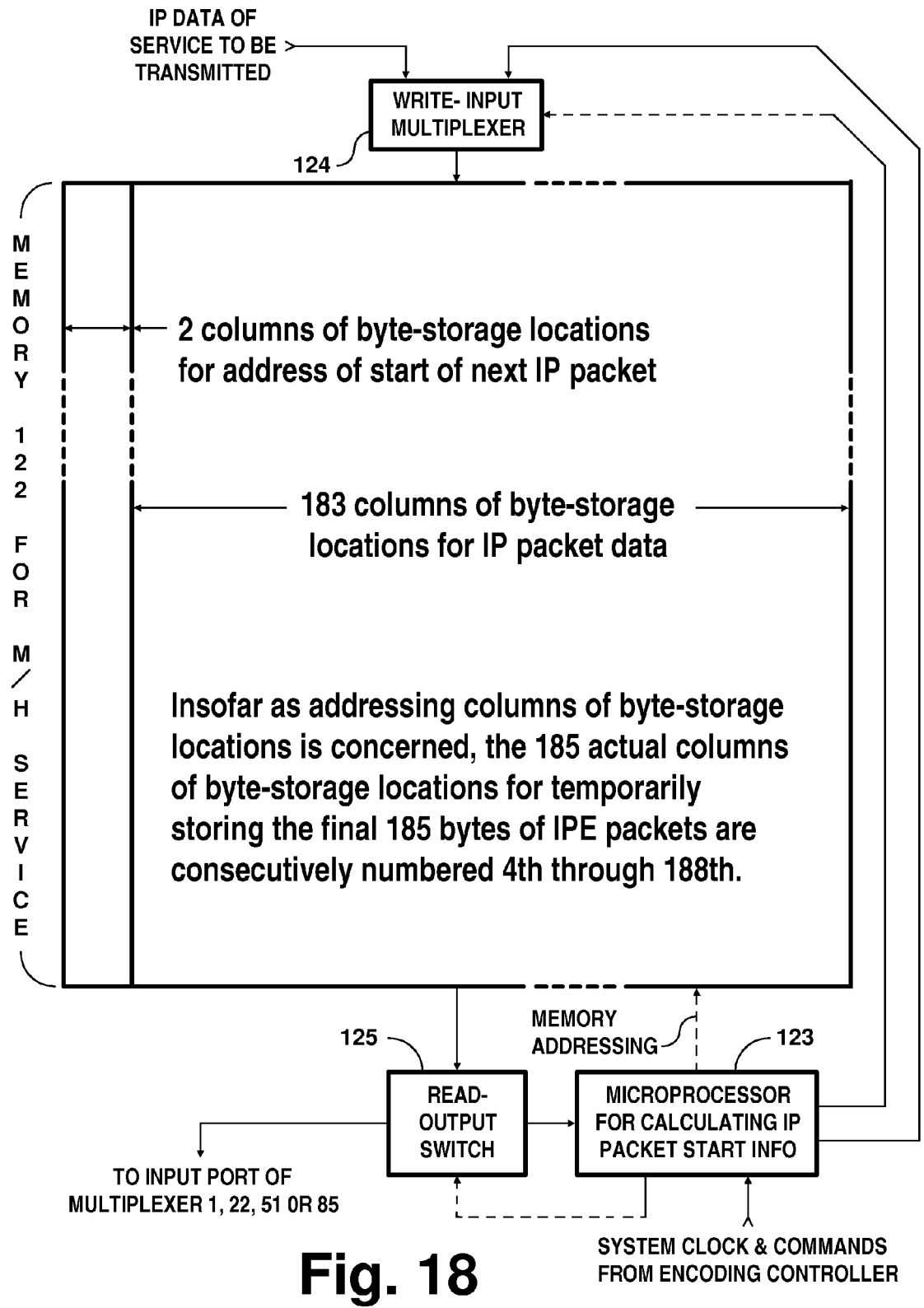

FIG. 18 is a schematic diagram showing in more detail the connections of each of the data-storage memories in FIGS. 1, 3, 8 and 13 with a respective microprocessor for calculating the addresses of byte-storage locations in the data-storage memory that store the initial bytes of IP packets.

Figure 19:
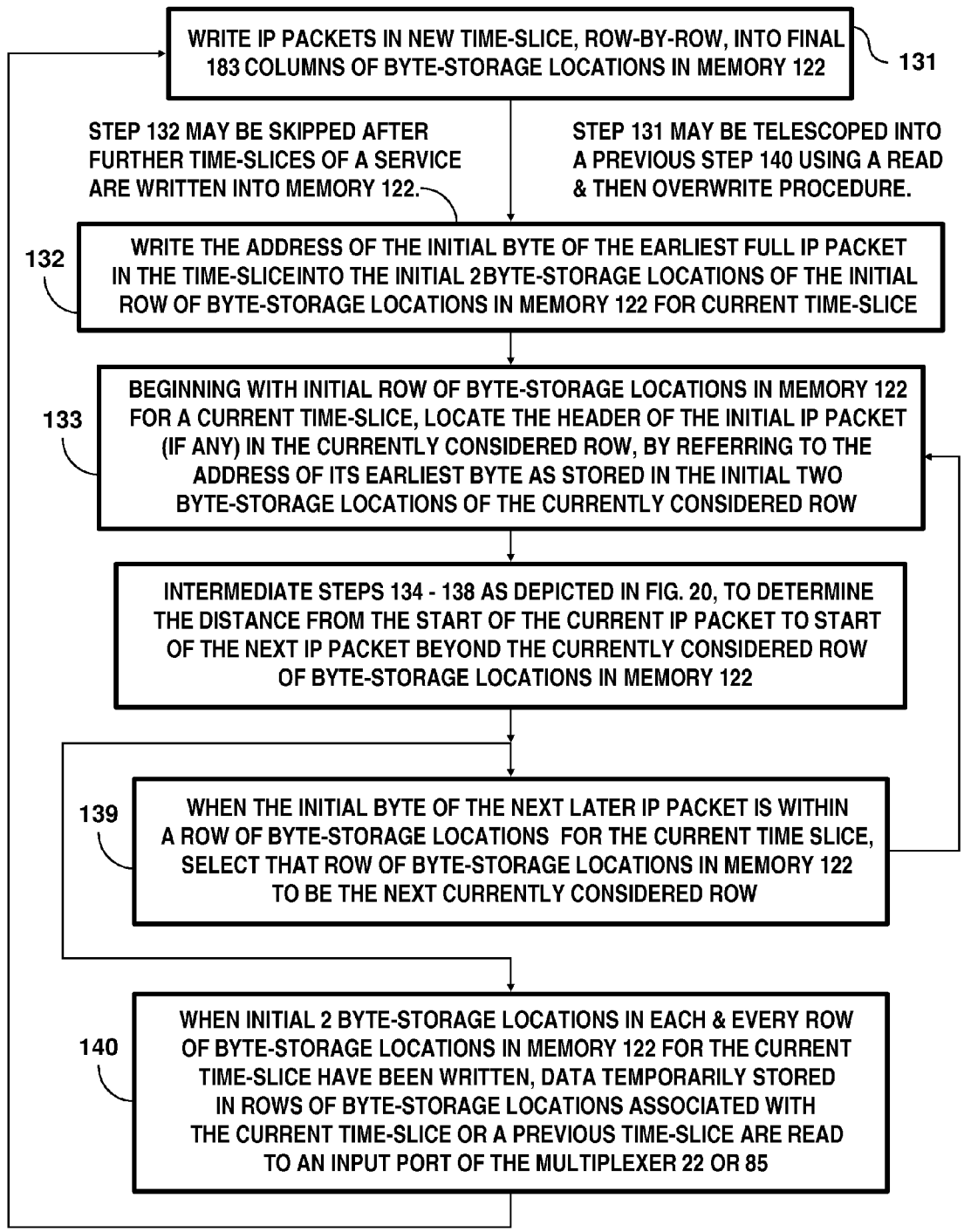
Figure 20:
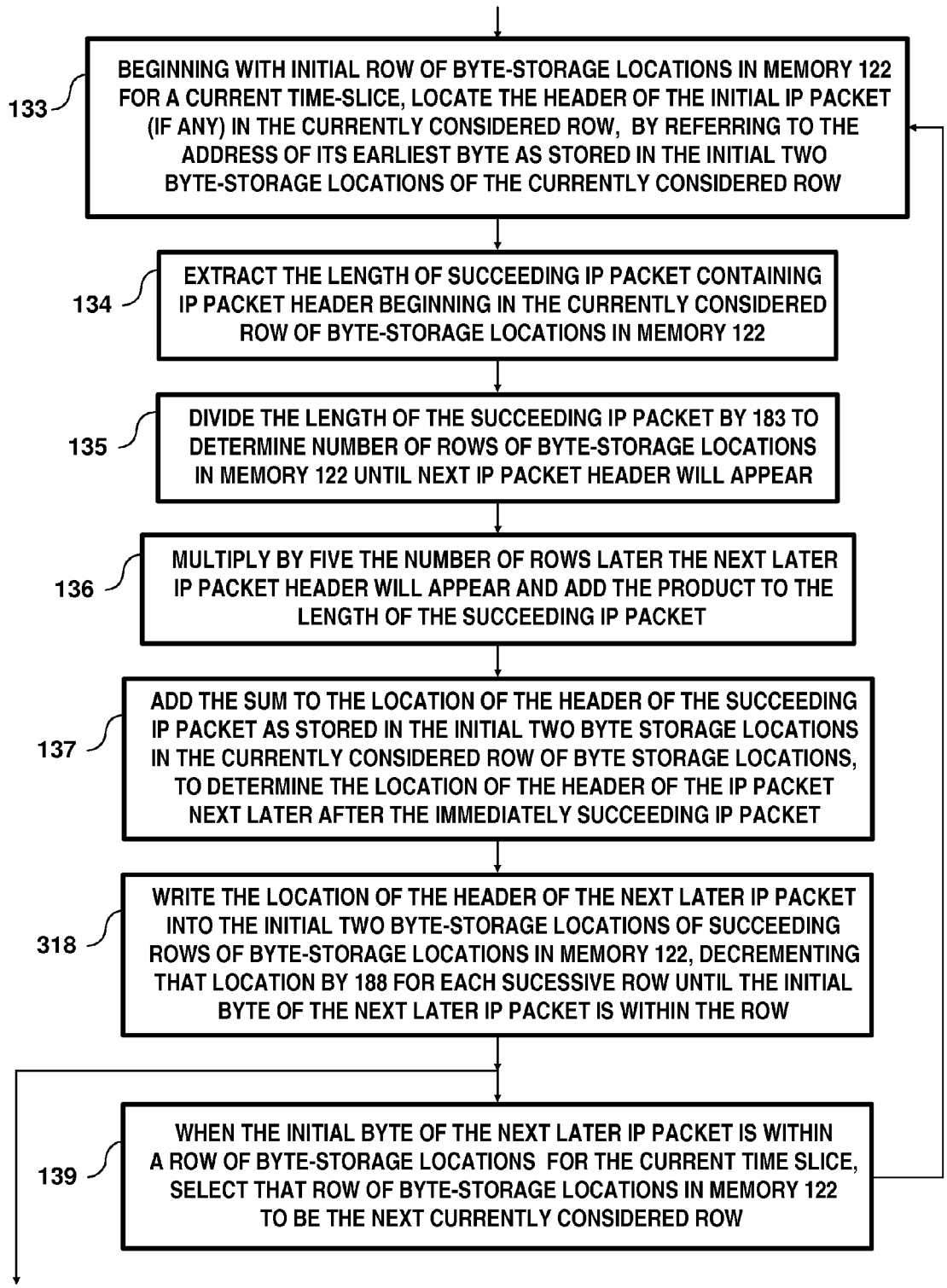

FIGS. 19 and 20 combine to provide an informal flow chart of the operations of the microprocessor depicted in FIG. 18.

FIGS. 21, 22, 23 and 24 combine to provide a schematic diagram of a DTV receiver capable of iterative-diversity reception of COFDM signals that convey repeated PCCC transmissions.

Figure 23:
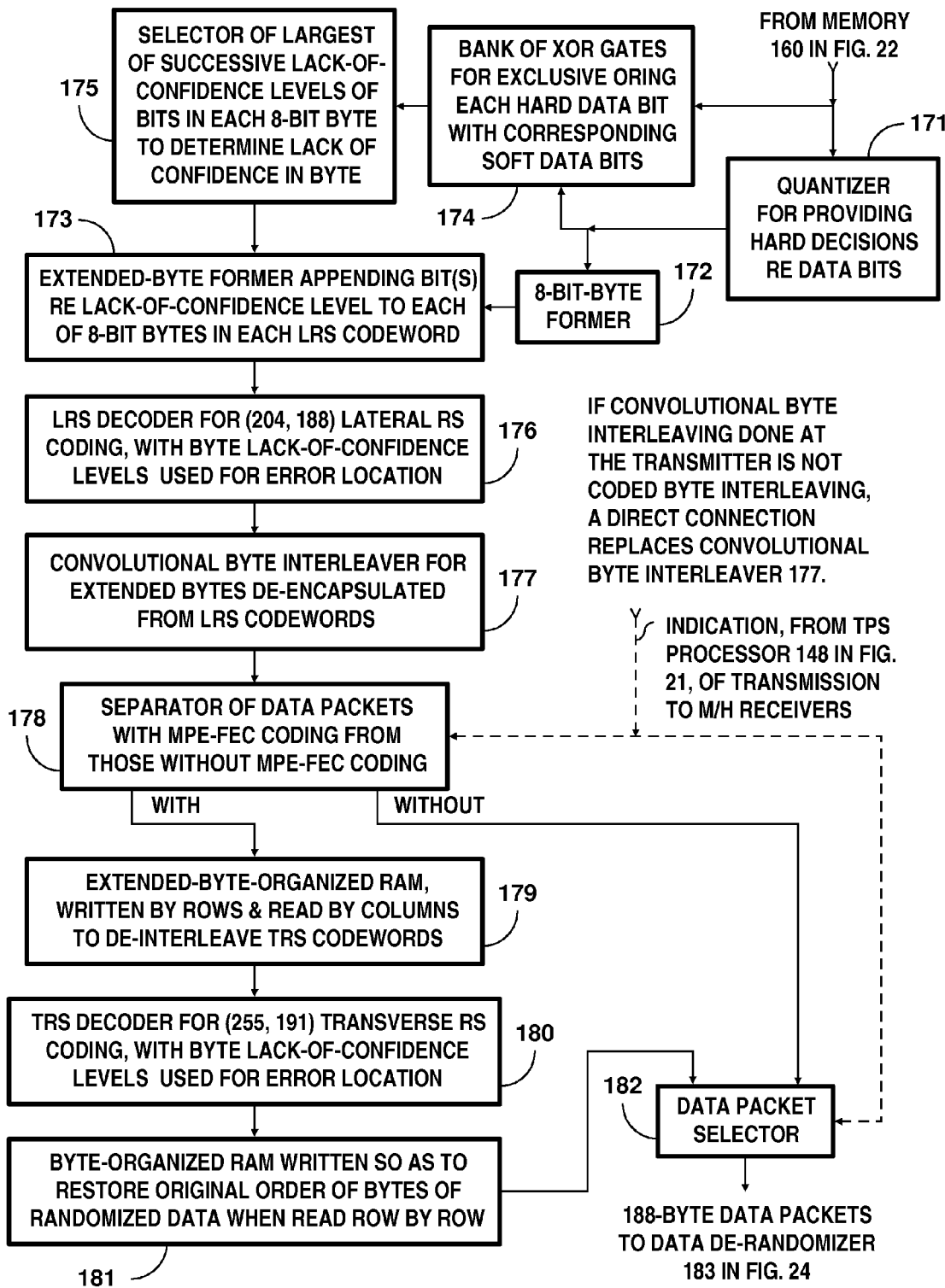
Figure 25:
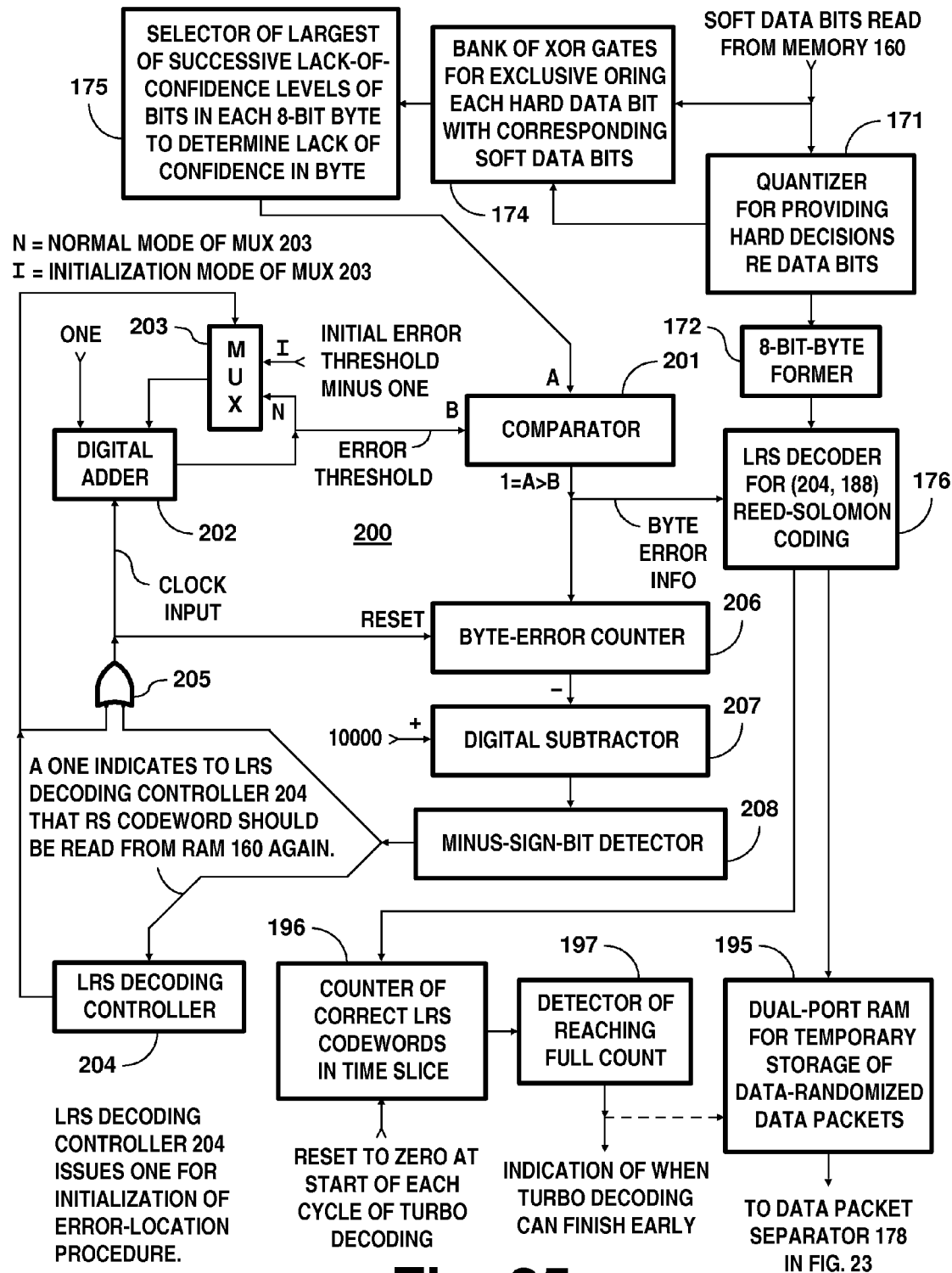

FIG. 25 is a schematic diagram showing in greater detail the adaptive threshold detector used to locate byte errors for decoding (204, 188) Reed-Solomon coding in the FIG. 23 portion of a DTV receiver.

Figure 26:
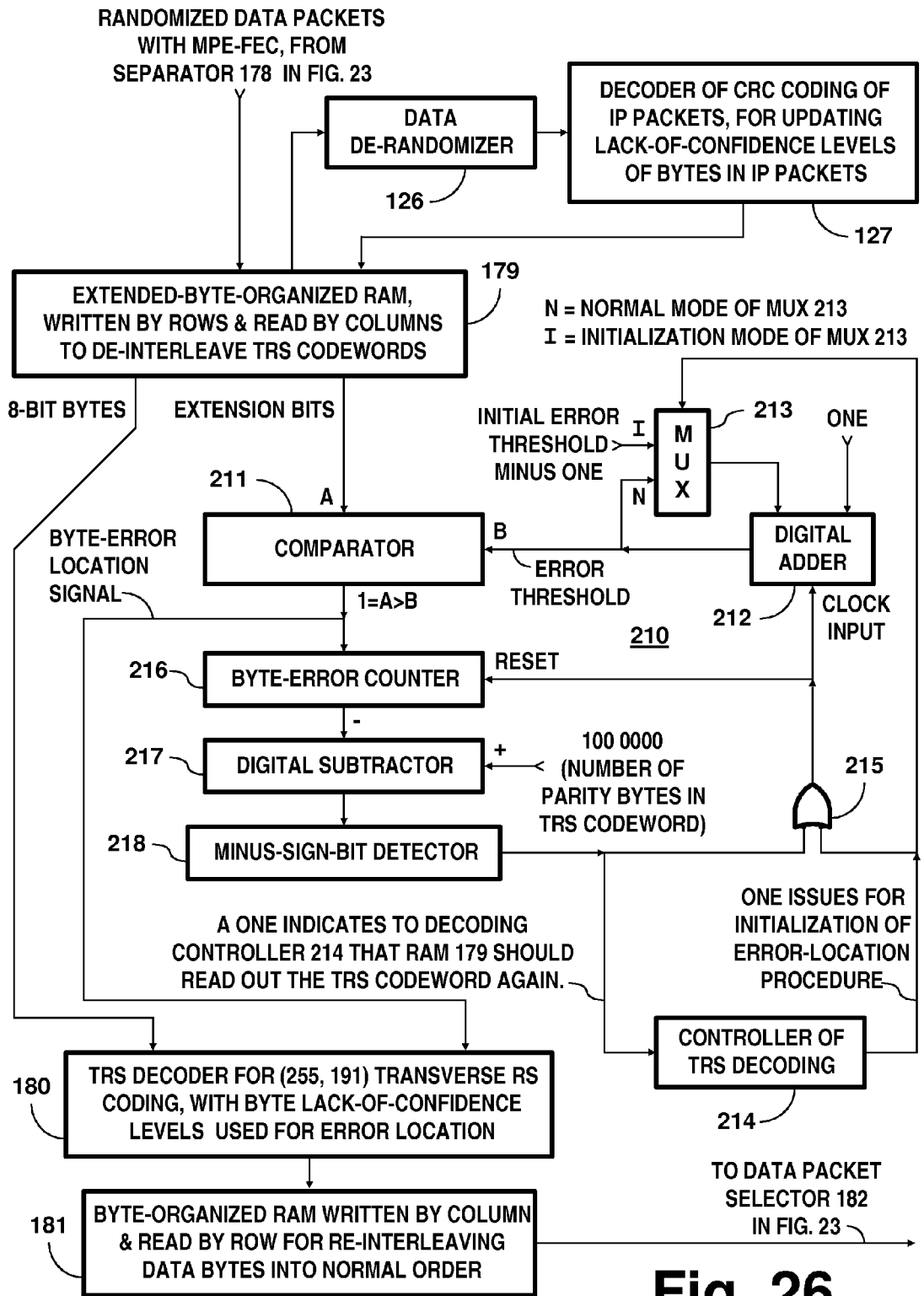

FIG. 26 is a schematic diagram showing the adaptive threshold detector used to locate byte errors for decoding (255, 191) Reed-Solomon coding in the FIG. 23 portion of a DTV receiver.

Figure 21:
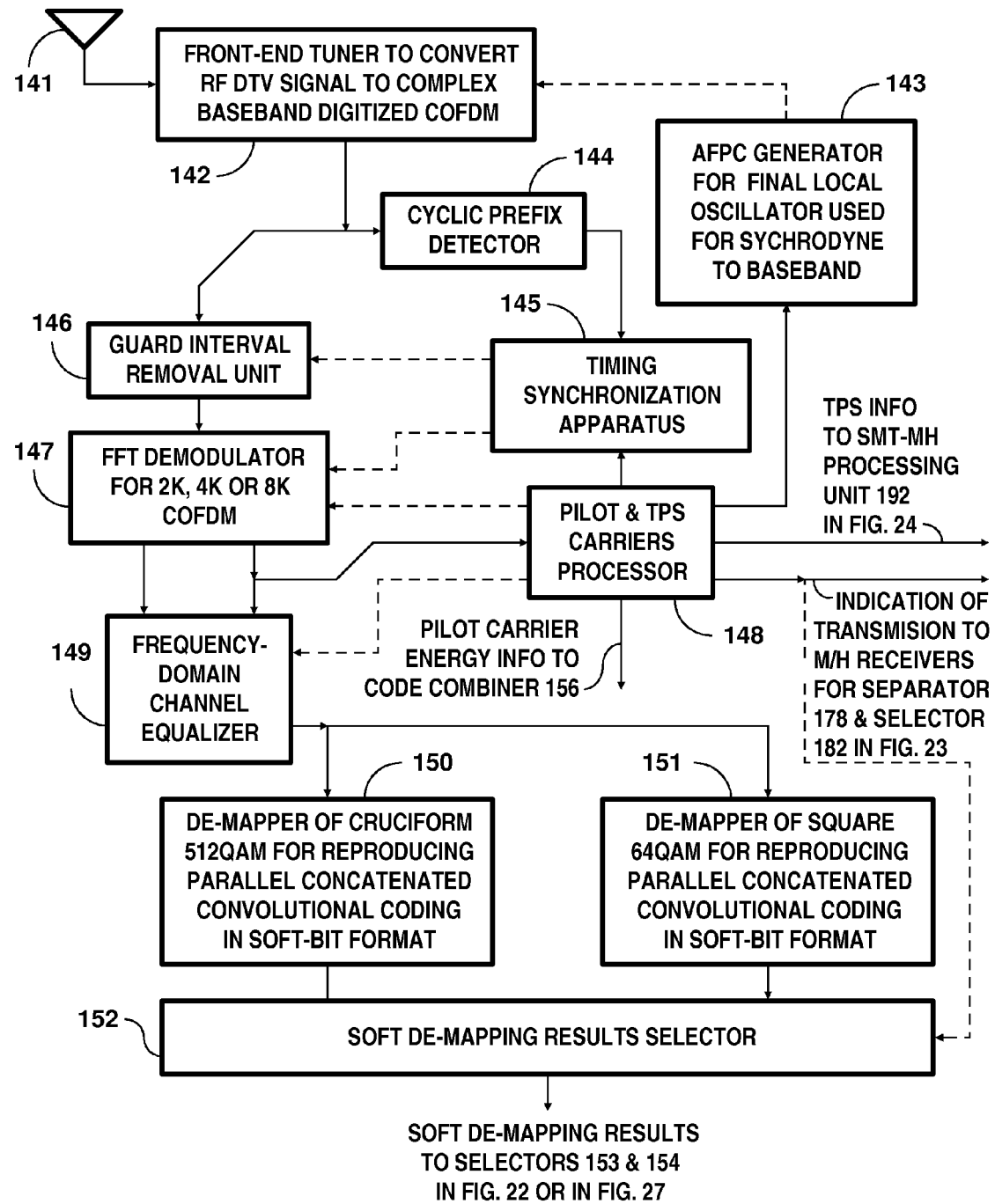
Figure 22:
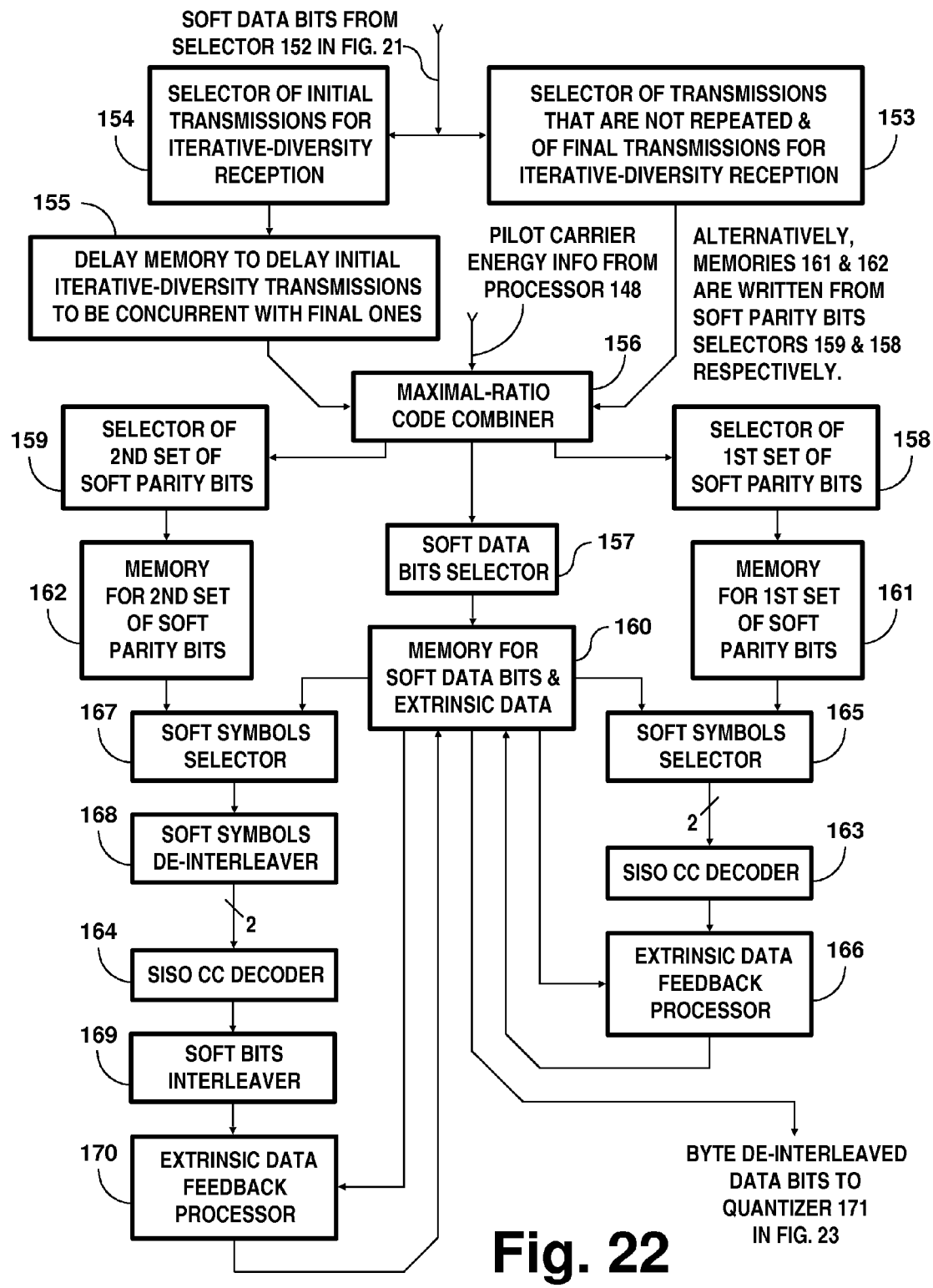
Figure 27:
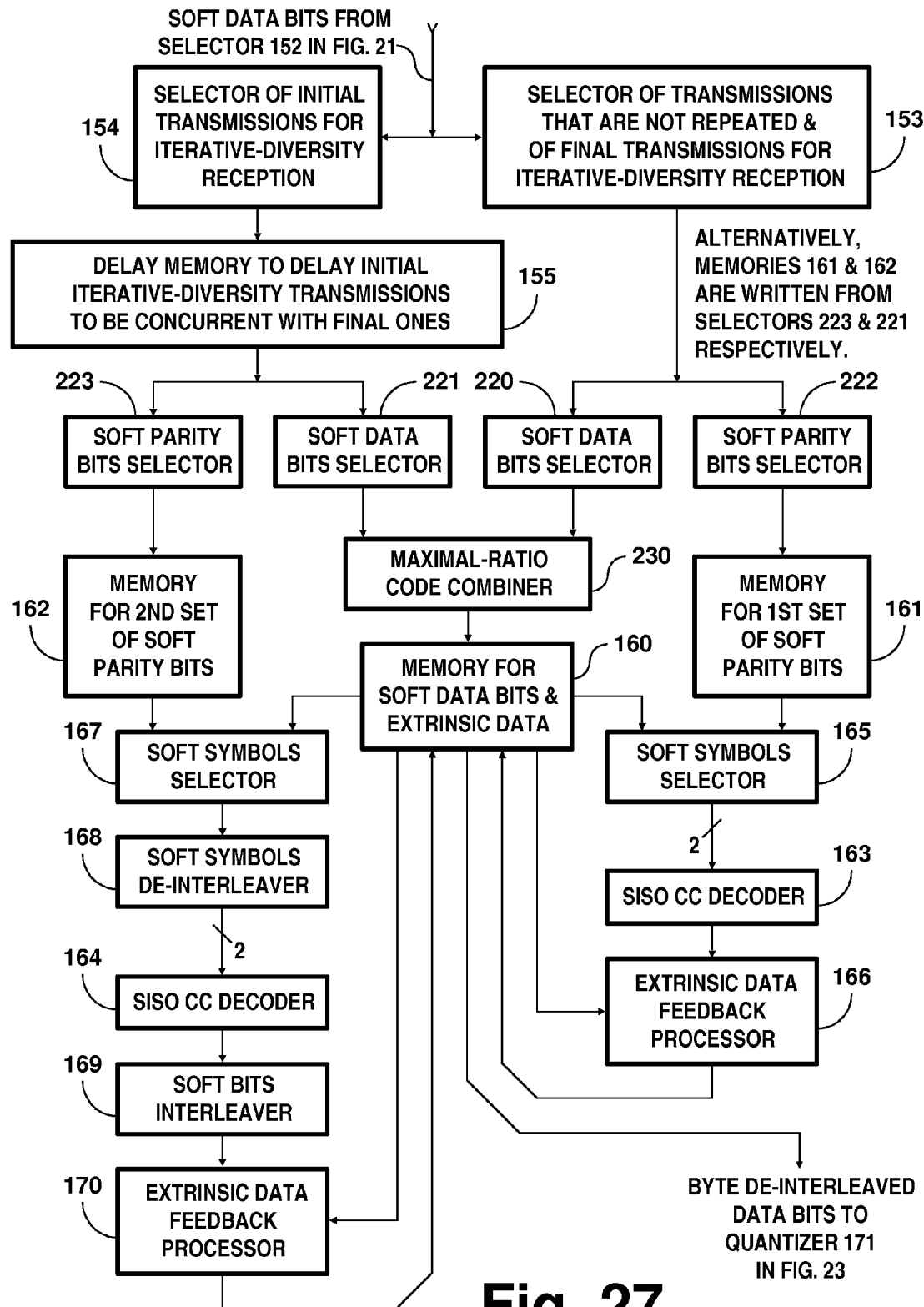

FIG. 27 replaces FIG. 22 in the schematic diagram of FIGS. 21, 22, 23 and 24 to provide a schematic diagram of a DTV receiver for reception of COFDM signals that convey different sets of convolutional coding of the same data at different times, which different sets of convolutional coding are combined by the DTV receiver to form PCCC to be turbo decoded.

Figure 28:
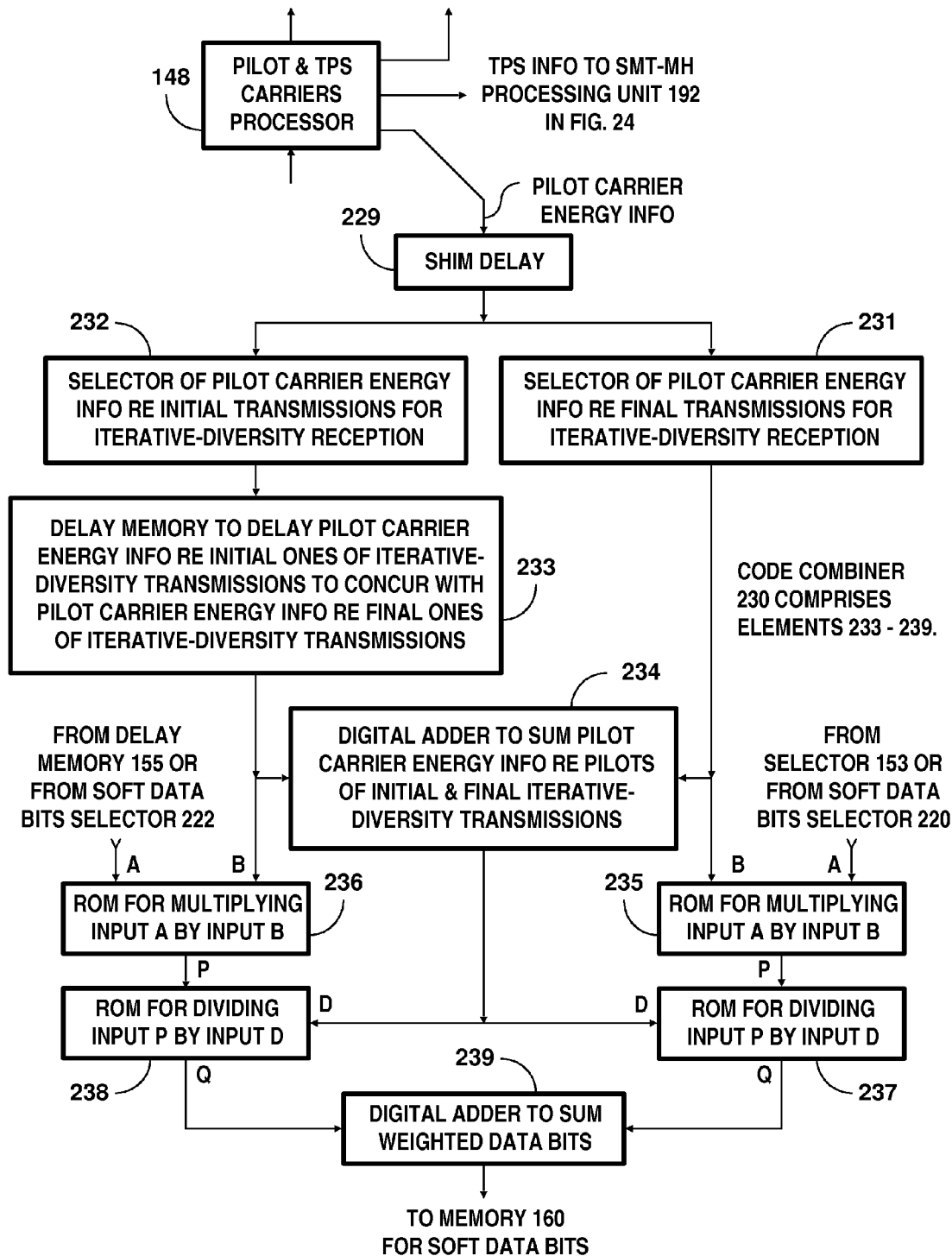

FIG. 28 is a more detailed schematic diagram of the maximal-ratio code combiner as shown in FIG. 27, which code combiner is connected for receiving pilot-carrier-energy information from the pilot and TPS carriers processor shown in FIG. 21.

Figure 24:
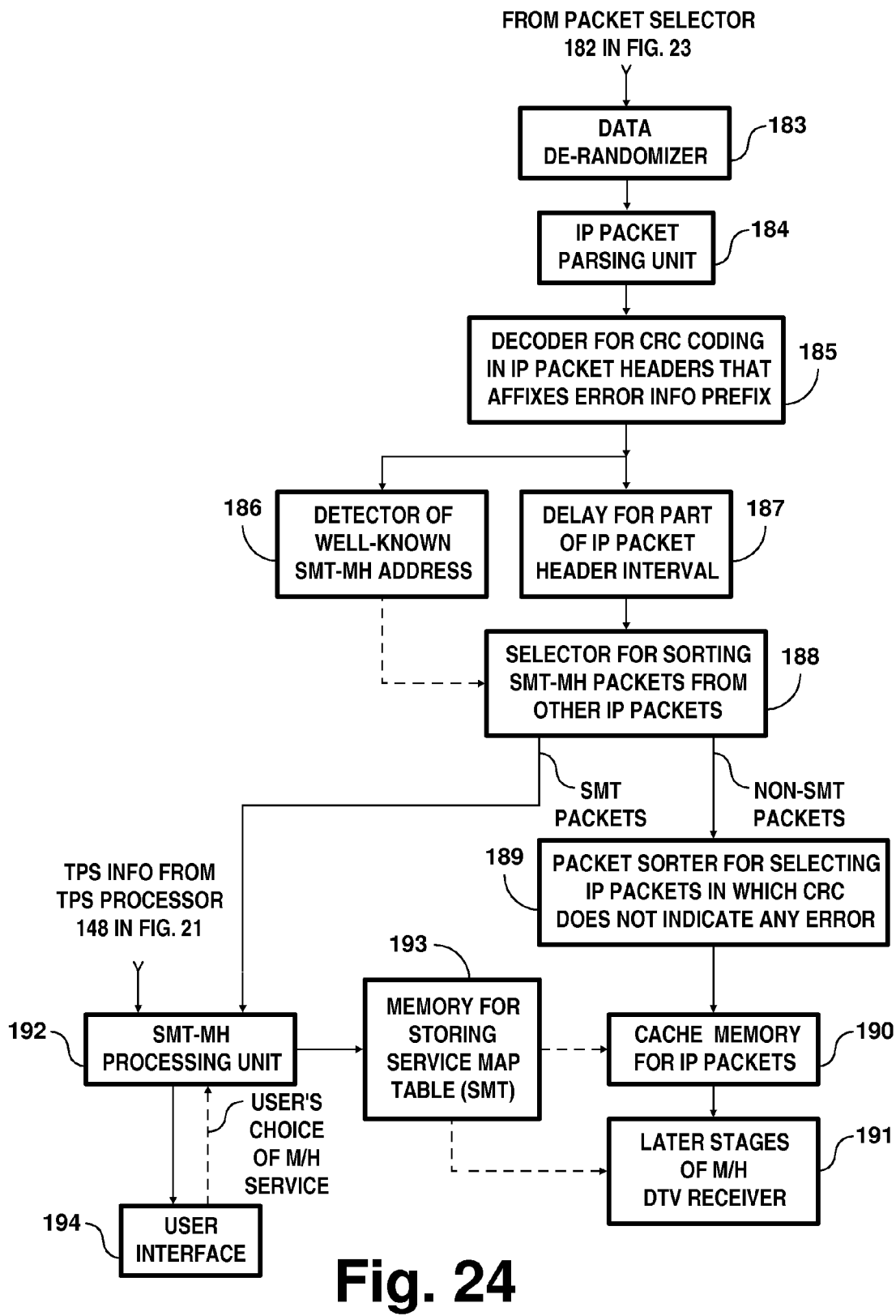
Figure 29:
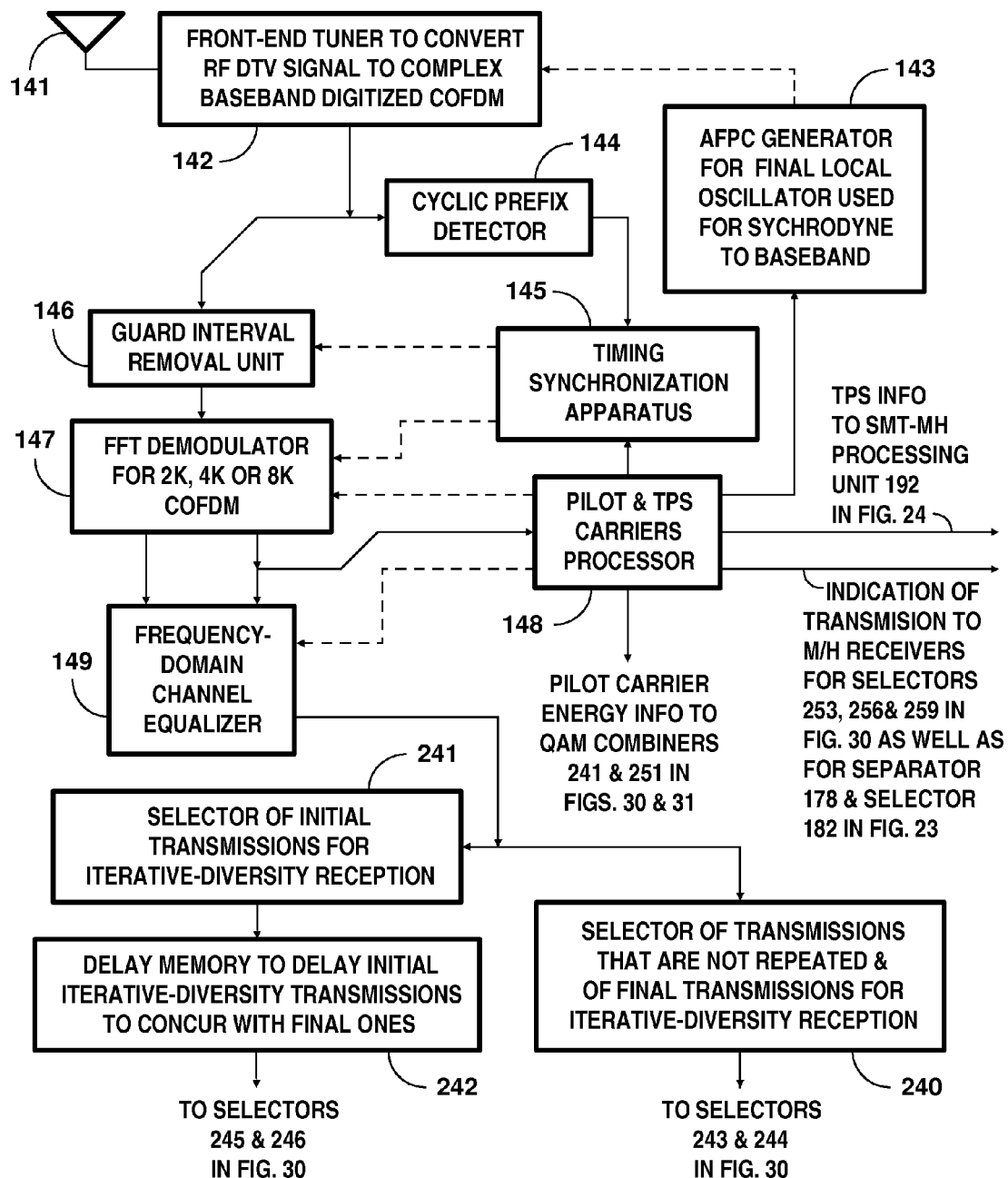
Figure 30:
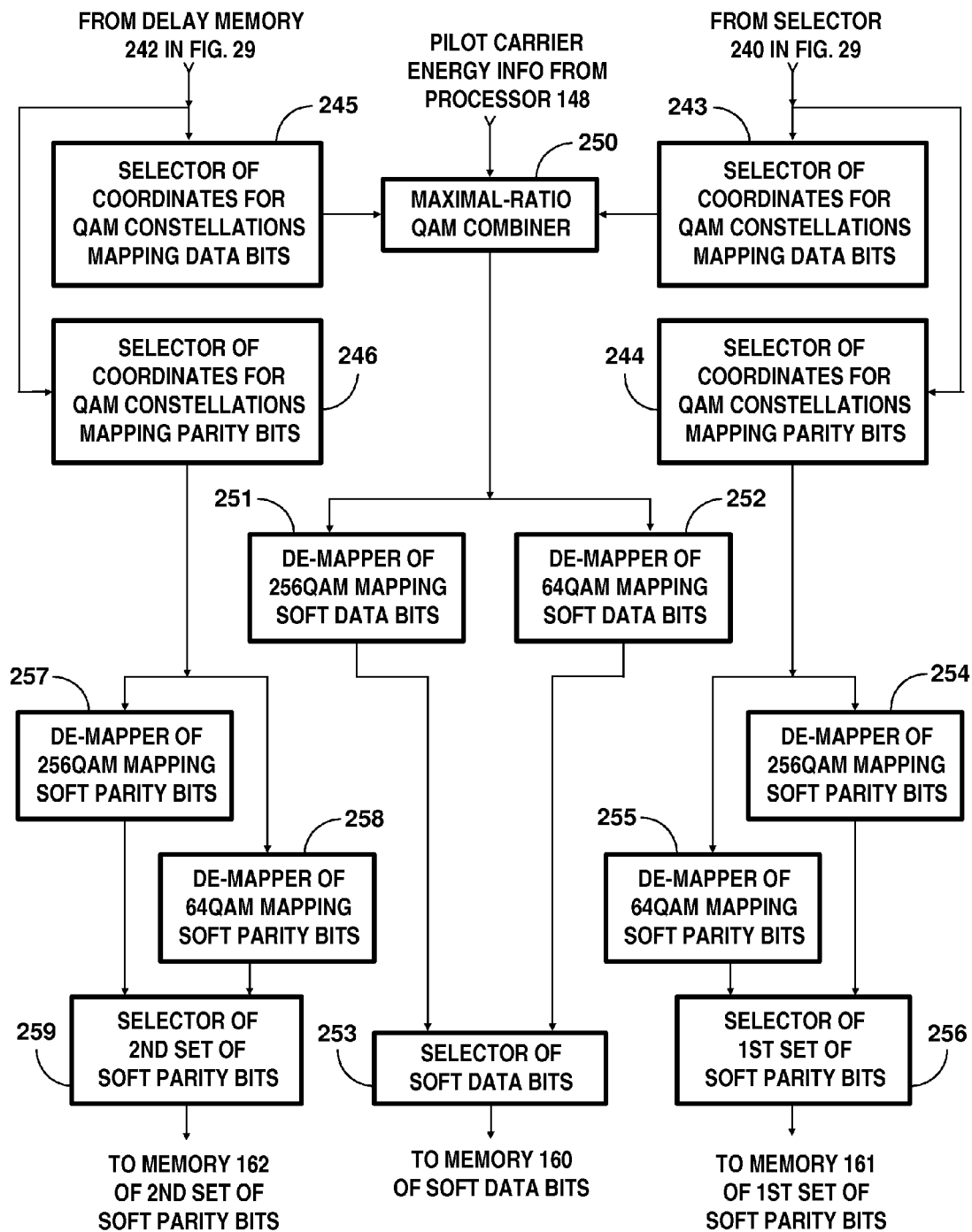
Figure 31:
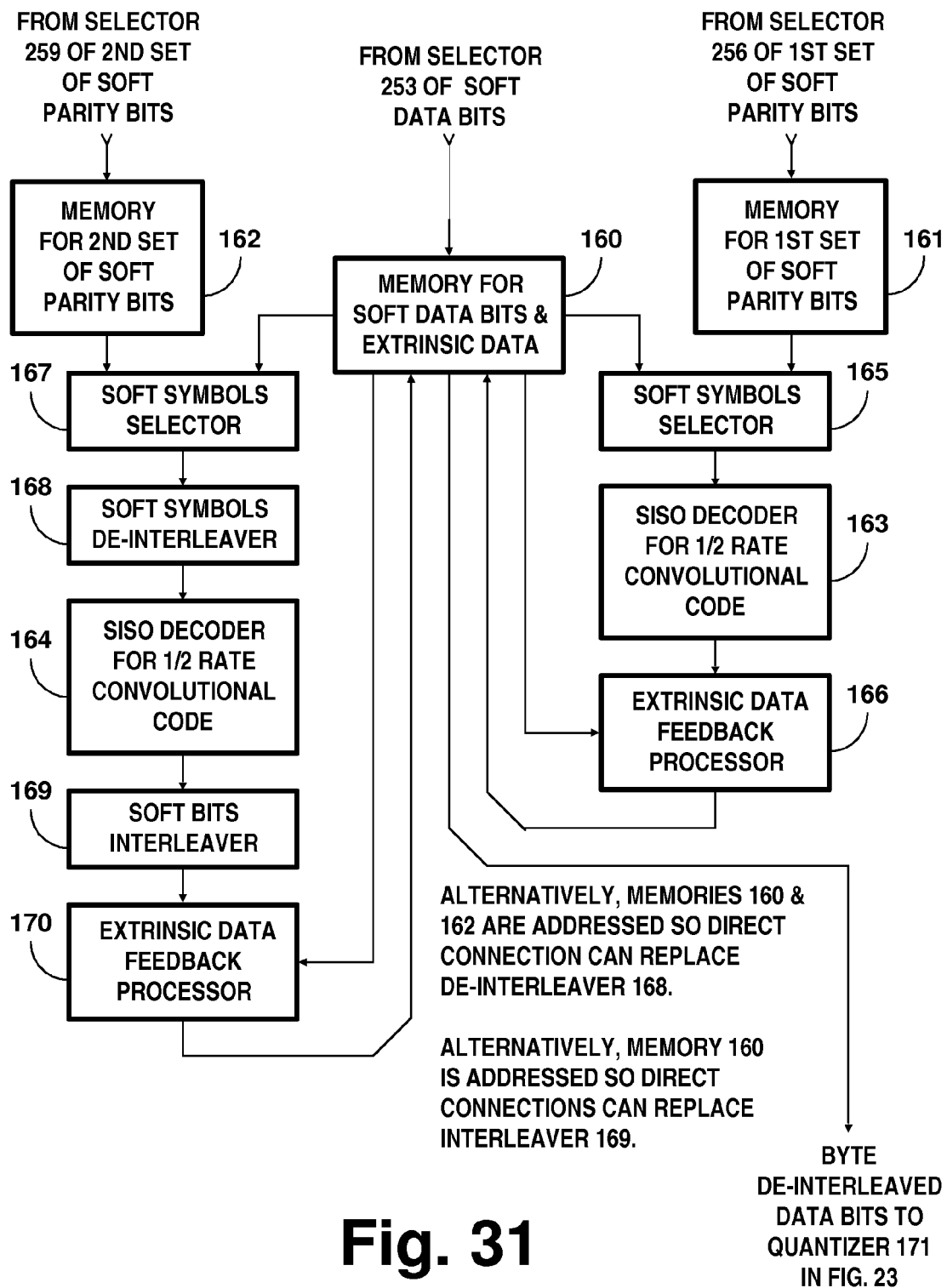

FIGS. 29, 30 and 31 combine with FIGS. 23 and 24 to provide a schematic diagram of a DTV receiver for reception of COFDM signals that convey different sets of convolutional coding of the same data at different times, using different QAM symbol constellations for data bits and for parity bits of convolutional coding, which different sets of convolutional coding are combined by the DTV receiver to form PCCC to be turbo decoded.

Figure 32:
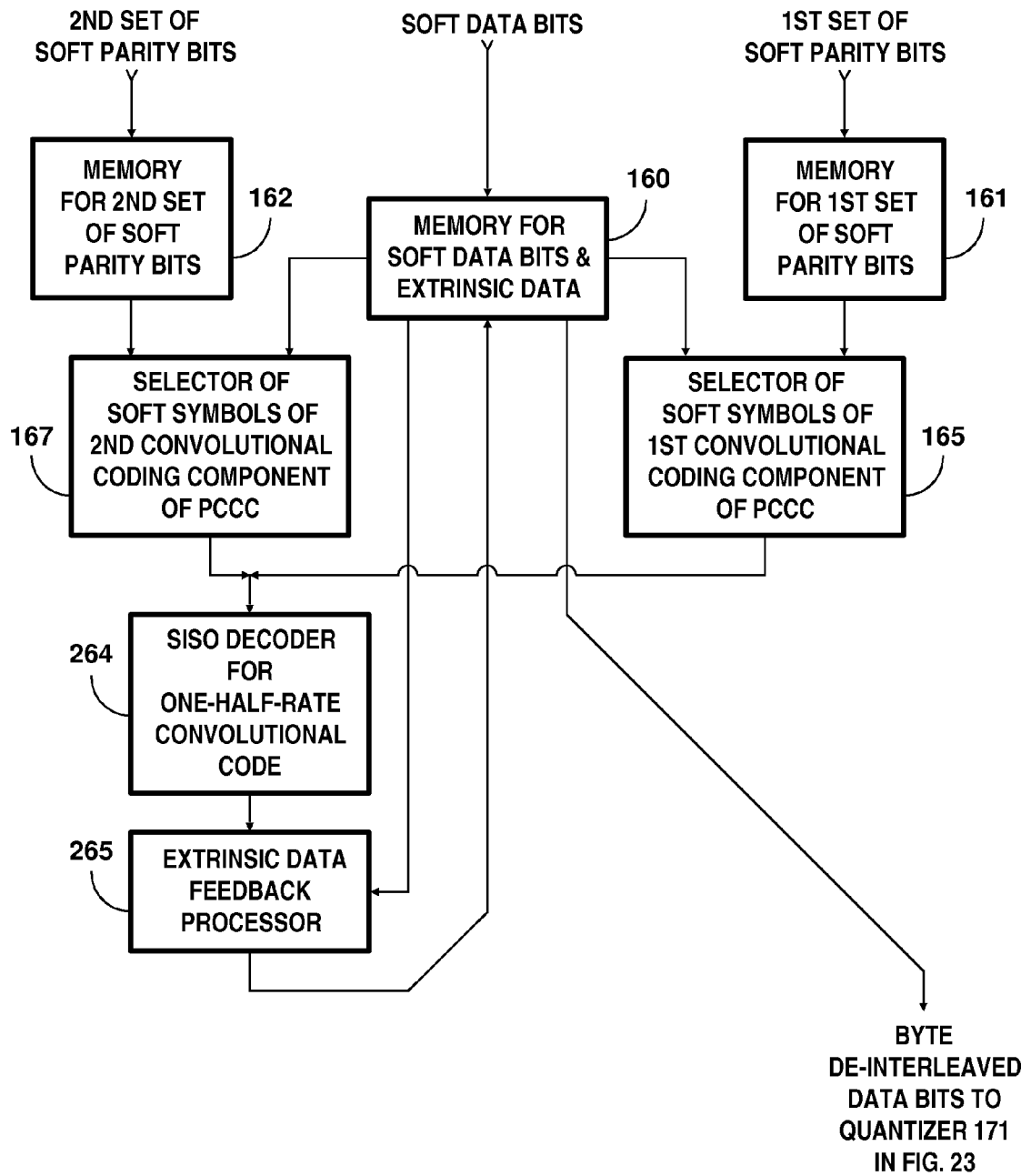

FIG. 32 is a schematic diagram of turbo decoding apparatus alternative to any of those shown in FIGS. 22, 27, and 31, which alternative turbo decoding apparatus employs a single SISO decoder instead of two SISO decoders.

Figure 33:
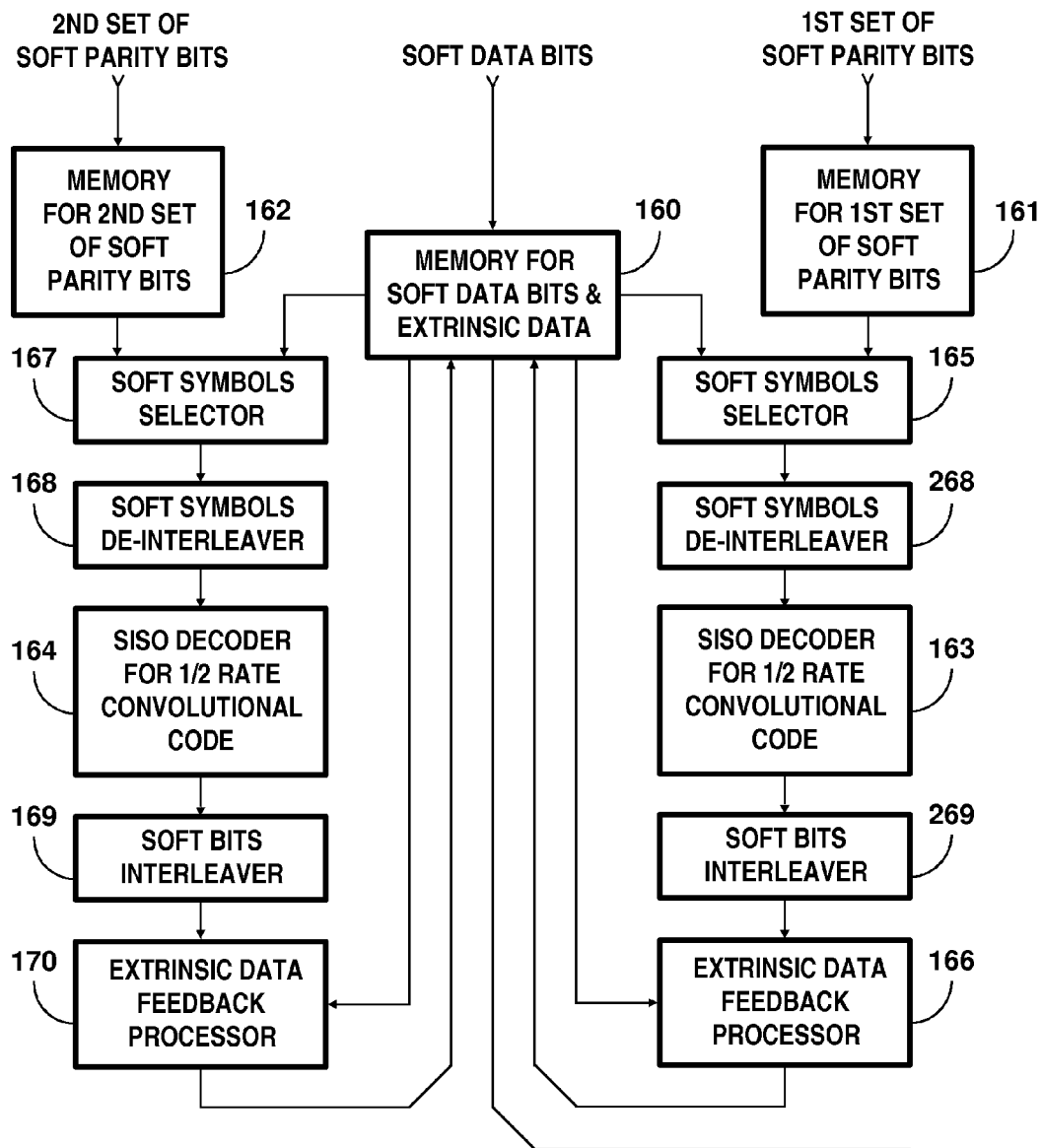

FIG. 33 is a schematic diagram of turbo decoding apparatus alternative to any of those shown in FIGS. 22, 27, and 31, used in a receiver for a DTV system in which both one-half-code-rate convolutional-coded Reed-Solomon codewords transmitted for iterative-diversity reception employ coded bit interleaving.

Figure 34:
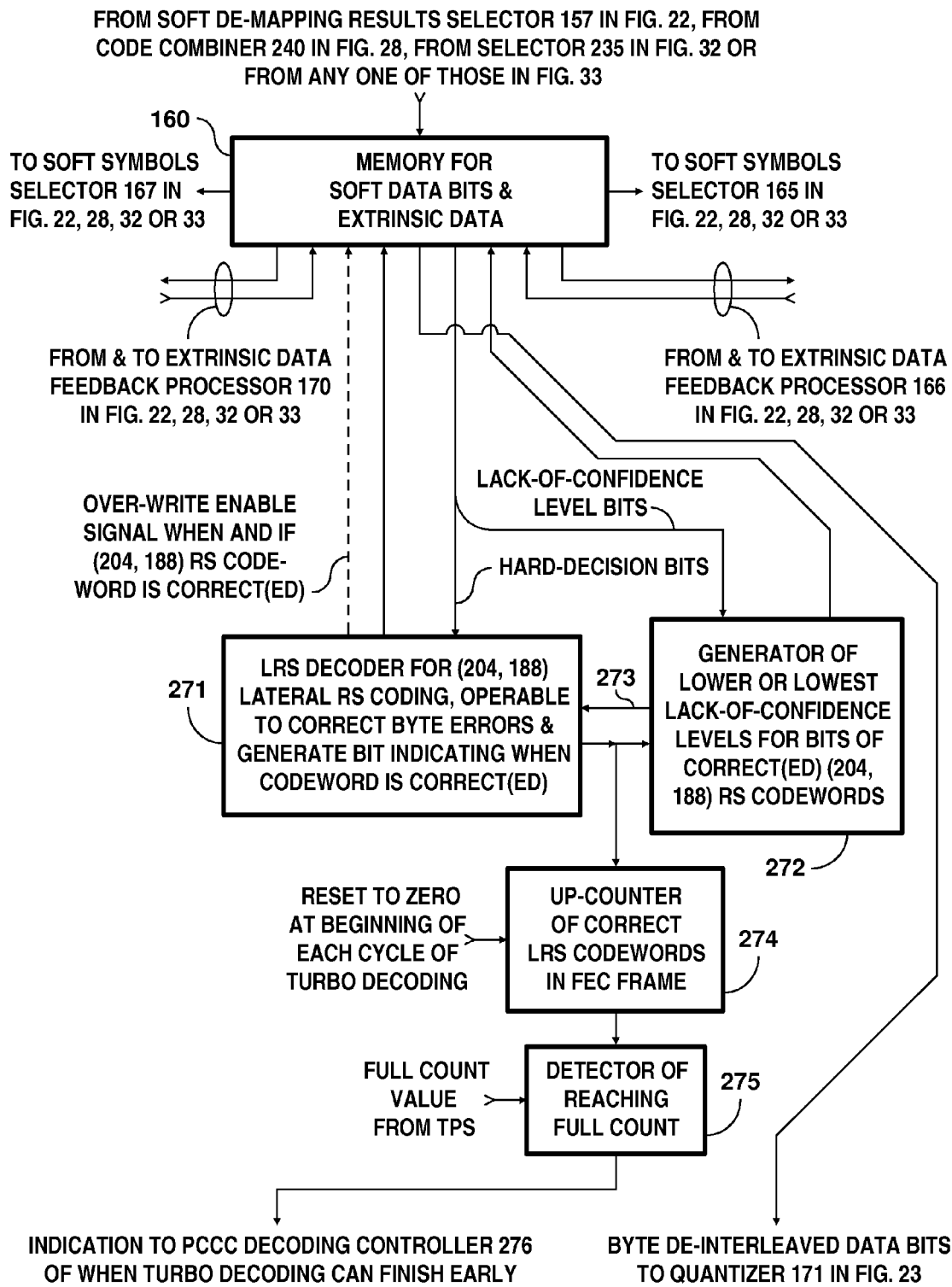

FIG. 34 is a detailed schematic diagram of a modification of any of the turbo decoders shown in FIGS. 22, 27, 31, 32 and 33, in which modification a (204, 188) Reed-Solomon decoder is used to increase the confidence levels of data bits of correct (204, 188) Reed-Solomon codewords as an aid to turbo decoding procedures.

Figure 35:
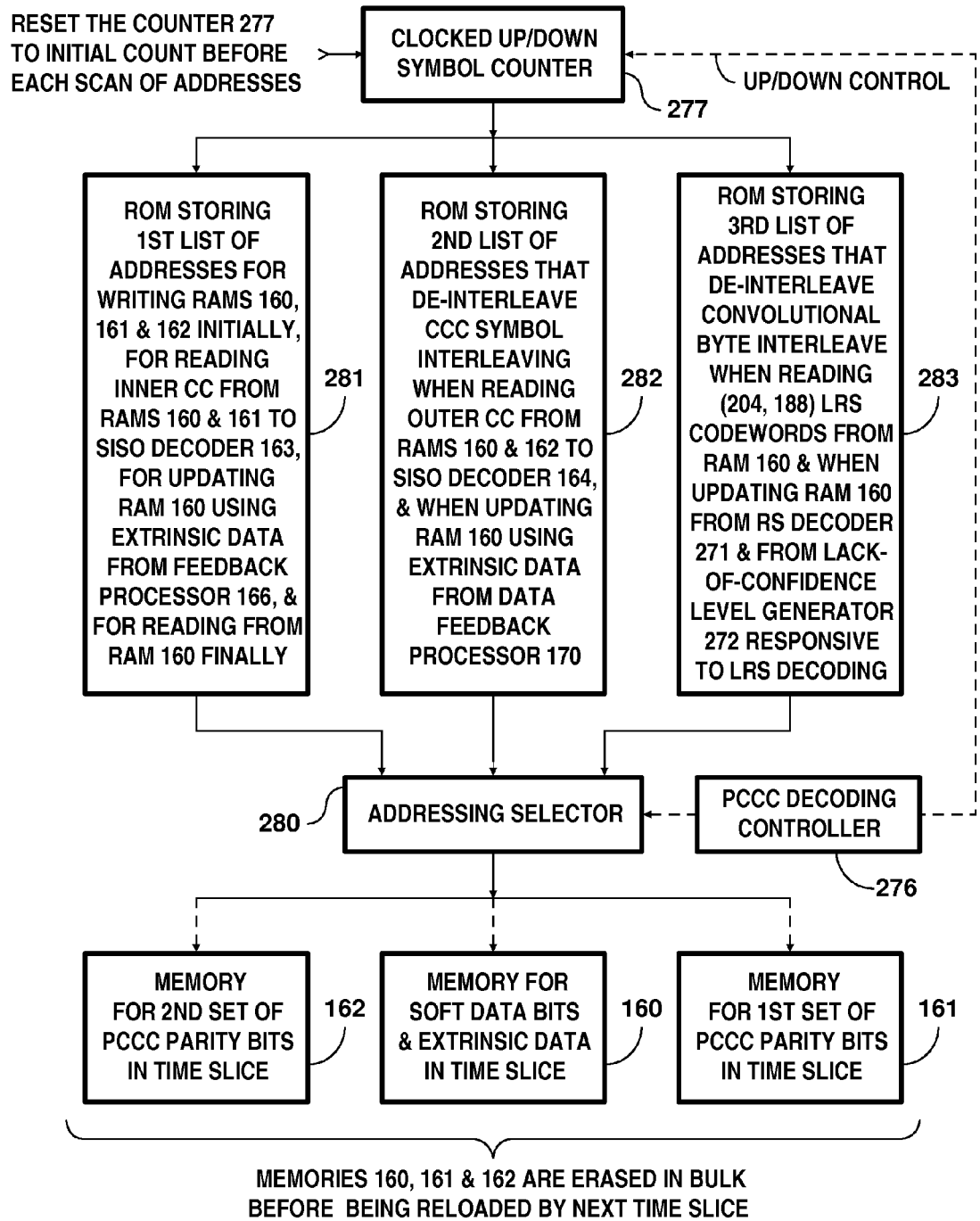

FIG. 35 is a schematic diagram of apparatus for addressing memories of any of the turbo decoders shown in FIGS. 22, 27, 31, 32, and 33 as modified per FIG. 34.

Figure 36:
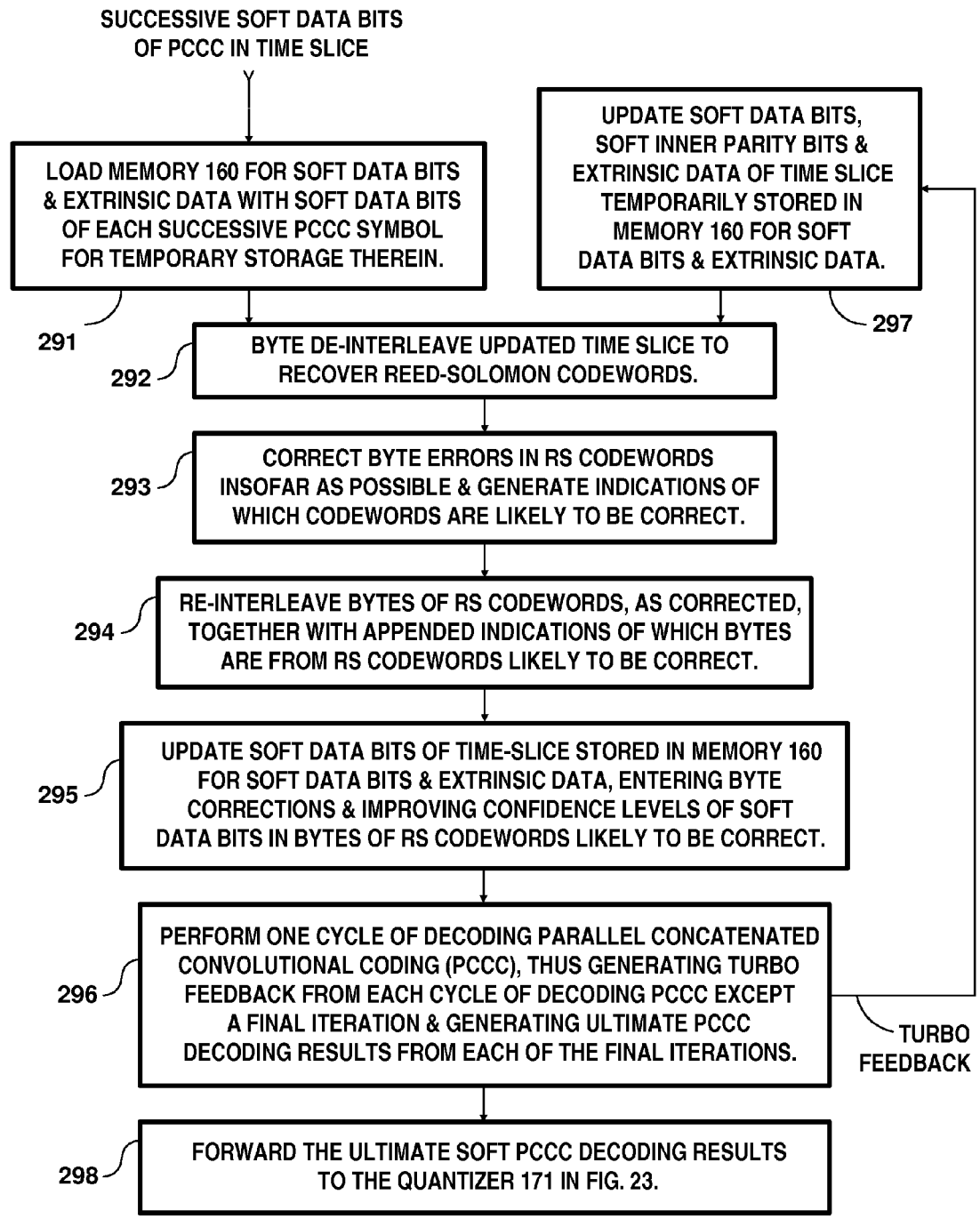

FIG. 36 is an informal flow chart illustrating the method by which turbo decoding procedures are aided by the (204, 188) Reed-Solomon decoder in the FIG. 35 modification of any of the turbo decoders shown in FIGS. 22, 27, 31, 32 and 33.

Figure 37:
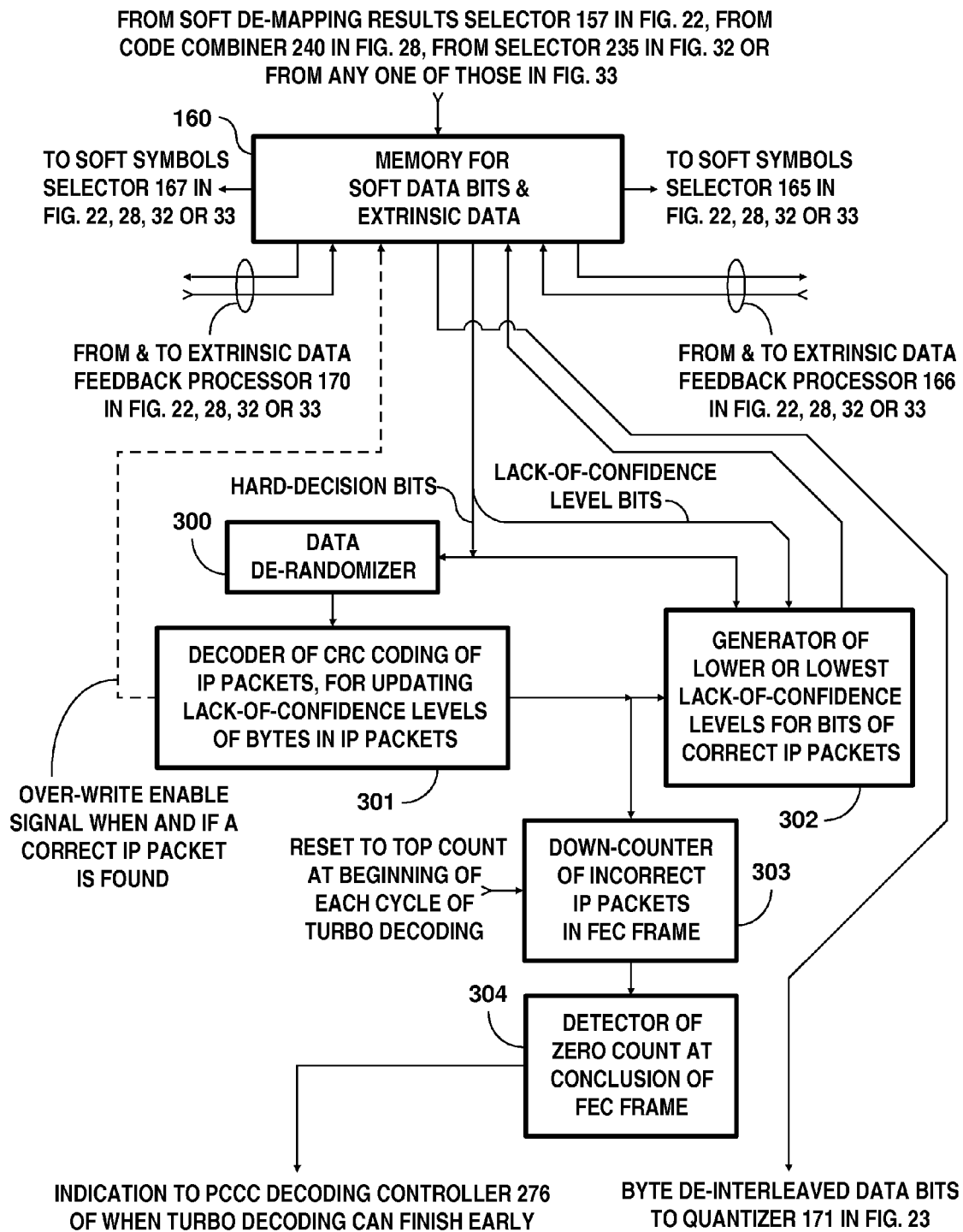

FIG. 37 is a detailed schematic diagram of a modification of any of the turbo decoders shown in FIGS. 22, 27, 31, 32 and 33, in which modification a decoder for cyclic-redundancy-check (CRC) coding is used to increase the confidence levels of data bits of correct internet protocol (IP) packets as an aid to turbo decoding procedures.

DETAILED DESCRIPTION

Figure 1:
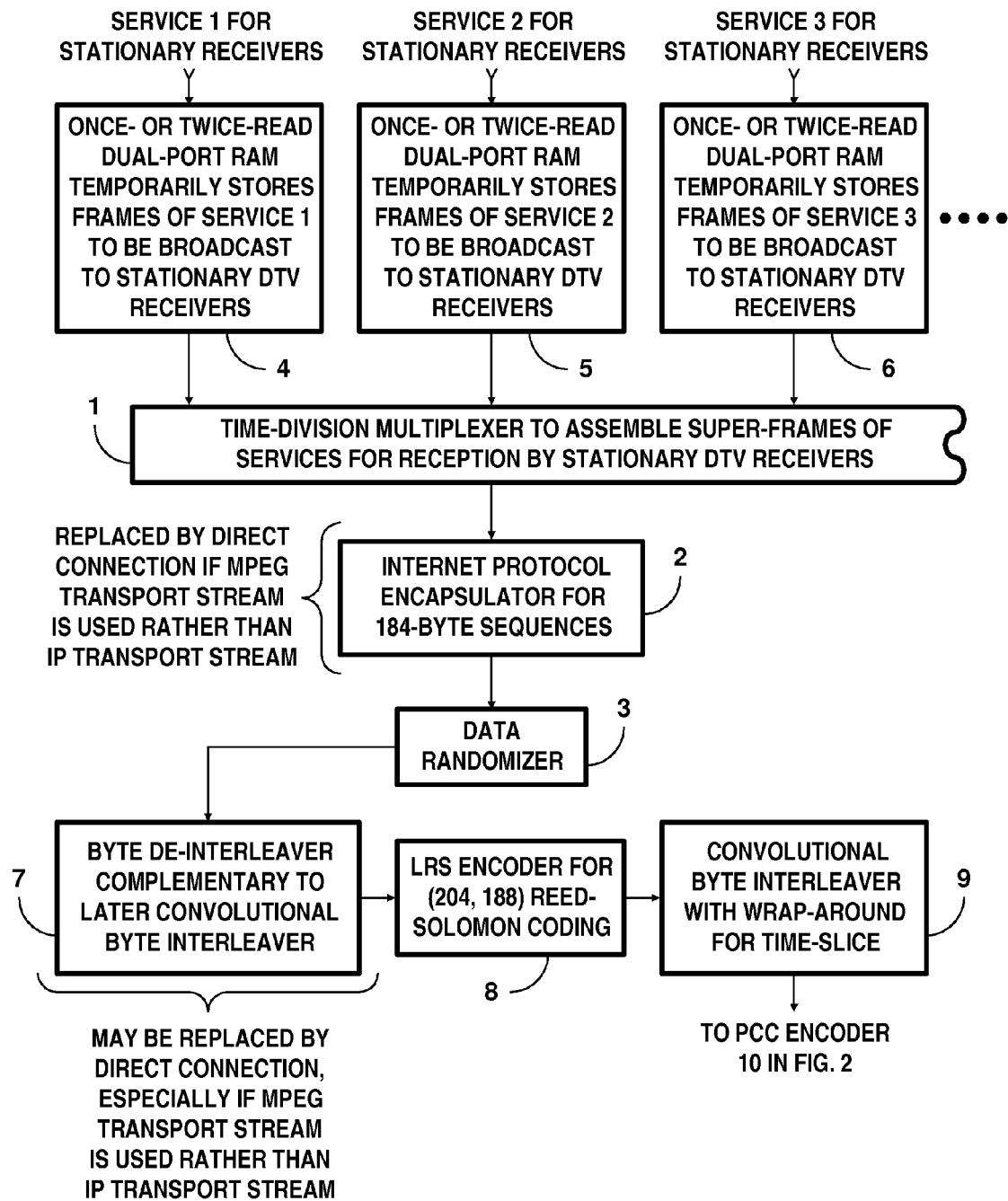
Figure 2:
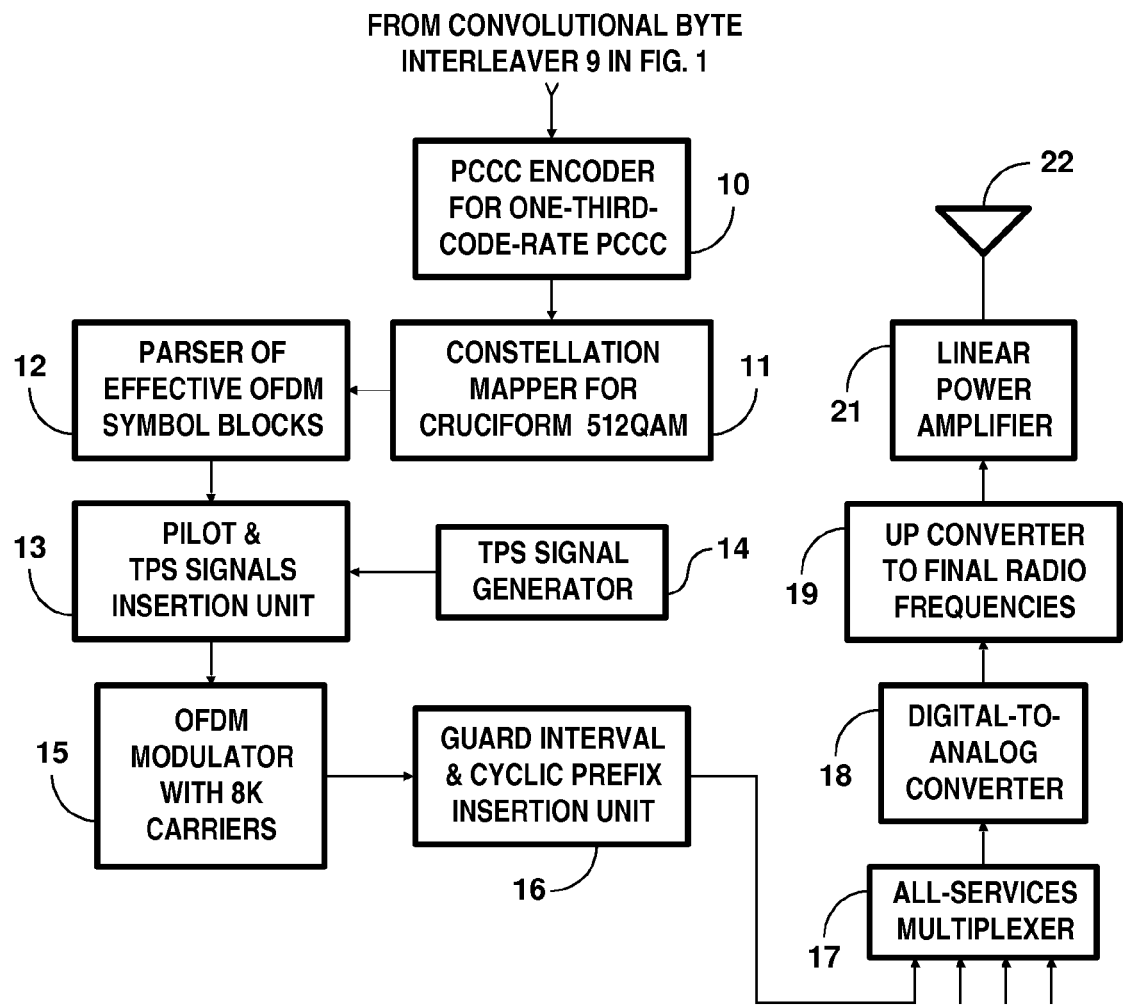

FIGS. 1 and 2 together show a portion of a DTV transmitter generating COFDM signals for reception by stationary DTV receivers. Apparatus for generating parallel concatenated convolutional coding (PCCC) and subsequent COFDM signals is shown in FIG. 2. FIG. 1 depicts apparatus for processing frames of services to be broadcast to stationary DTV receivers.

A time-division multiplexer 1 for interleaving time-slices of services to be broadcast to stationary DTV receivers is depicted near the middle of FIG. 1. The time-division multiplexer 1 successively selects time-slices of these various services to be reproduced in its response, which is supplied from its output port. FIG. 1 depicts the output port of the multiplexer 1 connected to the input port of an internet protocol encapsulator 2, the output port of which IPE 2 connects to the input port of a data randomizer 3.

The internet protocol encapsulator 2 is used only if the services for reception by stationary DTV receivers use internet-protocol (IP) transport-stream (TS) packets, which packets have varying lengths. The original format for services broadcast for reception by stationary DTV receivers may be composed of successive MPEG-2 TS packets, rather than successive IP TS packets. In such case, the IPE 2 is either selectively by-passed or is replaced by a direct connection from the output port of multiplexer 1 to the input port of the data randomizer 3.

An internet-protocol encapsulator (IPE) encapsulates incoming IP-datagrams within MPE (MultiProtocol Encapsulation) sections. In DVB-H the MPE sections are subsequently segmented to fit within the final 184 bytes of 188-byte MPEG-2 TS packets, as defined by the Motion Picture Experts Group (MPEG), which TS packets are referred to as IPE packets. The IPE further encapsulates the required PSI/SI (Program Specific Information/Service Information) signaling data that accompany each frame. The IPE also introduces signaling regarding the time-slicing transmissions of data in bursts, each burst including a respective FEC frame together with MPE timing information that lets receivers know when to expect the next burst of data. The relative amount of time from the beginning of this MPE frame to the beginning of the next burst is indicated within a burst in the header of each MPE frame. This enables an M/H receiver to shut down between bursts, thereby minimizing power consumption and preserving battery life.

In transmissions made per the DVB-H standard, further signaling information in regard to time-slicing, such as burst duration, is included in the time_slice_fec_identifier_descriptor in the INT (IP/MAC Notification Table). Some of this information is also sent within Transmission Parameters Signaling (TPS) bits that are transported by dedicated carriers (TPS Pilots) in the COFDM (Coded Orthogonal Frequency Division Multiplexing) signal so as to be more quickly and easily available to receivers. This relieves a receiver of the need to decode MPEG2 and PSI/SI information. Such further time-slicing signaling information can be transmitted in tabular format prescribed in a standard developed for broadcasting in the United States of America, as well as some of this information being sent as TPS bits.

In a variant of DVB-H for use in the US, it is preferable that each IPE packet has a 6-byte header, rather than a 4-byte header, and that the MPE sections are subsequently segmented to fit within the final 182 bytes of the 188-byte IPE packet. In this preferred variant the final two bytes of an IPE packet header are used for conveying information that locates the respective starts of IP packets in MPE sections.

By way of illustration, the DTV transmitter is presumed to transmit successive super-frames of DTV signal, each of which super-frames is composed of four successive frames of DTV signal. The four frames are presumed to be of equal durations, and each may convey a separate service to be received by stationary DTV receivers. Alternatively, one (or more) of the four frames is used for broadcasting to mobile and handheld (M/H) DTV receivers. Each frame is presumed to be composed of eight successive time-slices of equal durations. In each of the frames used for broadcasting to M/H DTV receivers, the respective eight successive time-slices can convey a separate service to be received by those receivers. Each frame presumably being composed of eight successive time-slices is a consideration in broadcast transmissions for iterative-diversity reception, also, as will be explained further on in this specification, with regard to FIG. 8.

Data concerning a first of the services to be transmitted for reception by stationary DTV receivers are written to a dual-port random-access memory 4 via a random-access port thereof. The RAM 4 is capable of temporarily storing a number of time-slices of that service, more than the number of them in a frame. Within each super-frame interval a prescribed number of consecutive time-slices of that service are read from the serial output port of the RAM 4 to a first input port of the multiplexer 1.

Data concerning a second of the services to be transmitted for reception by stationary DTV receivers are written to a dual-port random-access memory 5 via a random-access port thereof. The RAM 5 is capable of temporarily storing a number of time-slices of that service, more than the number of them in a frame. Within each super-frame interval a prescribed number of consecutive time-slices of that service are read from the serial output port of the RAM 5 to a second input port of the multiplexer 1.

Data concerning a third of the services to be transmitted for reception by stationary DTV receivers are written to a dual-port random-access memory 6 via a random-access port thereof. The RAM 6 is capable of temporarily storing a number of time-slices of that service, more than the number of them in a frame. Within each super-frame interval a prescribed number of consecutive time-slices of that service are read from the serial output port of the RAM 6 to a third input port of the multiplexer 1. If the DTV transmitter does not transmit services for reception by M/H receivers, data concerning a fourth service for reception by stationary DTV receivers are read to a fourth input port of the multiplexer 1 from a dual-port random-access memory that FIG. 1 does not explicitly show.

The bits of the concluding 187-byte portion of each of the data packets supplied to the input port of the data randomizer 3 are exclusive-ORed with a prescribed repeating pseudo-random binary sequence (PRBS) in the data randomizer 3. However, initial synchronizing bytes accompanying the data packets are excluded from such data randomization procedure. By way of example, the PRBS can be the maximal-length 16-bit one prescribed in §§4.3.1 of the 1996 European Telecommunication Standard 300 744 titled "Digital Video Broadcasting (DVB); Framing Structure, Channel Coding and Modulation for Digital Terrestrial Television (DVB-T)". Alternatively, the PRBS can be the maximal-length 16-bit one prescribed in §4.2.2 of the 1995 ATSC Digital Television Standard, Annex D. The 16-bit register used to generate the PRBS for data randomization is reset to initial condition at the beginning of each time-slice supplied from the multiplexer 1.

If the services broadcast for reception by stationary DTV receivers employ IP TS packets, the output port of the data randomizer 3 is connected for supplying data-randomized IPE packets to the input port of a byte de-interleaver 7. The output port of the byte de-interleaver 7 is then connected for supplying its byte-interleaved response to the input port of an LRS encoder 8 for (204, 188) Reed-Solomon (RS) forward-error-correction (FEC) coding. In this specification and its claims, the (204, 188) RS FEC coding is referred to as "lateral Reed-Solomon" FEC coding or "LRS" FEC coding to distinguish it from transverse RS FEC coding or "TRS" coding. The words "lateral" and "transverse" also refer in a general way to respective directions in which RS coding is done with respect to IPE packets. The output port of the LRS encoder 8 is connected for supplying serially generated (204, 188) LRS FEC codewords to the input port of a convolutional byte interleaver 9. The pattern of byte de-interleaving that the byte de-interleaver 7 employs is complementary to the pattern of byte interleaving employed by the subsequent convolutional byte interleaver 9. The byte de-interleaver 7 arranges for the convolutional byte interleaver 9 to provide "coded" or "implied" byte interleaving of (204, 188) LRS FEC codewords from the LRS encoder 8.

In a DTV receiver, the decoding of the (204, 188) LRS FEC codewords implements error correction, but is not used to validate the correctness of IP packets. The correctness of the IP packets is validated by cyclic-redundancy-check (CRC) coding within them. Some burst errors may exceed the error-correction capability of the decoder for the (204, 188) LRS FEC codewords. If the byte interleaving of (204, 188) LRS FEC codewords at the transmitter is not "coded", byte de-interleaving in the receiver disperses these burst errors that cannot be corrected among a greater number of IP packets than those affected by such burst error when initially received. With "coded" byte interleaving of the (204, 188) LRS FEC codewords, the DTV receiver can confine to fewer data-randomized IP packets those burst errors that cannot be corrected. The dispersal of burst errors that cannot be corrected that occurs in byte de-interleaving prior to decoding the (204, 188) LRS FEC codewords is counteracted in byte re-interleaving performed after such decoding and before decoding of TRS-coded IP packets.

In M/H DTV receivers that embody certain aspects of the invention, the results of decoding (204, 188) LRS FEC codewords are one of the bases for locating byte errors for subsequent decoding of (255, 191) TRS FEC codewords. Another advantage of "coded" byte interleaving of the (204, 188) RS FEC codewords is error location capability afforded by decoding the (204, 188) RS FEC codewords differs more from the error location capability afforded by decoding the CRC coding of IP packets.

If the original format for services broadcast for reception by stationary DTV receivers is composed of successive MPEG-2 TS packets, rather than successive IP TS packets, the byte de-interleaver 7 is either selectively by-passed or is replaced by a direct connection from the output port of the data randomizer 3 to the input port of the RS encoder 8. In the DTV receiver, the decoding of the (204, 188) RS FEC codewords not only implements error correction, but is used directly to validate the correctness of the MPEG-2 TS packets. Accordingly, "coded" convolutional byte interleaving is not used when the original format for services broadcast for reception by stationary DTV receivers is composed of successive MPEG-2 TS packets.

Preferably, the pattern of byte interleaving for the convolutional byte interleaver 9 is one that wraps around from the conclusion of each time-slice to its beginning. Otherwise, the pattern of byte interleaving can be similar to that used in DVB-T and DVB-H. The convolutional byte interleaver 9 is preferably similar in construction and operation to the convolutional byte interleaver 35 described in more detail further on in this specification, in regard to FIG. 8. The output port of the convolutional byte interleaver 9 is connected for supplying its response to apparatus for further FEC coding of individual bits of that response, which apparatus is shown in FIG. 2.

FIG. 2 shows apparatus for generating PCCC and subsequent COFDM carriers subsequently transmitted over the air to be received by stationary DTV receivers. The output port of the convolutional byte interleaver 9 shown in FIG. 1 is connected for supplying the response therefrom to the input port of a PCCC encoder 10 shown in FIG. 2. The PCCC encoder 10 generates one-third-code-rate parallel concatenated convolutional coding that is supplied from its output port to the input port of a constellation mapper 11 for cruciform 512QAM symbol constellations. The nature of the preferred cruciform 512QAM symbol constellations and the Gray mapping used in them are disclosed in detail in the U.S. patent application Ser. No. 13/493,198 filed for A. L. R. Limberg on 11 Jun. 2012 with the title "Digital television system employing COFDM for transmissions to mobile receivers".

The output port of the constellation mapper 11 is connected to the input port of a parser 12 for effective OFDM symbol blocks. The block parser 12 parses a stream of complex samples supplied from the constellation mapper 11 into uniform-length sequences of complex samples, each of which sequences is associated with a respective effective OFDM symbol. The output port of the block parser 12 is connected to a first input port of a pilot and TPS signal insertion unit 13, a second input port of which unit 13 is connected to receive Transmission Parameters Signaling (TPS) bits from a TPS signal generator 14. The pilot and TPS signal insertion unit 13 inserts these TPS bits, which are to be transported by modulated dedicated carriers (TPS Pilots), into each effective OFDM symbol block. The pilot and TPS signal insertion unit 13 inserts other bits descriptive of unmodulated carriers of predetermined amplitude and predetermined phase into each effective OFDM symbol block. An output port of the pilot and TPS signal insertion unit 13 is connected for supplying the effective OFDM symbol blocks, with pilot carriers inserted therein, to the input port of an OFDM modulator 15. The OFDM modulator 15 has 8K carriers capability, suitable for transmissions to stationary DTV receivers.

A transmission signal in an OFDM system is transmitted by a unit of a symbol called an OFDM symbol. This OFDM symbol includes an effective symbol that is a signal period in which I-DFT is performed during transmission and a guard interval in which the waveform of a part of the latter half of this effective symbol is directly copied. This guard interval is provided in the former half of the OFDM symbol. In the OFDM system, such a guard interval is provided to improve performance during multi-path reception. Plural OFDM symbols are collected to form one OFDM transmission frame. For example, in the ISDB-T standard, ten OFDM transmission frames are formed by two hundred four OFDM symbols. Insertion positions of pilot signals are set with this unit of OFDM transmission frames as a reference.

The OFDM modulator 15 includes a serial-to-parallel converter for converting the serially generated complex digital samples of the effective OFDM symbols to parallel complex digital samples for inverse discrete Fourier transformation (I-DFT). The OFDM modulator 15 further includes a parallel-to-serial converter for converting the parallel complex digital samples of the I-DFT results to serial complex digital samples of the I-DFT results supplied from the output port of the OFDM modulator 15 to the input port of a guard-interval-and-cyclic-prefix-insertion unit 16. The output port of the guard-interval-and-cyclic-prefix-insertion unit 16 is connected for supplying successive complex digital samples of a COFDM signal to a first input port of an all-services multiplexer 17.

The output port of the all-services multiplexer 17 is connected to the input port of a digital-to-analog converter 18. FIG. 2 shows the output port of the DAC 18 connected for supplying its analog COFDM signal response to the input port of an up-converter 19 for converting baseband-frequency analog COFDM signal to very-high-frequency (VHF) or ultra-high-frequency (UHF) analog COFDM signal. The output port of the up-converter 19 is connected for supplying analog COFDM signal at radio frequencies to the input port of a linear power amplifier 20. FIG. 2 shows the output port of the linear power amplifier 20 connected for driving RF analog COFDM signal power to a transmission antenna 21. FIG. 2 omits showing certain customary details, such as band-shaping filters for the RF signals.

Figure 3:
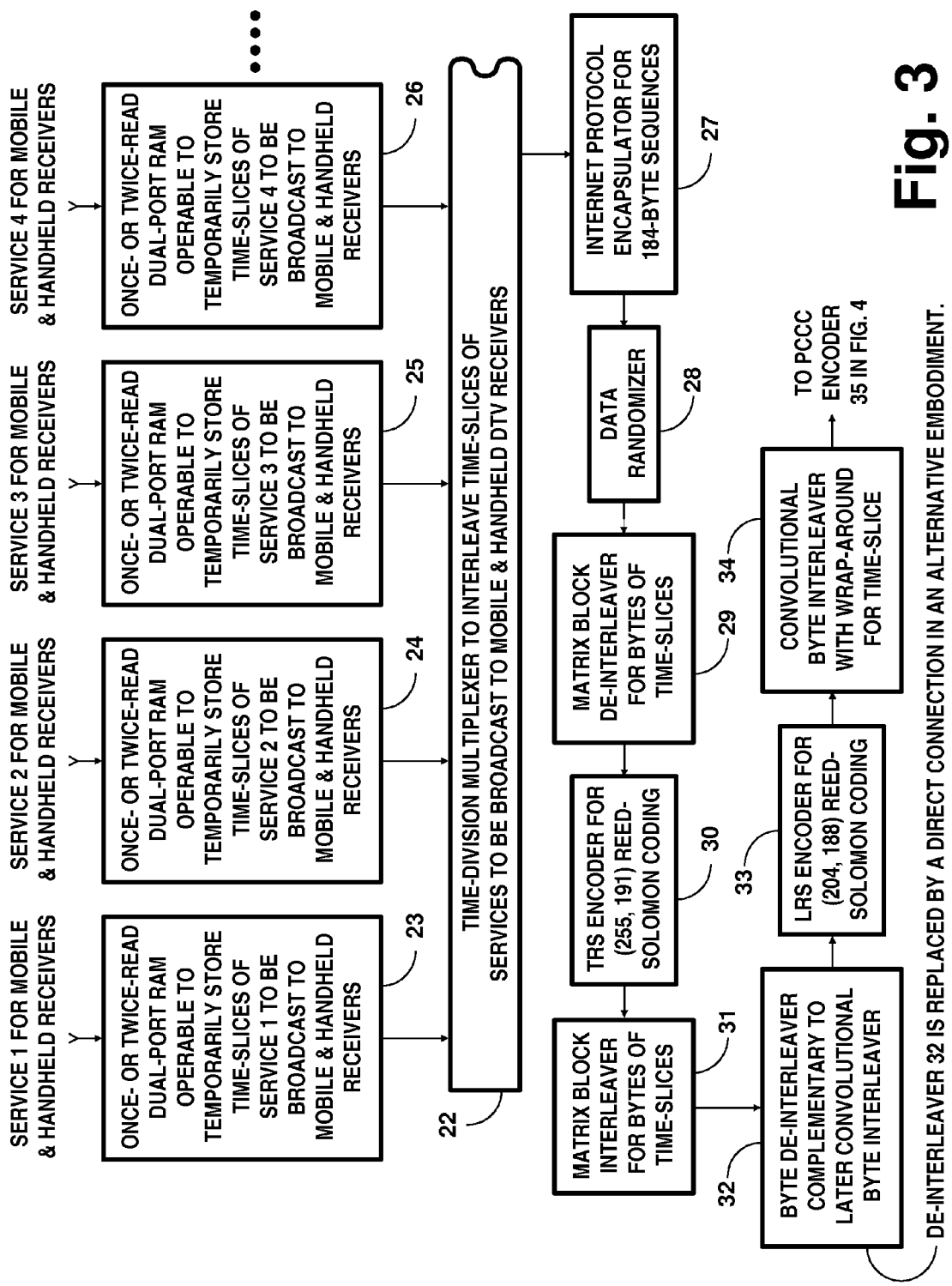
Figure 4:
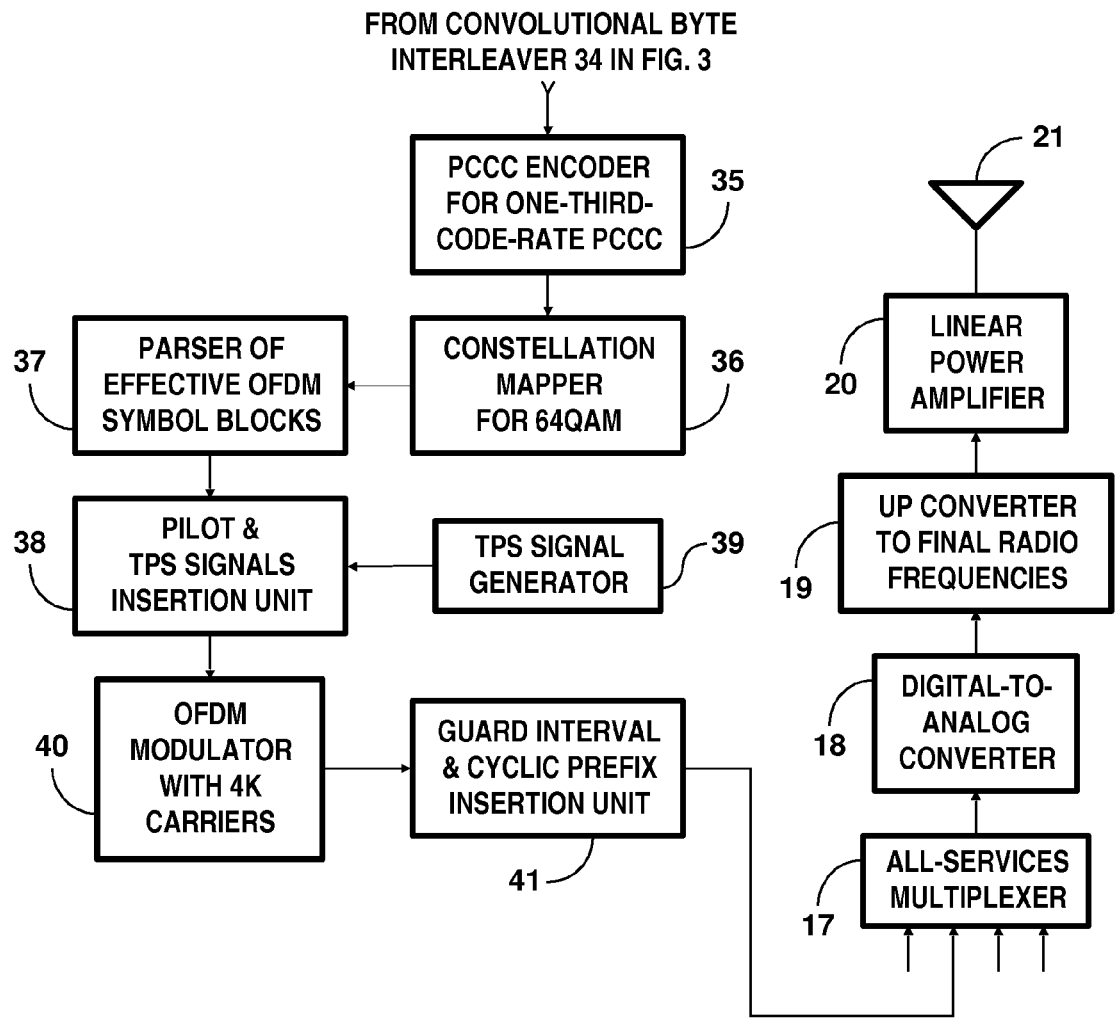

FIGS. 3 and 4 together show a further portion of the DTV transmitter generating COFDM signals for reception by M/H DTV receivers. Apparatus for generating PCCC and subsequent COFDM carriers is shown in FIG. 4. FIG. 3 depicts apparatus for processing time-slices for subsequent encoding within PCCC. A time-division multiplexer 22 to assemble time-sliced services for reception by M/H DTV receivers is shown somewhat above the middle of FIG. 3.

Data concerning a first of the services to be transmitted for reception by M/H DTV receivers are written into storage locations within a dual-port random-access memory 23 via a random-access port thereof. Within each super-frame interval a successive time-slice of the first service for reception by M/H DTV receivers is read from the serial output port of the RAM 23 to a first input port of the multiplexer 22.

Data concerning a second of the services to be transmitted for reception by M/H DTV receivers are written into storage locations within a dual-port random-access memory 24 via a random-access port thereof. Within each super-frame interval a successive time-slice of the second service for reception by M/H DTV receivers is read from the serial output port of the RAM 24 to a second input port of the multiplexer 22.

Data concerning a third of the services to be transmitted for reception by M/H DTV receivers are written into storage locations within a dual-port random-access memory 25 via a random-access port thereof. Within each super-frame interval a successive time-slice of the third service for reception by M/H DTV receivers is read from the serial output port of the RAM 25 to a third input port of the multiplexer 22.

Data concerning a fourth of the services to be transmitted for reception by M/H DTV receivers are written into storage locations within a dual-port random-access memory 26 via a random-access port thereof. Within each super-frame interval a successive time-slice of the fourth service for reception by M/H DTV receivers is read from the serial output port of the RAM 26 to a fourth input port of the multiplexer 22.

Time-slices from four other services for reception by M/H receivers are supplied to fifth, sixth, seventh and eighth input ports, respectively, of the time-division multiplexer 22 from respective RAMs not explicitly depicted in FIG. 3. The respective time-slices from each of services for reception by M/H receivers that the multiplexer 22 assembles are supplied from the output port of the multiplexer 22 to the input port of an internet protocol encapsulator 27. The IPE 27 is the same in construction and operation as described supra with regard to the IPE 2 in FIG. 1. The output port of the IPE 27 connects to the input port of a data randomizer 28, the construction and operation of which are similar to those of the data randomizer 3 in FIG. 1. FIG. 3 shows the output port of the data randomizer 28 connected to the input port of a block de-interleaver 29 for bytes of time-slices. The block de-interleaver 29 is of matrix type and preferably is constructed from two banks of byte-organized dual-ported random-access memory. Each of these banks can have 35,717 m addressable byte-storage locations arranged in 187 m columns and 191 rows, m being a small positive integer. Byte-storage locations in a first bank of the RAM are written to during odd-numbered time-slice intervals, while byte-storage locations in the second bank of the RAM are read from. Byte-storage locations in the second bank of the RAM are written to during even-numbered time-slice intervals, while byte-storage locations in the first bank of the RAM are read from. The response of the data randomizer 28 is supplied to the random-access write-input port of the RAM to be written into byte-storage locations row by row in one of the banks of the RAM. After the 191 rows of byte-storage locations have been written or re-written by bytes of the data randomizer 28 response, the contents of the byte-storage locations are read column by column from the serial read-output port of the RAM to the input port of a TRS encoder 30, used for (255, 191) transverse Reed-Solomon (TRS) forward-error-correction (FEC) coding of the block de-interleaver 29 response.

The output port of the TRS encoder 30 is connected for supplying (255, 191) TRS codewords to the input port of a block interleaver 31 for bytes from those (255, 191) TRS codewords. The block interleaver 31 is of matrix type and preferably is constructed from two banks of byte-organized dual-ported random-access memory. Each of these banks can have 47,685 m addressable byte-storage locations arranged in 187 m columns and 255 rows. Byte-storage locations in a first bank of the RAM are written to during odd-numbered time-slice intervals, while byte-storage locations in the second bank of the RAM are read from. Byte-storage locations in the second bank of the RAM are written to during even-numbered time-slice intervals, while byte-storage locations in the first bank of the RAM are read from. The (255, 191) TRS codewords from the output port of the TRS encoder 30 are supplied to the random-access write-input port of the RAM to be written into byte-storage locations column by column. After the 187 m columns of byte-storage locations in a bank of the RAM have been written or re-written by respective (255, 191) TRS codewords, the contents of the byte-storage locations in that bank are read row by row from a serial read-output port of that bank to the output port of the block interleaver 31.

The codewords resulting from (255, 191) TRS coding of the initial three bytes of data-randomized IPE packets in a time-slice are the same for all time slices. So, a group or groups of three such codewords can be permanently stored in respective columns of byte-storage locations in each bank of memory in the block interleaver 31 for bytes of time-slices. That is, those byte-storage locations are not written to every time slice interval, but rather are read-only. This frees the TRS encoder 30 from having to code this group or these groups of three (255, 191) TRS codewords. Also, the block de-interleaver 29 for bytes of time-slices can omit actual byte-storage locations for the initial three bytes of data-randomized IPE packets.

FIG. 3 shows the output port of the block interleaver 31 connected to the input port of a byte de-interleaver 32. FIG. 3 further shows the output port of which is connected for supplying byte-deinterleaved data-randomized IPE packets to the input port of an LRS encoder 33 for (204, 188) lateral Reed-Solomon (LRS) forward-error-correction (FEC) coding. The output signal from the LRS encoder 33 reproduces the 188-byte segments of the byte de-interleaver 32 response, but appends to each of those 188-byte segments a respective set of sixteen parity bytes for the (204, 188) LRS FEC coding, as calculated by the LRS encoder 33. The output port of the LRS encoder 33 is connected for supplying the resulting (204, 188) LRS codewords as input signal to the input port of a convolutional byte interleaver 34, which is preferably similar in construction and operation to the convolutional byte interleaver 9. The output port of the convolutional byte interleaver 34 is connected for supplying its response to apparatus for further FEC coding of individual bits of that response, which apparatus can be as shown in FIG. 4 for example.

The pattern of byte de-interleaving the byte de-interleaver 32 employs is complementary to the pattern of byte interleaving employed by the subsequent convolutional byte interleaver 34. The byte de-interleaver 32 arranges for the convolutional byte interleaver 34 to provide "coded" or "implied" byte interleaving of (204, 188) LRS FEC codewords from the LRS encoder 33. Referring back to the TRS encoding operations, the pattern of byte de-interleaving the block interleaver 31 employs is complementary to the pattern of byte interleaving employed by the preceding block de-interleaver 29. The block de-interleaver 29 arranges for the block interleaver 31 to provide "coded" or "implied" byte interleaving of (255, 191) TRS FEC codewords from the TRS encoder 30. Some burst errors may exceed the error-correction capability of decoding the (204, 188) RS FEC codewords and may then also exceed the error-correction capability of decoding the (255, 191) RS FEC codewords. If the byte interleaving of (204, 188) LRS FEC codewords and of (255, 191) TRS FEC codewords at the transmitter is not "coded", byte de-interleaving in the receiver disperses burst errors that cannot be corrected among a greater number of IP packets than those affected by such burst error when initially received. With "coded" byte interleaving of the (204, 188) LRS FEC codewords and of the (255, 191) TRS FEC codewords, the DTV receiver can confine to fewer data-randomized IP packets those burst errors that cannot be corrected.

In less preferred COFDM DTV broadcasting systems, byte interleaving of the (204, 188) LRS FEC codewords is not coded. In such case the byte de-interleaver 32 is replaced by direct connection from the output port of the block interleaver 31 to the input port of the LRS encoder 33. If byte interleaving of the (204, 188) LRS FEC codewords is coded, the byte de-interleaver 32 is apt not to be an element separate from the block interleaver 31. The block de-interleaving previous to the LRS encoder 33 can instead be implemented by suitable read addressing of the banks of RAM in the block interleaver 31.

FIG. 4 shows apparatus for generating PCCC components and subsequent COFDM carriers subsequently transmitted over the air for reception by M/H receivers. The output port of the convolutional byte interleaver 34 shown in FIG. 3 is connected for supplying the response therefrom to the input port of a PCCC encoder 35 shown in FIG. 4. The PCCC encoder 35 generates one-third-code-rate parallel concatenated convolutional coding that is supplied from its output port to the input port of a constellation mapper 36 for square 64QAM symbol constellations. The nature of preferred square 64QAM symbol constellations and the Gray mapping used in them are disclosed in detail in the above-referenced U.S. patent application Ser. No. 13/493,198 filed 11 Jun. 2012.

The output port of the constellation mapper 36 is connected to the input port of a parser 37 for effective OFDM symbol blocks. The block parser 37 parses a stream of complex samples supplied from the constellation mapper 36 into uniform-length sequences of complex samples, each of which sequences is associated with a respective effective OFDM symbol. The output port of the block parser 37 is connected to a first input port of a pilot and TPS signal insertion unit 38, a second input port of which unit 38 is connected to receive Transmission Parameters Signaling (TPS) bits from a TPS signal generator 39. The pilot and TPS signal insertion unit 38 inserts these TPS bits, which are to be transported by dedicated carriers (TPS Pilots), into each effective OFDM symbol block. The pilot and TPS signal insertion unit 38 inserts other bits descriptive of unmodulated carriers of predetermined amplitude and predetermined phase into each effective OFDM symbol block. An output port of the pilot and TPS signal insertion unit 38 is connected for supplying the effective OFDM symbol blocks with pilot carriers inserted therein to the input port of an OFDM modulator 40. The OFDM modulator 40 has 4K carriers capability, suitable for transmissions to M/H DTV receivers.

The OFDM modulator 40 includes a serial-to-parallel converter for converting the serially generated complex digital samples of the effective OFDM symbols to parallel complex digital samples for inverse discrete Fourier transformation (I-DFT). The OFDM modulator 40 further includes a parallel-to-serial converter for converting the parallel complex digital samples of the I-DFT results to serial complex digital samples of the I-DFT results supplied from the output port of the OFDM modulator 40 to the input port of a guard-interval-and-cyclic-prefix-insertion unit 41. The output port of the guard-interval-and-cyclic-prefix-insertion unit 41 is connected for supplying successive complex digital samples of a COFDM signal to a second input port of the all-services multiplexer 17.

Figure 5:
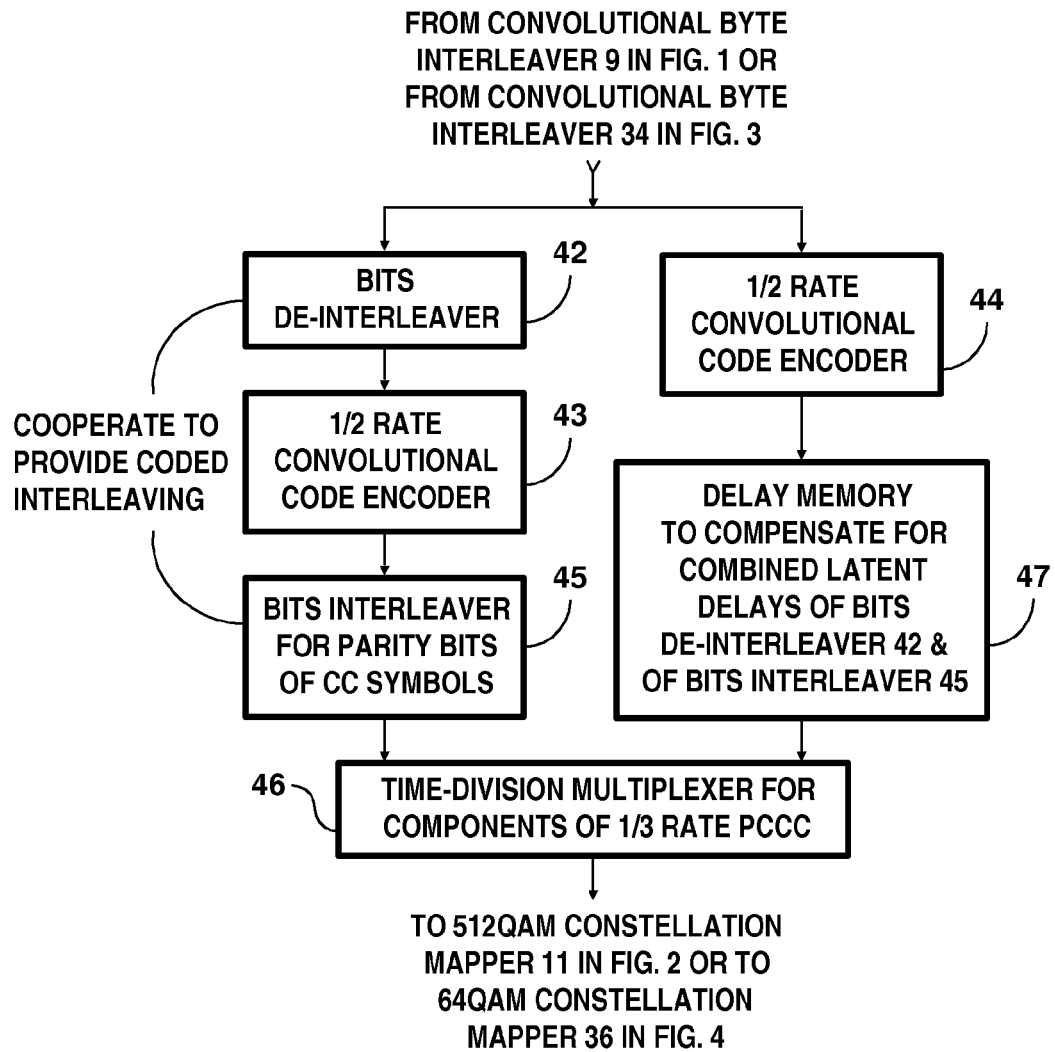
Figure 6:
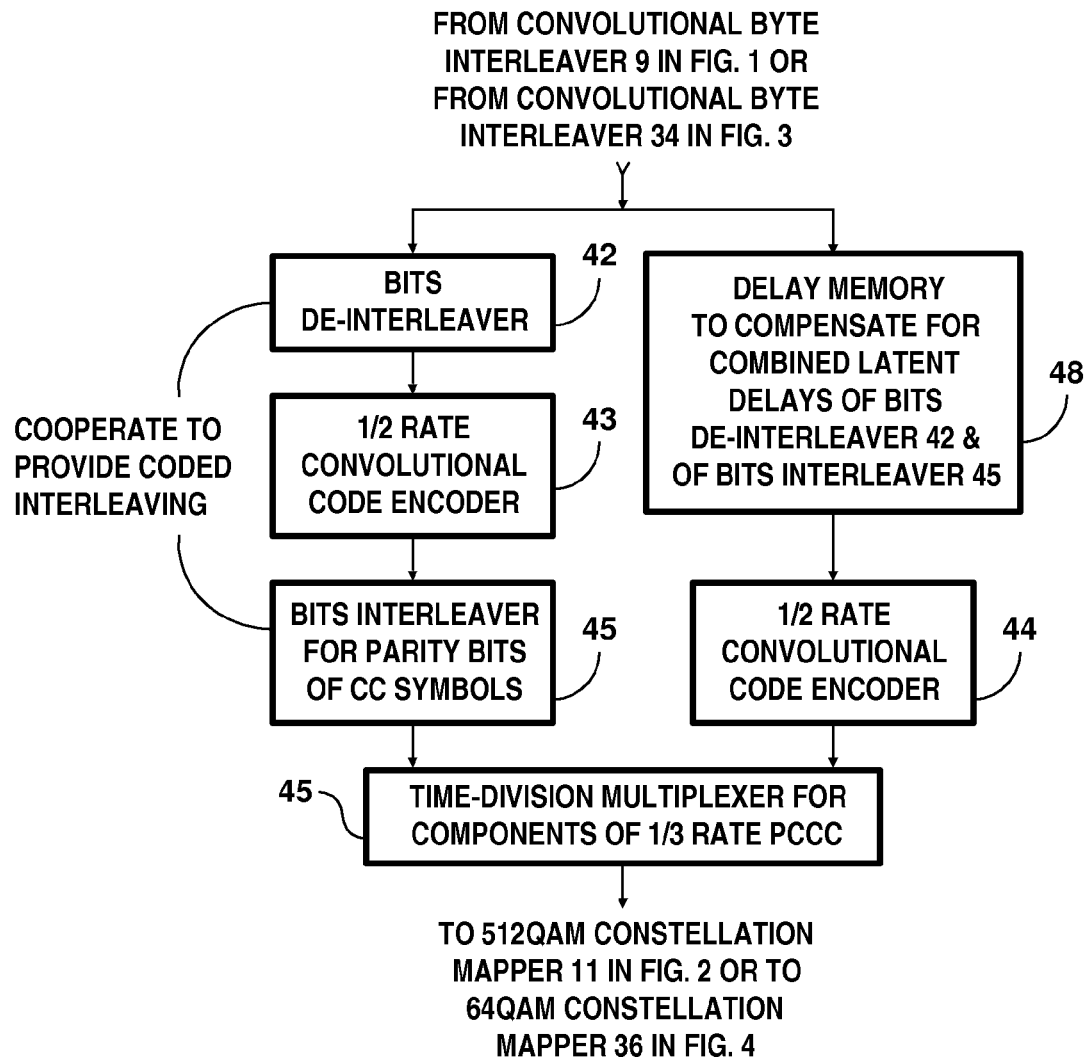
Figure 7:
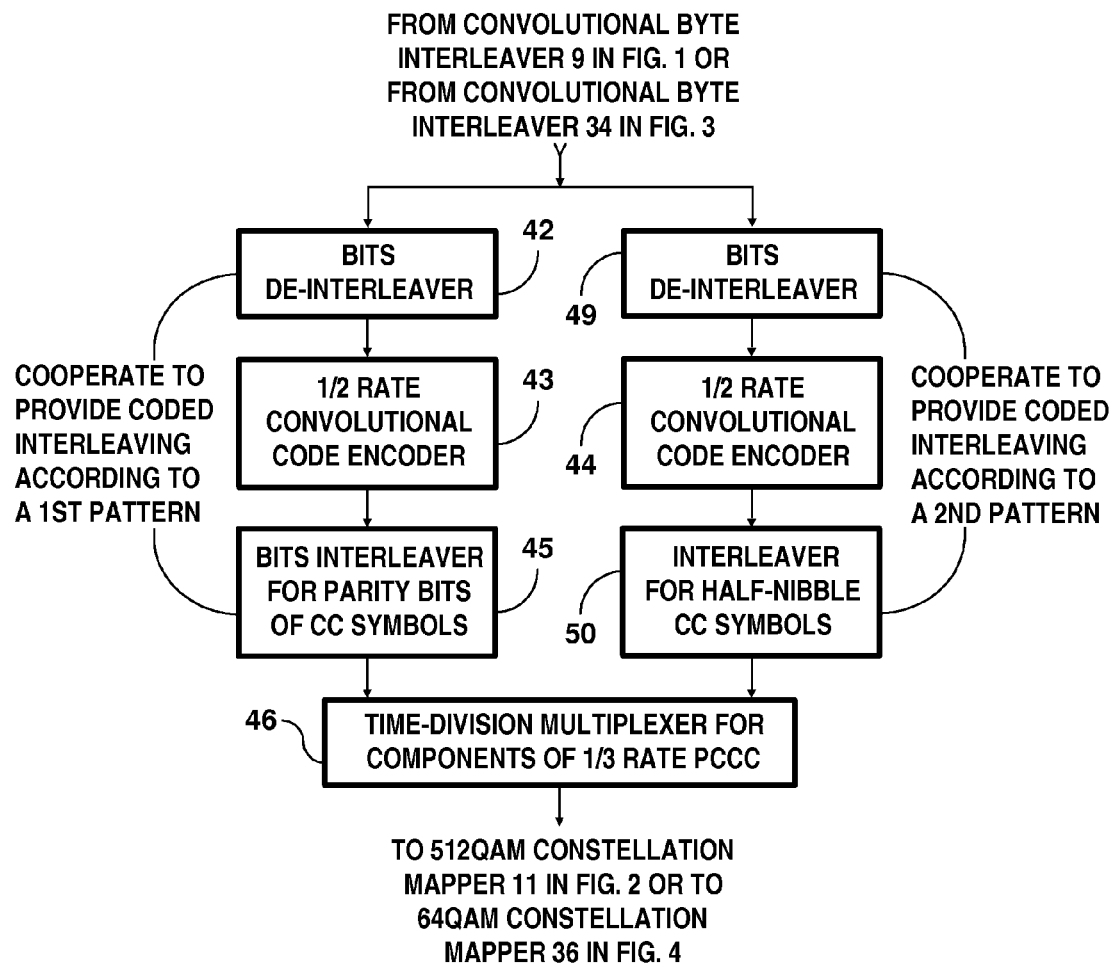

FIGS. 5, 6 and 7 each depict a respective encoder for one-third-code-rate PCCC that can be used in either of the portions of a COFDM transmitter depicted in FIGS. 2 and 4 in place of encoders for one-third-code-rate PCCC known from the prior art. Each of the PCCC encoders depicted in FIGS. 5, 6 and 7 is novel in that it includes a bits de-interleaver 42 to cause the symbol interleaving of a first set of parity bytes that are a component of the PCCC to be "implied" or "coded" interleaving. These new forms of PCCC allow simplification in the design of receivers of the COFDM transmissions originating from either of the portions of a COFDM transmitter depicted in FIGS. 2 and 4.

Each of the PCCC encoders depicted in FIGS. 5, 6 and 7 includes the bits de-interleaver 42, encoders 43 and 44 for one-half-code-rate convolutional coding (CC), a bits interleaver 45, and a time-division multiplexer 46 for interleaving components of the one-third-code-rate PCCC. The bits de-interleaver 42 is typically constructed using dual-ported random-access memory having a random-access input port connected for receiving the response from the convolutional byte interleaver 9 of the FIG. 1 portion of a COFDM transmitter or the response from the convolutional byte interleaver 34 of the FIG. 3 portion of a COFDM transmitter. The serial output port of this RAM is then connected for supplying the bits de-interleaved response of the byte interleaver 9 or 34 to the input port of the CC encoder 43. The output port of the CC encoder 43 connects to the input port of the interleaver 45 for parity bits of the half-nibble CC symbols that the CC encoder 43 generates. The bits interleaver 45 is typically constructed using dual-ported random-access memory having a random-access input port connected for receiving the parity bits generated by the CC encoder 43. The serial output port of this RAM is then connected for supplying the interleaved parity bits in the interleaver 45 response to a first of two input ports of the time-division multiplexer 46.

In the FIG. 5 PCCC encoder the input port of the CC encoder 44 is connected for directly receiving the response from the convolutional byte interleaver 9 of the FIG. 2 portion of a COFDM transmitter or the response from the convolutional byte interleaver 34 of the FIG. 4 portion of a COFDM transmitter. The output port of the CC encoder 44 connects to the input port of a delay memory 47, the output port of which connects to the second input port of the time-division multiplexer 46. The delay memory 47 has temporary-storage capability to delay the half-nibble symbols of CC encoder 44 response so as to compensate for the combined latent delays of the bits de-interleaver 42 and the bits interleaver 45.

In a variant of the FIG. 5 PCCC encoder, the bits interleaver 45 is replaced by a symbols interleaver that interleaves de-interleaved CC data bits as well as parity bits supplied from the output port of the CC encoder 43. Then, the delay memory 47 need only have the temporary-storage capability to delay the parity bits generated by the CC encoder 44. The parity bits supplied from the output port of the CC encoder 44 as delayed by
the delay memory 47 for application to the second input port of the time-division multiplexer 46 are then time-interleaved by the multiplexer 46 with the output symbols from the CC encoder 43 as symbol-interleaved for application to the first input port of the multiplexer 46.

The FIG. 6 PCCC encoder differs from the FIG. 5 PCCC encoder in that a delay memory 48 delays the response from the convolutional byte interleaver 9 of the FIG. 2 portion of a COFDM transmitter or the response from the convolutional byte interleaver 34 of the FIG. 4 portion of a COFDM transmitter before that response is supplied to the input port of the CC encoder 44. The delay memory 47 is omitted, and the output port of the CC encoder 44 connects directly to the second input port of the time-division multiplexer 46. The delay memory 48 delays the CC encoder 44 response indirectly, to compensate for the combined latent delays of the bits de-interleaver 42 and the bits interleaver 45. Overall, the FIG. 6 PCCC encoder requires less temporary storage for bits than the FIG. 5 PCCC encoder, and accordingly is preferred over the FIG. 5 PCCC encoder. Modifications of the FIG. 5 and FIG. 6 PCCC encoders that replace the bits de-interleaver 42 in each of them by a respective direct connection results in previously known forms of PCCC encoder. Using either of these previously known forms of PCCC encoder complicates turbo decoding in DTV receivers to some extent.

The FIG. 7 PCCC encoder uses neither the delay memory 47 nor the delay memory 48 to compensate for the combined latent delays of the bits de-interleaver 42 and the bits interleaver 45. Instead, the CC encoder 44 is preceded by another bits de-interleaver 49 and succeeded by an interleaver 50 for the half-nibble CC symbols that the CC encoder 44 generates. The bits de-interleaver 49 and the symbols interleaver 50 provide coded interleaving of the CC symbols generated by the CC encoder 44, which coded interleaving is performed in accordance with a second pattern. This second pattern differs from the first pattern of coded interleaving according to which the bits de-interleaver 42 and the bits interleaver 45 perform. The first and second patterns of coded interleaving are chosen to provide substantial temporal diversity between the parity bits from the two CC encoders 43 and 44.

The bits de-interleaver 49 is typically constructed using dual-ported random-access memory having a random-access input port connected for receiving the response from the convolutional byte interleaver 9 of the FIG. 2 portion of a COFDM transmitter or the response from the convolutional byte interleaver 34 of the FIG. 4 portion of a COFDM transmitter. The serial output port of this RAM is then connected for supplying the bits de-interleaved response of the byte interleaver 9 or 34 to the input port of the CC encoder 44. The output port of the CC encoder 44 connects to the input port of the interleaver 50 for half-nibble CC symbols. The symbols interleaver 50 is typically constructed using dual-ported RAM having a random-access input port connected for receiving the half-nibble CC symbols generated by the CC encoder 44. The serial output port of this RAM is then connected for supplying the interleaved half-nibble CC symbols of interleaver 50 response to the second input port of the time-division multiplexer 46.

The coded bits interleaving employed by each of PCCC encoders depicted in FIGS. 5, 6 and 7 follows at least one convolutional coding procedure with bits interleaving, which provides the following benefit during DTV reception. De-interleaving of the bits interleaving at a DTV receiver disperses burst noise before decoding the convolutional coding, resulting in bit errors being more likely to be occasional errors which a decoder for the convolutional coding is better able to correct than a sequence of frequent bit errors. Convolutional coding, which has customarily been viewed as implementing the correction of bit errors caused by additive White Gaussian noise (AWGN) or its like, acquires some capability for the correction of burst errors when combined with coded bits interleaving or coded half-nibble-symbols interleaving. Such coded interleaving further accommodates DTV reception in that it facilitates bits re-interleaving following decoding of the convolutional coding, which bits re-interleaving regroups back into bursts those data bits that convolutional coding is unable to correct. This reduces the number of bytes corrupted by data bits that convolutional coding is unable to correct, which reduction makes it less difficult for the DTV receiver subsequently to decode Reed-Solomon coding. The FIG. 7 PCCC encoder secures these benefits for both component convolutional codes and is preferred over other known types of one-third-rate PCCC encoders for this reason. Less preferred DTV receivers embodying other aspects of the invention are configured for receiving baseband DTV signals broadcast from DTV transmitters that just use bits interleaving before convolutional coding of PCCC components, rather than using coded bits interleaving or coded half-nibble-symbols interleaving.

Conventional PCCC encoders comprise a first encoder for convolutional coding of the data in original bit-order, a bits interleaver for rearranging the bits of data from their original order and a second encoder for convolutional coding of the interleaved data. The two encoders generate recursive systematic convolutional (RSC) codes. Usually, the data in original bit-order are transmitted as part of the PCCC, but the data in interleaved bit-order are not transmitted. The design of the bits interleaver used before the second convolutional coder is a matter of particular concern insofar as obtaining the most "interleaver gain" and the best performance of the PCCC. The design of the bits de-interleaver 42 in each of the FIG. 5 and FIG. 6 PCCC encoders can be similar to that for the bits interleaver in a conventional PCCC encoder. The design for the bits de-interleaver 62 depicted in FIGS. 9 and 11 can be similar, also, and so can the design for the bits de-interleaver 100 depicted in FIGS. 14 and 16.

The FIG. 7 PCCC encoder presents a more challenging design problem. The bits de-interleavers 42 and 49 can take the general form of a block bits interleaver. A block bits interleaver or de-interleaver employs a respective random-access memory (RAM) with bit storage locations addressable by row and by column. The addressing of the bit storage locations in the RAM during their writing differs from the addressing during their being read from. It is somewhat more convenient that the RAM be dual-ported, having a random-access input port for receiving bits to be written to bit-storage locations specified by write addressing, and having a serial output port from which the temporarily stored contents of each successive row of bit-storage locations are read seriatim after their transfer to a parallel-in/serial-out register. The design of the bits de-interleavers 42 and 49 so they support different patterns of bit interleaving could then be approached by write addressing the RAM in the bits de-interleaver 49 so as to mirror the write addressing of the RAM in the bits de-interleaver 42. A preferred approach is use the same write addressing for both RAMs, but to read the temporarily stored contents of each successive row of bit-storage locations of the RAM in the bits de-interleaver 49 in opposite order from reading the temporarily stored contents of each successive row of bit-storage locations of the RAM in the bits de-interleaver 42. This reduces the amount of hardware to generate write addressing for the RAMs in the bits de-interleavers 42 and 49. A still better design replaces the two dual-port RAMs in the bits de-interleavers 42 and 49 with a single triple port RAM that incorporates two parallel-in/serial-out registers for respectively supplying the response of the bits de-interleaver 42 and the response of the bits de-interleaver 49.

Proceeding further with design of a FIG. 7 PCCC encoder, it is known that block bit interleavers of matrix type, in which the bit-storage locations in the RAMs therein are addressed column by column, do not secure as good turbo decoding results as block bit interleavers of other types. S. Crozier, J. Lodge, P. Guinand and A. Hunt describe a dithered golden interleaver that provides superior performance, especially for low code rates and large block sizes in their paper "Performance of Turbo-Codes with Relative Prime and Golden Interleaving Strategies", Sixth International Mobile Satellite Conference (IMSC'99), Ottawa, Canada, pp. 268-275, Jun. 16-18, 1999. Stewart N. Crozier describes a dithered diagonal interleaver that provides excellent performance, particularly for small interleaver sizes, in his paper "New High-Spread High-Distance Interleavers for Turbo-Codes", 20th Biennial Symposium on Communications, Kingston, Ontario, Canada, pp. 3-7, May 28-31, 2000. Crozier reports performance better than obtainable with S-random interleavers. Crozier reports the dithered golden interleaver and the dithered diagonal interleaver are each readily implemented in practice.

Figure 10:
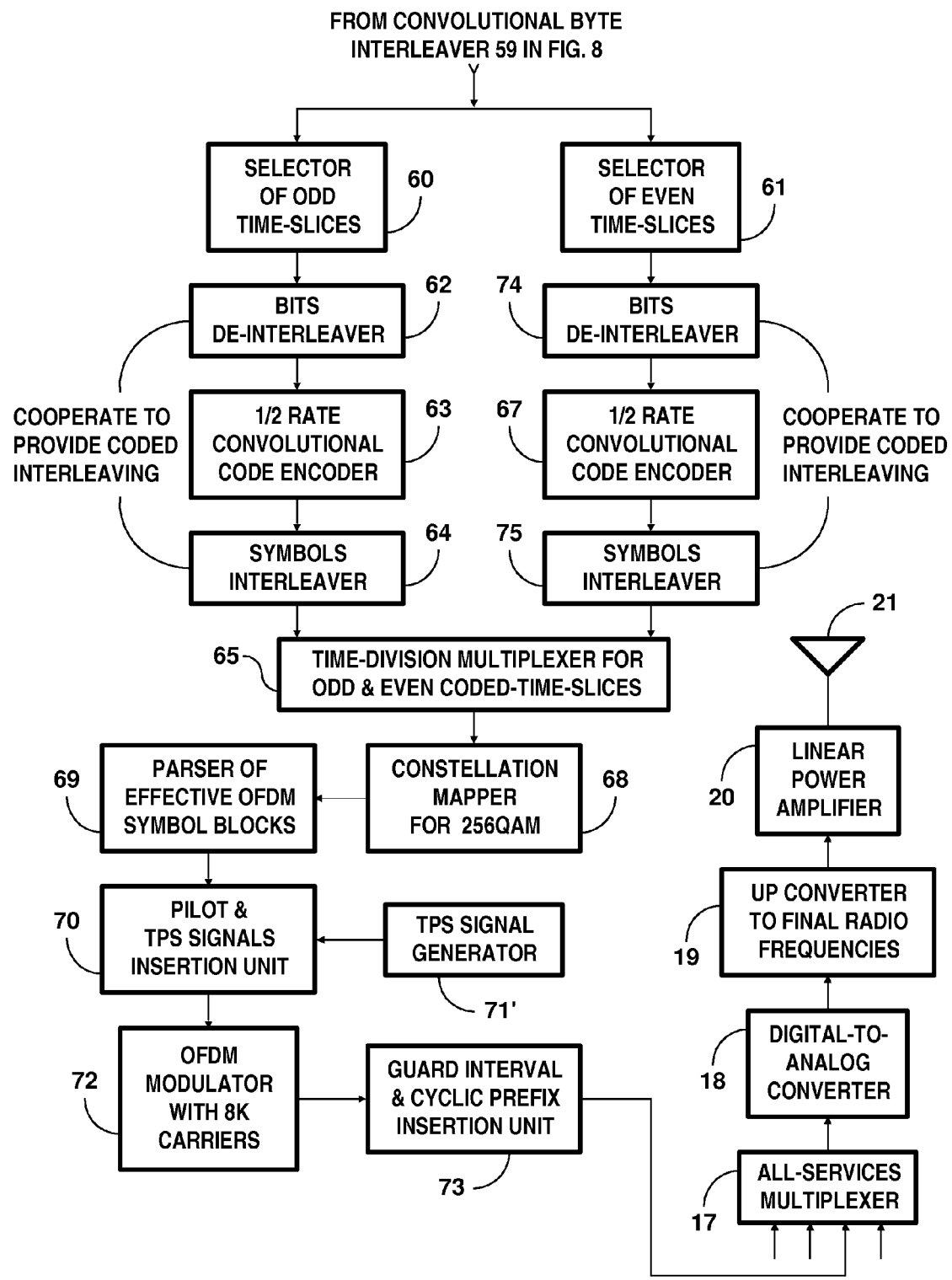
FIG. 10 is a schematic diagram of a modification of the FIG. 9 portion of a COFDM transmitter for a DTV system, in which both one-half-code-rate convolutional-coded Reed-Solomon codewords transmitted for iterative-diversity reception employ coded bit interleaving.
Figure 12:
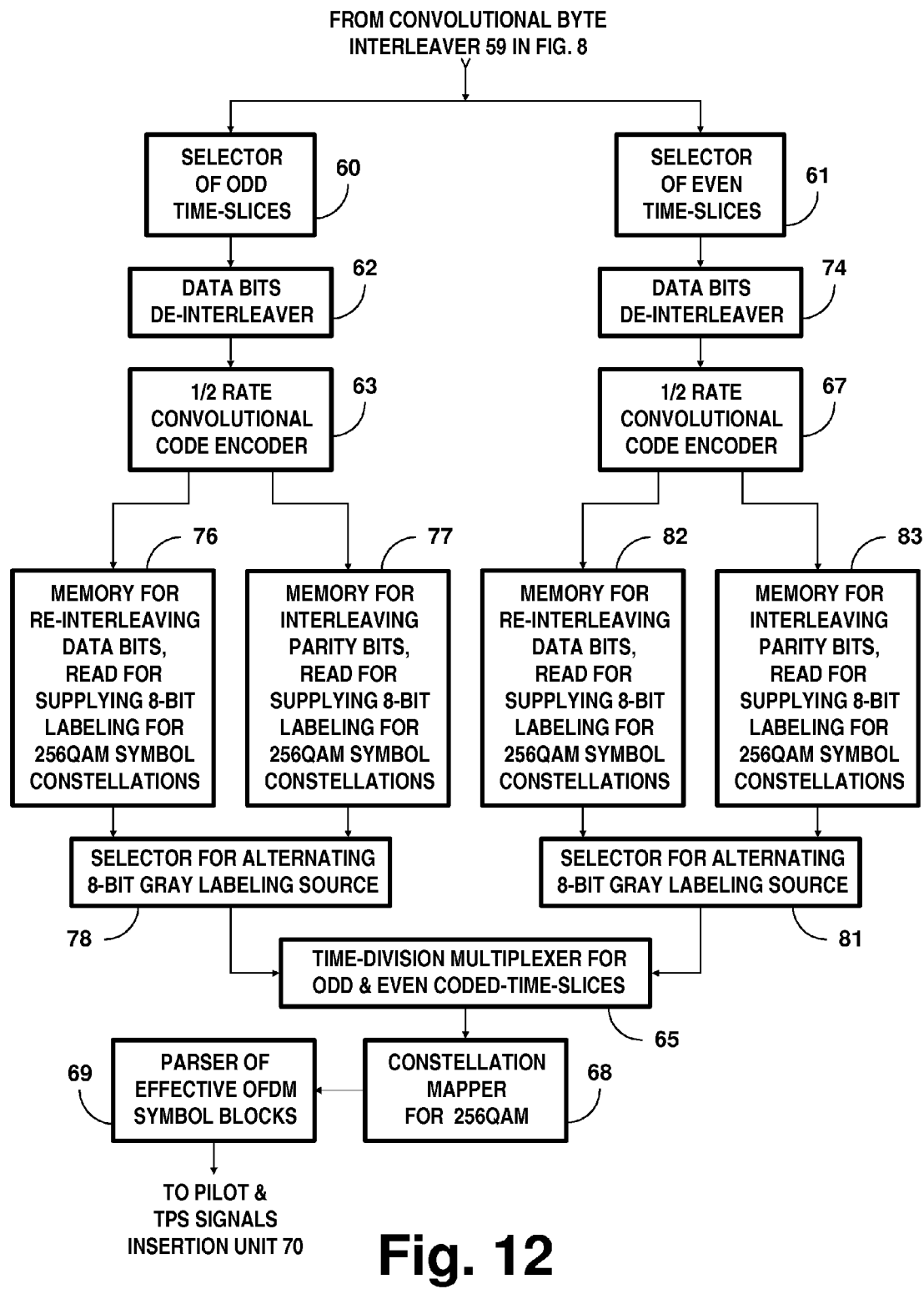
FIG. 12 is a schematic diagram of a modification of the FIG. 10 portion of a COFDM transmitter for a DTV system, in which the data bits of the one-half-code-rate convolutional-coded Reed-Solomon codewords are mapped into different QAM symbol constellations than the parity bits are for modulating COFDM carriers.

Accordingly, the bits de-interleavers 42 and 49 in the FIG. 7 PCCC encoder are preferably designed to provide mirrored dithered diagonal de-interleaving. Preferably, the bits de-interleavers 62 and 74 depicted in FIGS. 10 and 12 are similar in design to the bits de-interleavers 42 and 49, respectively. Preferably, also, the bits de-interleavers 100 and 112 depicted in FIGS. 15 and 17 are similar in design to the bits de-interleavers 42 and 49, respectively.

The FIG. 7 PCCC encoder supplies one-third-rate PCCC either to a 512QAM symbol constellation mapper 11 that maps 9-bit input addresses or to a 64QAM symbol constellation mapper 36 that maps 6-bit input addresses. The size of memory associated with each of the bits de-interleavers 42 and 49, which will be replicated in every DTV receiver, should be large enough that the parity bits associated with the data bits in a corrupted QAM symbol or two will be spread well away from those data bits in each of the respective responses of those de-interleavers. A RAM with 256 addressable bit-storage locations should be large enough to support the bits de-interleavers 42 and 49.

Figure 8:
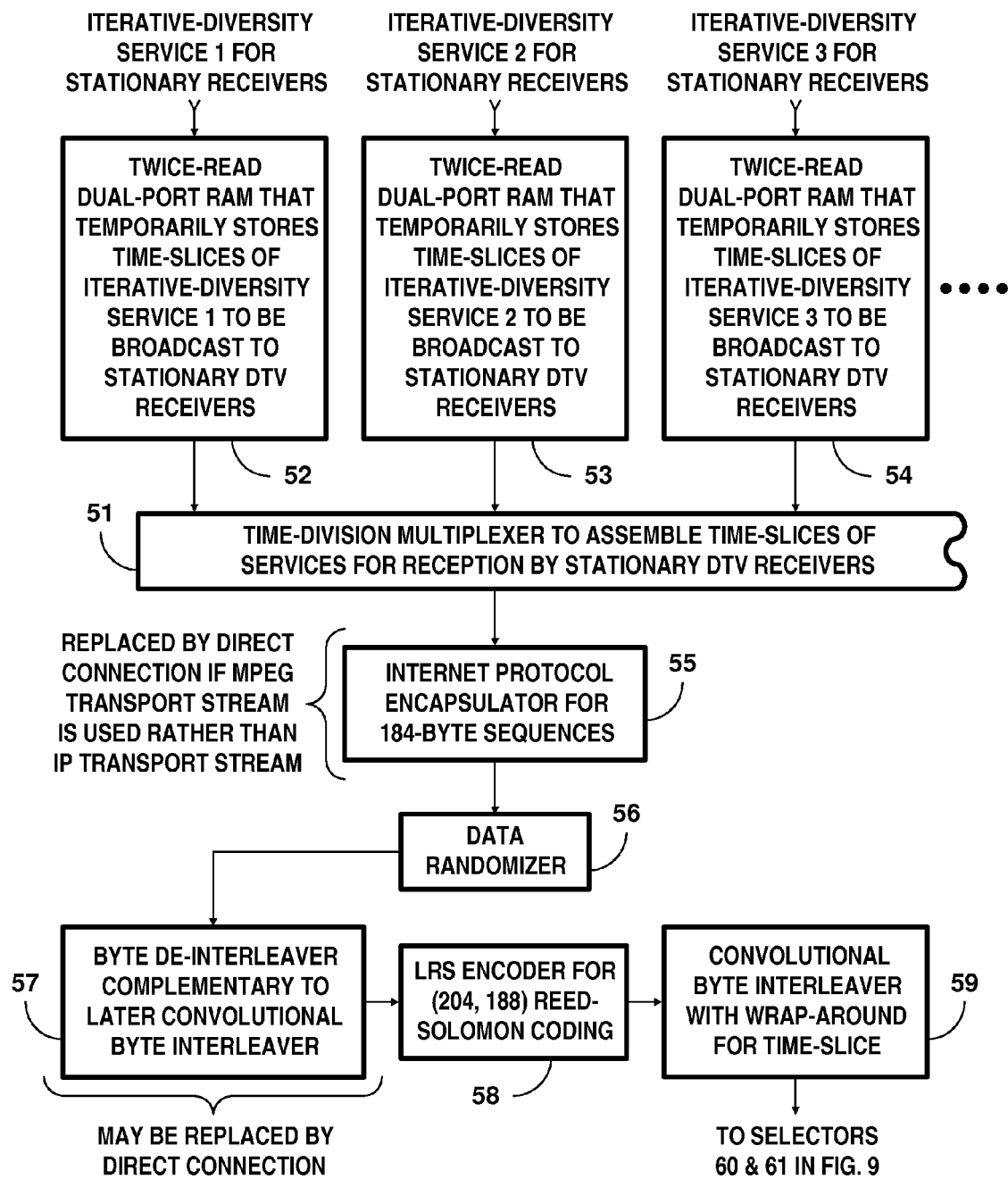
Figure 9:
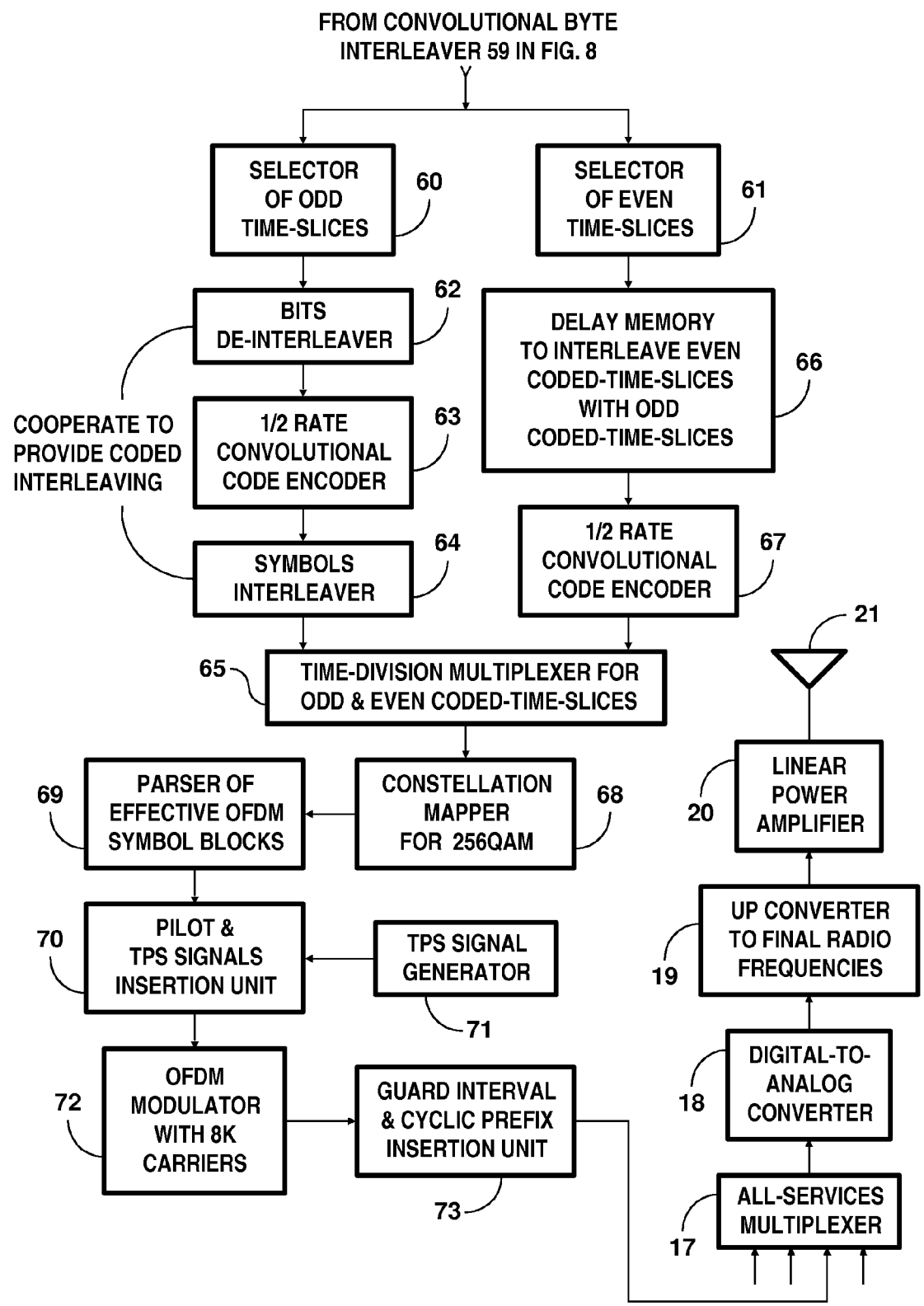

FIGS. 8 and 9 together show a portion of a DTV transmitter generating COFDM signals for iterative-diversity reception by stationary DTV receivers. Apparatus for generating PCCC and subsequent COFDM carriers is shown in FIG. 9. FIG. 8 depicts apparatus for processing frames of services to be broadcast to stationary DTV receivers for iterative-diversity reception.

A time-division multiplexer 51 for interleaving time-slices of services to be broadcast to stationary DTV receivers is depicted at the middle of FIG. 8. The time-division multiplexer 51 successively selects time-slices of these various services to be reproduced in its response, which is supplied from its output port. That is, the multiplexer 51 is connected for performing the time-division multiplexing time-slice by time-slice—i.e., one-eighth frame by one-eighth frame. There are various ways that the multiplexer 51 could time-division multiplex earlier and later transmissions of data scheduled for iterative-diversity reception by stationary DTV receivers. Time-division multiplexing could be done on a frame-by-frame basis, for example, as done in DVB-T practice. However, time-division multiplexing time-slice by time-slice is preferred, partly because it can afford greater flexibility to the broadcasting system insofar as scheduling different services is concerned, provided that the nature of that multiplexing is signaled. The three frames scheduled for reception by stationary DTV receivers altogether contain twenty-four time-slices. By way of example, these twenty-four time-slices can be reapportioned among four services, each provided with only six time-slices per super-frame, rather than eight time-slices per super-frame. Alternatively, adjustments of the time-division multiplexing can be made to take into account whether high-definition or standard-definition DTV signals are transmitted. Remnant pairs of time-slices left over from the services scheduled for reception by stationary DTV receivers can be scheduled for reception by M/H receivers.

Data concerning a first of the services to be transmitted twice to enable iterative-diversity reception by stationary DTV receivers are written to a dual-port random-access memory 52 via a random-access port thereof. The RAM 52 is capable of temporarily storing a number of time-slices of that service. Successive time-slices of that service are read from the serial output port of the RAM 52, ordinarily four odd-numbered time-slices in a single frame per super-frame, to a first input port of the multiplexer 52. After a delay of one time-slice more than N super-frames, the same successive time-slices of that first service are read again from the serial output port of the RAM 52 to enable iterative-diversity reception by stationary DTV receivers. Typically, there are several super-frames between the two transmissions, N being eight or more.

Data concerning a second of the services to be transmitted twice to enable iterative-diversity reception by stationary DTV receivers are written to a dual-port random-access memory 53 via a random-access port thereof. The RAM 53 is capable of temporarily storing a number of time-slices of that service. Successive time-slices of that service are read from the serial output port of the RAM 53, ordinarily four odd-numbered time-slices in a single frame per super-frame, to a second input port of the multiplexer 51. After a delay of one time-slice more than N super-frames, the same successive time-slices of that second service are read again from the serial output port of the RAM 53 to enable iterative-diversity reception by stationary DTV receivers.

Data concerning a third of the services to be transmitted twice to enable iterative-diversity reception by stationary DTV receivers are written to a dual-port random-access memory 54 via a random-access port thereof. The RAM 54 is capable of temporarily storing a number of time-slices of that service. Successive time-slices of that service are read from the serial output port of the RAM 54, ordinarily four odd-numbered time-slices in a single frame per super-frame, to a third input port of the multiplexer 51. After a delay of one time-slice more than N super-frames, the same successive time-slices of that third service are read again from the serial output port of the RAM 54 to enable iterative-diversity reception by stationary DTV receivers. If the DTV transmitter does not transmit services for reception by M/H receivers, data concerning a fourth service transmitted twice to enable iterative-diversity reception by stationary DTV receivers are read to a fourth input port of the multiplexer 51 from a dual-port random-access memory that FIG. 8 does not show.

FIG. 8 shows the output port of the multiplexer 51 connected to the input port of an internet protocol encapsulator 55, the output port of which IPE 55 connects to the input port of a data randomizer 56. The internet protocol encapsulator 55 is used only if the services for reception by stationary DTV receivers use internet-protocol (IP) transport-stream (TS) packets, which packets have varying lengths. If the original format for services broadcast for reception by stationary DTV receivers is composed of successive MPEG-2 TS packets, rather than successive IP TS packets, the IPE 55 is either selectively by-passed or is replaced by a direct connection from the output port of multiplexer 51 to the input port of the data randomizer 56. The IPE 55 and the data randomizer 56 are similar in their structures and operations to the IPE 2 and the data randomizer 3, respectively, depicted in FIG. 1. The bits of the concluding 187-byte portion of each of the data packets supplied to the input port of the data randomizer 56 are exclusive-ORed with a prescribed repeating pseudo-random binary sequence (PRBS) in the data randomizer 56. However, initial synchronizing bytes accompanying the data packets are excluded from such data randomization procedure. The 16-bit register used to generate the PRBS for data randomization is reset to initial condition at the beginning of each time-slice supplied from the multiplexer 51.

If the services broadcast for reception by stationary DTV receivers employ IP TS packets, preferably the output port of the data randomizer 56 is connected for supplying data-randomized IPE packets to the input port of a byte de-interleaver 57. The output port of the byte de-interleaver 57 is then connected for supplying its byte-interleaved response to the input port of a LRS encoder 58 for (204, 188) lateral Reed-Solomon (LRS) forward-error-correction (FEC) coding. The output port of the LRS encoder 58 is connected for supplying successively generated (204, 188) LRS FEC codewords to the input port of a convolutional byte interleaver 59. The pattern of byte de-interleaving that the byte de-interleaver 57 employs is complementary to the pattern of byte interleaving employed by the subsequent convolutional byte interleaver 59. The patterns are the same as those used in the byte de-interleaver 7 and the convolutional byte interleaver 9 depicted in FIG. 1. The byte de-interleaver 57 arranges for the convolutional byte interleaver 59 to provide "coded" or "implied" byte interleaving of (204, 188) LRS FEC codewords from the LRS encoder 58. If the original format for services broadcast for reception by stationary DTV receivers is composed of successive MPEG-2 TS packets, rather than successive IP TS packets, the byte de-interleaver 57 is either selectively by-passed or is replaced by a direct connection from the output port of the data randomizer 57 to the input port of the LRS encoder 58.

FIG. 9 shows apparatus for generating PCCC components and subsequent COFDM carriers subsequently transmitted over the air for iterative-diversity reception by stationary DTV receivers. The output port of the convolutional byte interleaver 59 shown in FIG. 8 is connected for supplying the response therefrom to the respective input ports of selectors 60 and 61 shown in FIG. 9. The selector 60 selectively responds to the convolutionally byte-interleaved (204, 188) LRS codewords of odd-numbered time-slices supplied to its input port, reproducing them in bit-serial form at its output port. The selector 61 selectively responds to the convolutionally byte-interleaved (204, 188) LRS codewords of even-numbered time-slices supplied to its input port, reproducing them in bit-serial form at its output port.

The bit-serial, convolutionally byte-interleaved (204, 188) LRS codewords of odd-numbered time-slices are supplied from the output port of the selector 60 to the input port of a bits de-interleaver 62. The output port of the bits de-interleaver 62 is connected for supplying bit de-interleaved response to the input port of a CC encoder 63 for one-half-rate convolutional coding (CC). The output port of the CC encoder 63 is connected for supplying one-half-rate convolutional coding to the input port of a symbols interleaver 64. The bits de-interleaver 62 and the symbols interleaver 64 cooperate to provide coded (or "implied") interleaving of the data bits and parity bits of the convolutional coding from the output port of the symbols interleaver 64. The symbols interleaver 64 interleaves half-nibble symbols in a way complementary to the way that the bits de-interleaver 62 de-interleaves data bits supplied to the CC encoder 63 for one-half-rate CC. Accordingly, data bits appear in their original order in the symbol-interleaved one-half-rate CC supplied from the output port of the symbols interleaver 64 to a first of two input ports of a time-division multiplexer 65 for odd-numbered and even-numbered coded time-slices.

The bit-serial, convolutionally byte-interleaved (204, 188) LRS codewords of even-numbered time-slices are supplied from the output port of the selector 61 to the input port of a delay memory 66. The output port of the delay memory 66 is connected to the input port of a CC encoder 67 for one-half-rate convolutional coding (CC). The CC encoder 67 is similar in construction and operation to the CC encoder 63. The output port of the CC encoder 67 is connected for supplying one-half-rate CC to the second input port of the time-division multiplexer 65 for odd-numbered and even-numbered coded time-slices. The delay memory 67 provides delay that compensates for the latent delays in the bits de-interleaver 62 and the symbols interleaver 64. So, coded even-numbered time-slices that the CC encoder 67 supplies to the second input port of the time-division multiplexer 65 interleave in time with the odd-numbered coded time-slices that the symbols interleaver 64 supplies to the first input port of the time-division multiplexer 65.

The output port of the multiplexer 65 is connected for supplying the time-division-multiplexed odd-numbered and even-numbered coded time-slices to the input port of a constellation mapper 68 for 256QAM symbol constellations. The nature of the preferred square 256QAM symbol constellations and the Gray mapping used in them are disclosed in detail in the above-referenced U.S. patent application Ser. No. 13/493,198 filed 11 Jun. 2012. The output port of the constellation mapper 68 is connected to the input port of a parser 69 for effective OFDM symbol blocks. The block parser 69 parses a stream of complex samples supplied from the constellation mapper 68 into uniform-length sequences of complex samples, each of which sequences is associated with a respective effective OFDM symbol. The output port of the block parser 69 is connected to a first input port of a pilot and TPS signal insertion unit 70, a second input port of which unit 70 is connected to receive Transmission Parameters Signaling (TPS) bits from a TPS signal generator 71. The pilot and TPS signal insertion unit 70 inserts these TPS bits, which are to be transported by modulated dedicated carriers (TPS Pilots), into each effective OFDM symbol block. The pilot and TPS signal insertion unit 70 inserts other bits descriptive of unmodulated carriers of predetermined amplitude and predetermined phase into each effective OFDM symbol block. An output port of the pilot and TPS signal insertion unit 70 is connected for supplying the effective OFDM symbol blocks, with pilot carriers inserted therein, to the input port of an OFDM modulator 72. The OFDM modulator 72 has 8K carriers capability, suitable for transmissions to stationary DTV receivers.

The OFDM modulator 72 includes a serial-to-parallel converter for converting the serially generated complex digital samples of the effective OFDM symbols to parallel complex digital samples for inverse discrete Fourier transformation (I-DFT). The OFDM modulator 72 further includes a parallel-to-serial converter for converting the parallel complex digital samples of the I-DFT results to serial complex digital samples of the I-DFT results supplied from the output port of the OFDM modulator 72 to the input port of a guard-interval-and-cyclic-prefix insertion unit 73. The output port of the guard-interval-and-cyclic-prefix insertion unit 73 is connected for supplying successive complex digital samples of a COFDM signal to a third input port of the all-services multiplexer 17.

FIG. 10 shows a modification of the FIG. 9 portion of the DTV transmitter, which modification generates PCCC in which the first and second sets of parity bits have different coded interleaving. The output port of the selector 61 of even-numbered time-slices connects to the input port of a bits de-interleaver 74, and the output port of the bits de-interleaver 74 connects to the input port of the CC encoder 67 for one-half-rate convolutional coding. The output port of the CC encoder 67 connects to the input port of a symbols interleaver 75, the output port of which connects to the second input port of the time-division multiplexer 65 for odd-numbered and even-numbered coded time-slices. The bits de-interleaver 74 and the symbols interleaver 75 provide a different pattern of coded interleaving than the bits de-interleaver 62 and the symbols interleaver 64 do. Even-numbered coded time-slices can inherently interleave with odd-numbered coded time-slices in this modification, so the modified portion of the DTV transmitter depicted in FIG. 10 need not include delay memory for this purpose (as provided for by the delay memory 66 in the FIG. 9 portion of the DTV transmitter).

Figure 11:
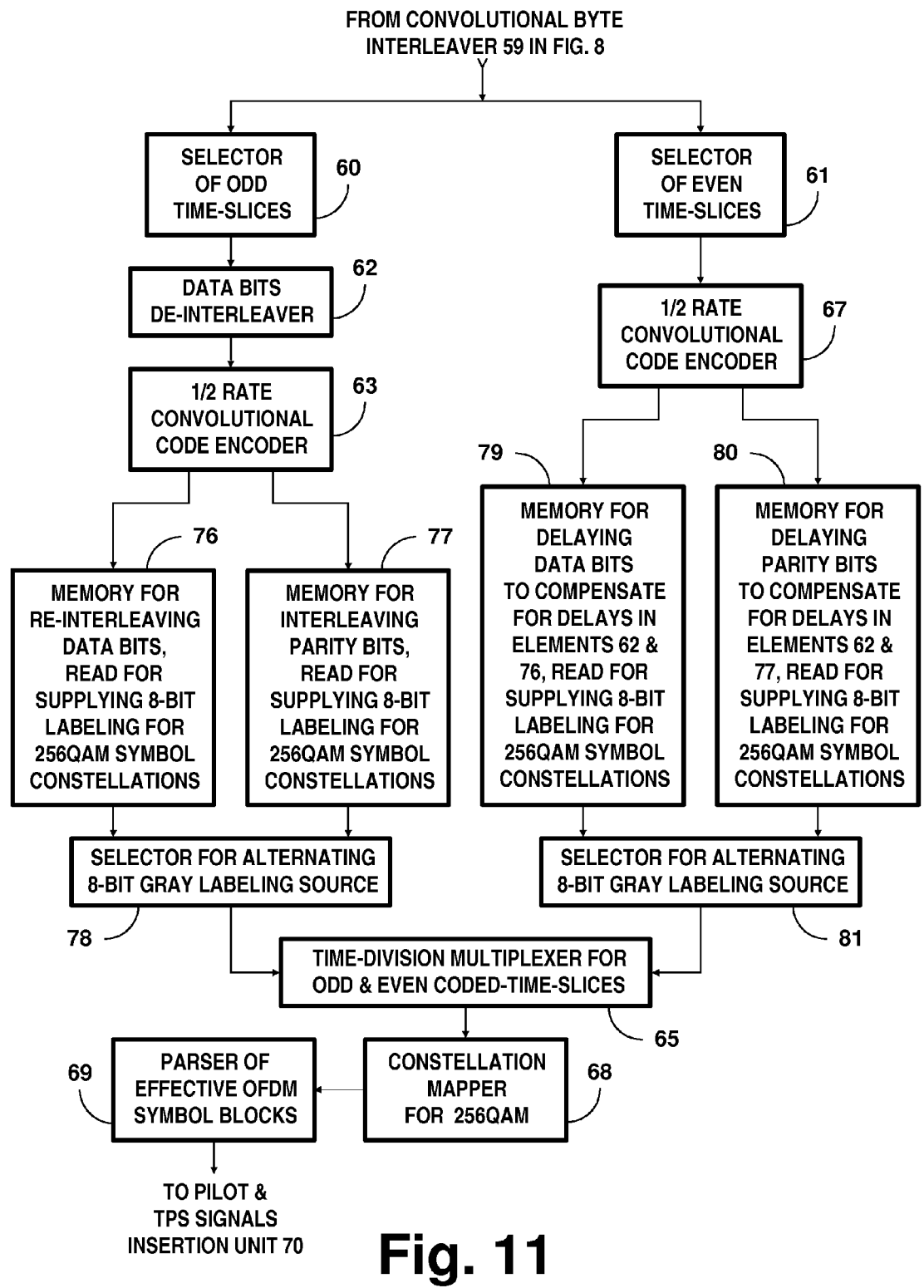
FIG. 11 is a schematic diagram of a modification of the FIG. 9 portion of a COFDM transmitter for a DTV system, in which the data bits of the one-half-code-rate convolutional-coded Reed-Solomon codewords are mapped into different QAM symbol constellations than the parity bits are for modulating COFDM carriers.

FIG. 11 also shows modifications of the FIG. 9 portion of the COFDM transmitter. The respective input ports of the selectors 60 and 61 are still connected for receiving the response of the convolutional byte interleaver 59 shown in FIG. 8. The output port of the selector 60 of odd-numbered time-slices still connects to the input port of the data bits interleaver 62, and the output port of the data bits interleaver 62 still connects to the input port of the encoder 63 for one-half-rate convolutional coding (CC). However, in FIG. 29 the output port of the selector 61 of even-numbered time-slices connects directly to the input port of the encoder 67 for one-half-rate convolutional coding (CC) rather than connecting via delay memory 66 as shown in FIG. 9.

In FIG. 11 the symbols interleaver 64 shown in FIG. 9 is replaced by random-access memories 76 and 77. The RAM 76 has a write-input port connected to be written with the data bits of one-half-rate CC of initial transmissions that subsequently are repeated for iterative-diversity reception, as supplied from a first output port of the CC encoder 63. The RAM 76 has a read-output port connected for supplying bytes of data bits to a first input port of a selector 78 of the 8-bit Gray labeling used by the 256QAM symbol constellation mapper 68 during odd-numbered time-slices. The RAM 77 has a write-input port connected to be written with the parity bits of the one-half-rate CC of the initial transmissions that subsequently are repeated for iterative-diversity reception, as supplied from a second output port of the CC encoder 63. The RAM 77 has a read-output port connected for supplying bytes of parity bits to a second input port of the selector 78 of the 8-bit Gray labeling used by the 256QAM symbol constellation mapper 68 during odd-numbered time-slices. The write addressing and read addressing of the RAMs 76 and 77 are co-operative to implement coded (or "implied") symbol interleaving of the one-half-rate CC of initial transmissions that subsequently are repeated for iterative-diversity reception. This form of symbol interleaving cooperates with the bits de-interleaver 62 preceding the encoder 63 of one-half-rate CC to restore the order of the data bits supplied from the output port of the selector 78. FIG. 11 shows the output port of the selector 78 connected to supply a first input port of the time-division multiplexer 65 with 8-bit Gray labels for 256QAM constellation maps in odd-numbered time-slices of COFDM signals intended for iterative-diversity reception.

In FIG. 11 the delay to compensate for the latencies of the bits de-interleaver 62 and of the RAMs 76 and 77 is provided for by random-access memories 79 and 80. The RAM 79 has a write-input port connected to be written with the data bits of one-half-rate CC of those transmissions that are not repeated and of the final ones of those transmissions that are repeated, as supplied from a first output port of the CC encoder 67. The RAM 79 has a read-output port connected for supplying bytes of data bits to a first input port of a selector 81 of the 8-bit Gray labeling used by the 256QAM symbol constellation mapper 68 during even time-slices. The RAM 80 has a write-input port connected to be written with the parity bits of the one-half-rate CC of those transmissions that are not repeated and of the final ones of those transmissions that are repeated for iterative-diversity reception, as supplied from a second output port of the CC encoder 67. The RAM 80 has a read-output port connected for supplying bytes of parity bits to a second input port of the selector 81 of the 8-bit Gray labeling used by the 256QAM symbol constellation mapper 68 during even-numbered time-slices. FIG. 11 shows the output port of the selector 81 connected to supply a second input port of the time-division multiplexer 65 with 8-bit Gray labels for 256QAM constellation maps in even-numbered time-slices of COFDM signals intended for iterative-diversity reception.

FIG. 12 shows a modification of the FIG. 11 portion of the DTV transmitter, which modification generates PCCC in which the first and second sets of parity bits have different coded interleaving. The output port of the selector 61 of even-numbered time-slices connects to the input port of a bits de-interleaver 74, and the output port of the bits de-interleaver 74 connects to the input port of the CC encoder 67 for one-half-rate convolutional coding. FIG. 12 shows the random-access memories 79 and 80 used for introducing delay in the FIG. 11 portion of the DTV transmitter being replaced by random-access memories 82 and 83, respectively. The RAM 82 has a write-input port connected to be written with the data bits of one-half-rate CC supplied from a first output port of the CC encoder 67. The RAM 882 has a read-output port connected for supplying bytes of data bits to the first input port of the selector 81 of the 8-bit Gray labeling used by the 256QAM symbol constellation mapper 68 during even-numbered time-slices. The RAM 83 has a write-input port connected to be written with the parity bits of the one-half-rate CC supplied from a second output port of the CC encoder 67. The RAM 83 has a read-output port connected for supplying bytes of parity bits to the second input port of the selector 81 of the 8-bit Gray labeling used by the 256QAM symbol constellation mapper 68 during even-numbered time-slices.

The RAMs 82 and 83 are both addressed by a first sequence of addresses during their writing and by a second sequence of addresses during their subsequently being read from. These first and second sequences of addresses differ, such that the de-interleaved data bits supplied from a first output port of the CC encoder 67 are re-interleaved by the RAM 82. The data bits appear in the read-out from the RAM 82 in the same sequential order they had at the output port of the selector 61 of even-numbered time-slices. The parity bits that appear in the read-out from the RAM 83 have coded interleaving respective to the data bits read from the RAM 82. The latent delay for the even-numbered coded time-slices supplied from convolutional byte interleaver 59 to the second input port of the time-division multiplexer 65 is equal to the latent delay for the odd-numbered coded time-slices supplied from convolutional byte interleaver 59 to the first input port of the time-division multiplexer 65.

To aid the reader in understanding the desired operations of the FIG. 11 and FIG. 12 configurations, FIGS. 11 and 12 each depict the time-division multiplexer 65 and the selectors 80 and 81 as physically separate elements. In actual practice the functions of the time-division multiplexer 65 and of the selectors 80 and 81 can be subsumed into the read-control circuits of the RAMs 76, 77, 79 and 80 in the FIG. 11 configuration, as one skilled in digital design will understand. These functions can be subsumed into the read-control circuits of the RAMs 76, 77, 82 and 83 in the FIG. 12 configuration.

FIGS. 13 and 14 together show a further portion of the DTV transmitter generating COFDM signals for reception by M/H DTV receivers. Apparatus for generating PCCC and subsequent COFDM carriers is shown in FIG. 14. FIG. 13 shows apparatus for processing time-slices for iterative-diversity reception by M/H DTV receivers. A time-division multiplexer 85 to assemble time-sliced services for reception by mobile and handheld receivers is shown somewhat above the middle of FIG. 13.

Data concerning a first of the services to be transmitted twice for reception by M/H DTV receivers are written into storage locations within a dual-port random-access memory 86 via a random-access port thereof. The RAM 86 is capable of temporarily storing a number at least N+1 of time-slices of the first service to be transmitted twice to enable iterative-diversity reception by M/H DTV receivers. The dual-port RAM 86 has a serial output port connected to a first input port of the multiplexer 85 of time-sliced services for reception by M/H receivers. Successive time-slices of the first service for iterative-diversity reception by M/H receivers are read from the serial output port of the RAM 86, one odd-numbered time-slice per super-frame, to support the initial transmissions of those time-slices. After a delay of one time-slice more than N super-frames, the same successive time-slices of that first service are read again from the serial output port of the RAM 86, one even-numbered time-slice per super-frame, to support the final transmissions of those time-slices.

Data concerning a second of the services to be transmitted twice to enable iterative-diversity reception by M/H DTV receivers are written into storage locations within a dual-port random-access memory 87 via a random-access port thereof. The RAM 87 is capable of temporarily storing a number at least N+1 of time-slices of the second service to be transmitted twice to enable iterative-diversity reception by M/H DTV receivers. The dual-port RAM 87 has a serial output port connected to a second input port of the multiplexer 85 of time-sliced services for reception by M/H receivers. Successive time-slices of the second service for iterative-diversity reception by M/H receivers are read from the serial output port of the RAM 87, one odd-numbered time-slice per super-frame, to support the initial transmissions of those time-slices. After a delay of one time-slice more than N super-frames, the same successive time-slices of that second service are read again from the serial output port of the RAM 87, one even-numbered time-slice per super-frame, to support the final transmissions of those time-slices.

Data concerning a third of the services to be transmitted twice to enable iterative-diversity reception by M/H DTV receivers are written into storage locations within a dual-port random-access memory 88 via a random-access port thereof. The RAM 88 is capable of temporarily storing a number at least N+1 of time-slices of the third service to be transmitted twice to enable iterative-diversity reception by M/H DTV receivers. The dual-port RAM 88 has a serial output port connected to a third input port of the multiplexer 85 of time-sliced services for reception by M/H receivers. Successive time-slices of the third service for iterative-diversity reception by M/H DTV receivers are read from the serial output port of the RAM 88, one odd-numbered time-slice per super-frame, to support the initial transmissions of those time-slices. After a delay of one time-slice more than N super-frames, the same successive time-slices of that third service are read again from the serial output port of the RAM 88, one even-numbered time-slice per super-frame, to support the final transmissions of those time-slices.

Data concerning a fourth of the services to be transmitted twice to enable iterative-diversity reception by M/H DTV receivers are written into storage locations within a dual-port random-access memory 89 via a random-access port thereof. The RAM 89 is capable of temporarily storing a number at least N+1 of time-slices of the fourth service to be transmitted twice to enable iterative-diversity reception by M/H DTV receivers. The dual-port RAM 89 has a serial output port connected to a fourth input port of the multiplexer 85 of time-sliced services for reception by M/H receivers. Successive time-slices of the fourth service for iterative-diversity reception by M/H receivers are read from the serial output port of the RAM 89, one odd-numbered time-slice per super-frame, to support the initial transmissions of those time-slices. After a delay of one time-slice more than N super-frames, the same successive time-slices of that fourth service are read again from the serial output port of the RAM 89, one even-numbered time-slice per super-frame, to support the final transmissions of those time-slices.

The respective time-slices from each of services for reception by M/H receivers that the time-division multiplexer 85 assembles are supplied from the output port of the multiplexer 85 to the input port of an internet protocol encapsulator 90. The IPE 90 is similar in its construction and operation to the IPE 27 depicted in FIG. 3. The output port of the IPE 90 is connected to the input port of a data randomizer 91, the construction of which is similar to that of each of the data randomizers 3, 28 and 56. FIG. 13 shows the output port of the data randomizer 91 connected to the input port of a matrix block de-interleaver 92 for bytes of time-slices. The block de-interleaver 92 is similar in its construction and operation to the matrix block de-interleaver 29 depicted in FIG. 3. The output port of the matrix block de-interleaver 92 is connected to the input port of a TRS encoder 93, used for (255, 191) transverse Reed-Solomon (TRS) forward-error-correction (FEC) coding of the de-interleaver 92 response.

The output port of the TRS encoder 93 is connected for supplying (255, 191) TRS codewords to the input port of a block interleaver 94 for bytes from those (255, 191) TRS codewords. The block interleaver 94 is similar in its construction and operation to the block interleaver 31 depicted in FIG. 3. FIG. 13 shows the output port of the block interleaver 94 connected for supplying data-randomized IPE packets to the input port of a byte de-interleaver 95 that is similar in its construction and operation to the byte de-interleaver 32 depicted in FIG. 3. FIG. 13 further shows the output port of the byte de-interleaver 95 connected to the input port of an LRS encoder 96 for (204, 188) Reed-Solomon (RS) forward-error-correction (FEC) coding. The output signal from the LRS encoder 96 reproduces the 188-byte segments of the byte de-interleaver 95 response, but appends to each of those 188-byte segments a respective set of sixteen parity bytes for the (204, 188) RS FEC coding, as calculated by the LRS encoder 96. The output port of the LRS encoder 96 is connected for supplying the resulting (204, 188) RS codewords as input signal to the input port of a convolutional byte interleaver 97, which is preferably similar in construction and operation to each of the convolutional byte interleavers 9, 34 and 59. The output port of the convolutional byte interleaver 97 is connected for supplying its response to apparatus for further FEC coding of individual bits of that response, which apparatus can be as shown in FIG. 14 for example.

Super-frames are customarily composed of four consecutive frames apiece, a fourth frame of each super-frame comprising eight respective time-slices for reception by M/H receivers. Preferably, these eight time-slices are apportioned in the following way among the services scheduled for iterative-diversity reception by M/H receivers. Initial and final transmissions of a first of the services scheduled for iterative-diversity reception by M/H receivers are transmitted in respective ones of the first and second of the time-slices in each fourth frame. Initial and final transmissions of a second of the services scheduled for iterative-diversity reception by M/H receivers are transmitted in respective ones of the third and fourth of the time-slices in each fourth frame. Initial and final transmissions of a third of the services scheduled for iterative-diversity reception by M/H receivers are transmitted in respective ones of the fifth and sixth of the time-slices in each fourth frame. Initial and final transmissions of a fourth of the services scheduled for iterative-diversity reception by M/H receivers are transmitted in respective ones of the seventh and eighth of the time-slices in each fourth frame. This protocol for apportioning time-slices among the services scheduled for iterative-diversity reception is well suited for selectively energizing an M/H receiver for receiving only a selected one of those services. This protocol permits the front-end tuner of the M/H receiver to be powered up just once in each fourth frame, rather than having to be powered up twice in each fourth frame. This reduces the time taken for settling of the front-end tuner before actively receiving the service selected for reception. If a service scheduled for iterative-diversity reception by M/H receivers requires more than two data slices within each fourth frame, arranging the data slices so as to be consecutive in time permits the front-end tuner of the M/H receiver still to be powered up just once in each fourth frame, rather than having to be powered up more times in each fourth frame.

The nature of the convolutional byte interleaving performed by each of the byte interleavers 9, 34, 59 and 97 is such that sustained burst noise extending for as many as sixteen rows of the 204-byte-wide data field will cause no more than sixteen byte errors in any (204, 188) LRS codeword. If byte errors in a (204, 188) LRS codeword are located externally to the codeword, as many as sixteen byte errors in the codeword can be corrected during its decoding in the M/H receiver. An "erasure" method of LRS decoding is used to secure such performance. The results of previous decoding of bit-wise FEC coding can be processed to locate byte-errors for erasure decoding of the (204, 188) LRS codewords. If byte errors in a (204, 188) LRS codeword have to be located internally, from within the codeword itself, only up to eight byte errors in the codeword can be corrected during its decoding in the M/H receiver. Sustained burst noise extending for as many as eight rows of the 204-byte-wide data field can still be corrected by the decoder for (204, 188) LRS codewords.

The nature of the convolutional byte interleaving by each of the byte interleavers 31 and 97 is such that sustained burst noise extending for as many as sixty-four rows of bytes in the MPE data field will cause no more than sixty-four byte errors in any (255, 191) TRS codeword. If byte errors in a (255, 191) TRS codeword are located internally, within the codeword itself, only up to thirty-two byte errors in the codeword can be corrected during its decoding in the M/H receiver. However, if byte errors in a (255, 191) TRS codeword are located externally to the codeword, as many as sixty-four byte errors in the codeword can be corrected during its decoding in the M/H receiver. The results of previous decoding of bit-wise FEC coding can be processed to locate byte-errors for erasure decoding of the (255, 191) TRS codewords. Alternatively, the results of decoding (204, 188) LRS codewords can be used to locate byte-errors for decoding (255, 191) TRS codewords. The results of decoding (204, 188) RS codewords can also be used to refine the locations of byte-errors for decoding (255, 191) TRS codewords, as determined by processing the results of previous decoding of bit-wise FEC coding. Another alternative is to use the results of decoding CRC coding of IP packets to locate byte-errors for decoding (255, 191) TRS codewords or to refine the locations of byte-errors for such decoding. Data-randomized IP packets can be extracted from IPE packets recovered from the results of decoding (204, 188) LRS codewords. The data-randomized IP packets are then de-randomized so the CRC coding of the IP packets can be decoded for determining which IP packets certainly contain erroneous bytes.

FIG. 14 shows apparatus for generating PCCC components and subsequent COFDM carriers subsequently transmitted over the air for reception by M/H receivers. The output port of the convolutional byte interleaver 97 shown in FIG. 13 is connected for supplying the response therefrom to the respective input ports of selectors 98 and 99 shown in FIG. 14. The selector 98 selectively responds to the convolutionally byte-interleaved (204, 188) LRS codewords of odd-numbered time-slices supplied to its input port, reproducing them in bit-serial form at its output port. The selector 99 selectively responds to the convolutionally byte-interleaved (204, 188) LRS codewords of even-numbered time-slices supplied to its input port, reproducing them in bit-serial form at its output port.

The bit-serial, convolutionally byte-interleaved (204, 188) RS codewords of odd-numbered time-slices supplied from the output port of the selector 98 are supplied to the input port of a bits de-interleaver 100. The output port of the bits de-interleaver 100 is connected for supplying bit de-interleaved response to the input port of a CC encoder 101 for one-half-rate convolutional coding (CC). The output port of the CC encoder 101 is connected for supplying one-half-rate CC to the input port of a symbols interleaver 102. The bits de-interleaver 100 and the symbols interleaver 102 cooperate to provide coded (or "implied") interleaving of the data bits and parity bits of the CC from the output port of the symbols interleaver 102. The symbols interleaver 102 interleaves half-nibble symbols in a way complementary to the way that the bits de-interleaver 100 de-interleaved data bits supplied to the CC encoder 101 for one-half-rate convolutional coding. Accordingly, data bits appear in their original order in the symbol-interleaved one-half-rate CC supplied from the output port of the symbols interleaver 102 to a first of two input ports of a time-division multiplexer 103 for odd-numbered and even-numbered coded time-slices.

The bit-serial, convolutionally byte-interleaved (204, 188) LRS codewords of even-numbered time-slices supplied from the output port of the selector 99 are delayed by delay memory 104 for application to the input port of a CC encoder 105 for one-half-rate convolutional coding (CC). The CC encoder 105 is similar in construction and operation to the CC encoder 101. The output port of the CC encoder 105 is connected for supplying one-half-rate CC to the second input port of the time-division multiplexer 103 for odd-numbered and even-numbered coded time-slices. The delay introduced by the delay memory 104 compensates for the latent delays in the bits de-interleaver 100 and the symbols interleaver 102. Accordingly, the even-numbered coded time-slices supplied from the output port of the CC encoder 105 to the second input port of the time-division multiplexer 103 interleave in time with the odd-numbered coded time-slices that the symbols interleaver 102 supplies to the second input port of the time-division multiplexer 103.

The output port of the time-division multiplexer 103 is connected for supplying the multiplexed odd-numbered and even-numbered coded time-slices to the input port of a constellation mapper 106 for 64QAM. The nature of the preferred square 64QAM symbol constellations and the Gray mapping used in them are disclosed in detail in the above-referenced U.S. patent application Ser. No. 13/493,198 filed 11 Jun. 2012. The output port of the constellation mapper 106 is connected to the input port of a parser 107 for effective OFDM symbol blocks. The block parser 107 parses a stream of complex samples supplied from the constellation mapper 106 into uniform-length sequences of complex samples, each of which sequences is associated with a respective effective OFDM symbol. The output port of the block parser 107 is connected to a first input port of a pilot and TPS signal insertion unit 108, a second input port of which unit 108 is connected to receive Transmission Parameters Signaling (TPS) bits from a TPS signal generator 109. The pilot and TPS signal insertion unit 108 inserts these TPS bits, which are to be transported by dedicated carriers (TPS Pilots), into each effective OFDM symbol block. The pilot and TPS signal insertion unit 108 inserts other bits descriptive of unmodulated carriers of predetermined amplitude and predetermined phase into each effective OFDM symbol block. An output port of the pilot and TPS signal insertion unit 108 is connected for supplying the effective OFDM symbol blocks with pilot carriers inserted therein to the input port of an OFDM modulator 110. The OFDM modulator 110 has 4K carriers capability, suitable for transmissions to M/H DTV receivers.

The OFDM modulator 110 includes a serial-to-parallel converter for converting the serially generated complex digital samples of the effective OFDM symbols to parallel complex digital samples for inverse discrete Fourier transformation (I-DFT). The OFDM modulator 110 further includes a parallel-to-serial converter for converting the parallel complex digital samples of the I-DFT results to serial complex digital samples of the I-DFT results supplied from the output port of the OFDM modulator 110 to the input port of a guard-interval-and-cyclic-prefix-insertion unit 111. The output port of the unit 111 is connected for supplying successive complex digital samples of a COFDM signal to a fourth input port of the all-services multiplexer 17.

FIG. 15 shows a modification of the FIG. 14 portion of the DTV transmitter, which modification generates PCCC in which the first and second sets of parity bits have different coded interleaving. The output port of the selector 99 of even-numbered time-slices connects to the input port of a bits de-interleaver 112, and the output port of the bits de-interleaver 112 connects to the input port of the CC encoder 105 for one-half-rate convolutional coding. The output port of the CC encoder 105 connects to the input port of a symbols interleaver 113, the output port of which connects to the second input port of the time-division multiplexer 103 for odd-numbered and even-numbered coded time-slices. The bits de-interleaver 122 and the symbols interleaver 113 provide a different pattern of coded interleaving than the bits de-interleaver 100 and the symbols interleaver 102 do. Even-numbered coded time-slices can inherently interleave with odd-numbered coded time-slices in this modification, so the modified portion of the DTV transmitter depicted in FIG. 15 need not include delay memory need not include delay memory for this purpose (as provided for by the delay memory 104 in the FIG. 14 portion of the DTV transmitter).

FIG. 16 also shows modifications of the FIG. 14 portion of the COFDM transmitter. The respective input ports of the selectors 98 and 99 are still connected for receiving the response of the convolutional byte interleaver 97 shown in FIG. 13. The output port of the selector 98 of odd-numbered time-slices still connects to the input port of the data bits interleaver 100, and the output port of the data bits interleaver 100 still connects to the input port of the encoder 101 for one-half-rate convolutional coding (CC). The output port of the selector 99 of even-numbered time-slices still connects directly to the input port of the encoder 105 for one-half-rate convolutional coding (CC).

In FIG. 16 the symbols interleaver 102 shown in FIG. 14 is replaced by random-access memories 114 and 115. The RAM 114 has a write-input port connected to be written with the data bits of one-half-rate CC of initial transmissions that subsequently are repeated for iterative-diversity reception, as supplied from a first output port of the CC encoder 101. The RAM 114 has a read-output port connected for supplying data bits to a first input port of a selector 116 of the 6-bit Gray labeling used by the 64QAM symbol constellation mapper 106 during even-numbered time-slices. The RAM 115 has a write-input port connected to be written with the parity bits of the one-half-rate CC of the initial transmissions that subsequently are repeated for iterative-diversity reception, as supplied from a second output port of the CC encoder 101. The RAM 115 has a read-output port connected for supplying parity bits to a second input port of the selector 116 of the 6-bit Gray labeling used by the 64QAM symbol constellation mapper 106 during odd-numbered time-slices. The write addressing and read addressing of the RAMs 114 and 115 are co-operative to implement coded (or "implied") symbol interleaving of the one-half-rate CC of initial transmissions that subsequently are repeated for iterative-diversity reception. FIG. 16 shows the output port of the selector 116 connected for supplying a first input port of the time-division multiplexer 103 with 6-bit Gray labels for 64QAM constellation maps for just data bits, alternating with 6-bit Gray labels for 64QAM constellation maps for just parity bits.

In FIG. 16 the delay to compensate for the latencies of the bits de-interleaver 100 and of the RAMs 114 and 115 is provided for by random-access memories 117 and 118. The RAM 117 has a write-input port connected to be written with the data bits of one-half-rate CC of those transmissions that are not repeated and of the final ones of those transmissions that are repeated, as supplied from a first output port of the CC encoder 105. The RAM 117 has a read-output port connected for supplying data bits to a first input port of a selector 119 of the 6-bit Gray labeling used by the 64QAM symbol constellation mapper 106 during even-numbered time-slices. The RAM 118 has a write-input port connected to be written with the parity bits of the one-half-rate CC of those transmissions that are not repeated and of the final ones of those transmissions that are repeated for iterative-diversity reception, as supplied from a second output port of the CC encoder 105. The RAM 118 has a read-output port connected for supplying parity bits to a second input port of the selector 119 of the 6-bit Gray labeling used by the 64QAM symbol constellation mapper 106 during even-numbered time-slices. FIG. 16 shows the output port of the selector 119 connected for supplying a second input port of the time-division multiplexer 103 with 6-bit Gray labels for 64QAM constellation maps of just data bits, alternating with 6-bit Gray labels for 64QAM constellation maps of just parity bits.

FIG. 17 shows a modification of the FIG. 16 portion of the DTV transmitter, which modification generates PCCC in which the first and second sets of parity bits have different coded interleaving. The output port of the selector 99 of even-numbered time-slices connects to the input port of a bits de-interleaver 112, and the output port of the bits de-interleaver 112 connects to the input port of the CC encoder 105 for one-half-rate convolutional coding. FIG. 12 shows the random-access memories 117 and 118 used for introducing delay in the FIG. 16 portion of the DTV transmitter being replaced by random-access memories 120 and 121, respectively. The RAM 120 has a write-input port connected to be written with the data bits of one-half-rate CC supplied from a first output port of the CC encoder 105. The RAM 120 has a read-output port connected for supplying bytes of data bits to the first input port of the selector 119 of the 6-bit Gray labeling used by the 64QAM symbol constellation mapper 106 during even-numbered time-slices. The RAM 121 has a write-input port connected to be written with the parity bits of the one-half-rate CC supplied from a second output port of the CC encoder 105. The RAM 121 has a read-output port connected for supplying bytes of parity bits to the second input port of the selector 119 of the 6-bit Gray labeling used by the 64QAM symbol constellation mapper 106 during even-numbered time-slices.

The RAMs 120 and 121 are both addressed by a first sequence of addresses during their writing and by a second sequence of addresses during their subsequently being read from. These first and second sequences of addresses differ, such that the de-interleaved data bits supplied from a first output port of the CC encoder 105 are re-interleaved by the RAM 120. The data bits appear in the read-out from the RAM 120 in the same sequential order they had at the output port of the selector 99 of even-numbered time-slices. The parity bits that appear in the read-out from the RAM 121 have coded interleaving respective to the data bits read from the RAM 120. The latent delay for the even-numbered coded time-slices supplied from convolutional byte interleaver 97 to the second input port of the time-division multiplexer 103 is equal to the latent delay for the odd-numbered coded time-slices supplied from convolutional byte interleaver 97 to the first input port of the time-division multiplexer 103.

To aid the reader in understanding the desired operations of the FIG. 16 and FIG. 17 configurations, FIGS. 16 and 17 each depict the time-division multiplexer 103 and the selectors 116 and 119 as physically separate elements. In actual practice the functions of the time-division multiplexer 103 and the selectors 116 and 119 can be subsumed into the read-control circuits of the RAMs 114, 115, 117 and 118 in the FIG. 16 configuration, as one skilled in digital design will understand. These functions can be subsumed into the read-control circuits of the RAMs 114, 115, 120 and 121 in the FIG. 17 configuration.

FIG. 18 depicts a memory 122 for replacing any one of the data-storage memories in FIGS. 1, 3, 8 and 13. FIG. 18 shows in more detail the connections of such memory 122 with a respective microprocessor 123 that generates the write addressing and the read addressing for the memory 122. The microprocessor 123 also calculates the addresses of byte-storage locations in the memory 122 that store the initial bytes of IP packets, which are written into the memory 122 so as to appear as the fourth and fifth bytes of IPE packets to be generated from read-out from the memory 122. Explanation of this operation is the principal reason for including FIGS. 18, 19 and 20 in the drawings. DTV receivers can then use the fourth and fifth bytes of IPE packets to parse IP packets without having to rely on daisy-chain operation through a time-slice, which sort of operation is prone to disruption by burst noise.

The memory 122 is considered to be byte-organized, with addressable storage locations for 8-bit bytes. FIG. 18 shows these byte-storage locations arranged, 185 to a row, in successive rows. The addressing regime may be one comprising a row address component and a modulo-185 column address component, for example. A respective memory 122 can replace each of the RAMs 23, 24, 25, 26 et cetera in FIG. 3, in which case the number of rows in each memory 122 is sufficient to store the IP packets in a time-slice. A respective memory 122 can replace each of the RAMs 86, 87, 88, 89 et cetera in FIG. 13, in which case the number of rows in each memory 122 is sufficient to store the IP packets in (N+1) time-slices. If transmissions to stationary receivers employ internet protocol, a respective memory 122 can replace each of the RAMs 4, 5, 6 et cetera in FIG. 1, in which case the number of rows in each memory 122 is sufficient to store the IP packets in a frame of eight time-slices. If iterative-diversity transmissions to stationary receivers employ internet protocol, a respective memory 122 can replace each of the RAMs 52, 53, 54 et cetera in FIG. 8, in which case the number of rows in each memory 122 is sufficient to store the IP packets in (N+1) frames.

The memory 122 has a random-access write-input port connected for receiving write-input signal from the output port of a write-input multiplexer 124, which multiplexer 124 is controlled by control signal from the microprocessor 123. The write-input multiplexer 124 has a first of two input ports connected for receiving IP data for a service to be transmitted. The write-input multiplexer 124 has its second input port connected for receiving from the microprocessor 123 the addresses of byte-storage locations in the memory 122 that store the initial bytes of IP packets. At selected times, the control signal from the microprocessor 123 conditions the write-input multiplexer 124 to reproduce from its output port the IP data for the service to be transmitted. At those selected times the microprocessor 123 enables writing of the memory 122 and supplies the memory 122 with suitable write addressing for writing IP data into successive rows of byte-storage locations in the memory 122.

The memory 122 has a random-access read-output port connected for supplying read-output signal to the input port of a read-output switch 125, which switch 125 is controlled by control signal from the microprocessor 123. The read-output switch 125 has a first of two output ports connected for supplying read-output signal to an input port of the multiplexer 1 in FIG. 1, of the multiplexer 22 in FIG. 3, of the multiplexer 51 in FIG. 8 or of the multiplexer 85 in FIG. 13. The read-output switch 125 has its second output port connected for supplying the microprocessor 123 with selected read-out signal. Each time the byte-storage locations in the memory 122 are completely re-written, this is followed by the microprocessor 123 performing procedures to calculate the addresses of byte-storage locations in the memory 122 that store the initial bytes of IP packets, and then to write these addresses into the memory 122 so as to appear as the fourth and fifth bytes of IPE packets to be generated from read-out from the memory 122 to an input port of the multiplexer 1 in FIG. 1, of the multiplexer 22 in FIG. 3, of the multiplexer 51 in FIG. 8 or of the multiplexer 85 in FIG. 13.

FIG. 19 is an informal flow chart of typical overall operation of the microprocessor 123 depicted in FIG. 18. In an initial step 131 of this overall operation, the IP packets for a time-slice are written row-by-row into the final 183 columns of byte-storage locations in the memory 122. The addressing of columns of byte-storage locations in the memory 122 is presumed to be done on a modulo-188 basis, so as to map to each row of byte-storage locations a group of 185 successive bytes as they will appear concluding respective IPE packets, each having a respective initial 3-byte header. During step 131, the microprocessor 123 generates control signal for the write-input multiplexer 124 that conditions the multiplexer 124 to apply to the write-input port of the memory 122 data from a time-slice of a service to be transmitted. The microprocessor 123 also generates write-enable signal and write addressing supplied to the memory 122 during step 131 and during a second step 132 of overall operation.

In the second step 132 of overall operation, the microprocessor 123 writes the address of the initial byte of the earliest IP packet in the time-slice into the initial two byte-storage locations in the initial row of byte-storage locations in the memory 122 that temporarily store the IP packets of the time-slice written in step 131. For example, if the initial IP packet starts in the byte-storage location with "sixth" modulo-188 columnar address in the first row of byte-storage locations, the byte-storage locations with "fourth" and "fifth" modulo-188 columnar addresses in that first row will be written to temporarily store 0000 0000 0000 1010. The address of the initial byte of the earliest IP packet in the time-slice may be provided to the microprocessor 123 from an IP packet sniffer responding to the IP-packet transport stream of the service to be temporarily stored in the memory 122. During step 132, the microprocessor 123 generates control signal for the write-input multiplexer 124 that conditions the multiplexer 124 to apply to the write-input port of the memory 122 the address of the initial byte of the earliest IP packet in the time-slice as supplied from an output port of the microprocessor 123. After an initial time-slice in a series of successive time-slices for the same service to be transmitted, the microprocessor 123 may skip step 132 for the succeeding time-slices.

In a succeeding step 133 of overall operation, the initial row of byte-storage locations in the memory 122 that temporarily store the IP packets of the current time-slice is the currently considered row. In the step 133 the microprocessor 123 locates the header of the initial IP packet, if any, in the currently considered row of byte-storage locations. This is done by referring to the address of the earliest byte of that initial IP packet temporarily stored in the initial two byte-storage locations of the currently considered row, those locations with "fourth" and "fifth" modulo-188 columnar addresses. In subsequent procedural steps 134-139 the microprocessor 123 uses this stored address as the basis for subsequent daisy-chain computation of the addresses of the initial bytes of subsequent IP packets in the time-slice. The microprocessor 123 generates read-enable signal and read addressing supplied to the memory 122 during selective reading therefrom during procedural steps 133 and 134. During step steps 133 and 134 the microprocessor 123 generates control signal for the read-output switch 125 that conditions the read-output switch 125 to route read-out from the memory 122 to an input port of the microprocessor 123.

FIG. 20 is an informal flow chart showing in detail the successive procedural steps 134-139 that the microprocessor 123 performs in the daisy-chain computation of the addresses of the initial bytes of subsequent IP packets in the time-slice. This daisy-chain computation being performed at the DTV transmitter, rather than in DTV receivers, is not prone to corruption by burst noise arising in over-the-air transmission channels.

In procedural step 134 the microprocessor 123 extracts the length in byte epochs of any succeeding IP packet beginning its header at the stored address in the initial two byte-storage locations in the currently considered row. This length appears in the third and fourth bytes of the IP packet header. Then, in procedural step 135 the microprocessor 123 divides the length in byte epochs of any succeeding IP packet by 183 to determine the number of rows of byte-storage locations in the memory 122 until the header of the next IP packet will appear. In a compound procedural step 136 the microprocessor 123 multiplies this number of rows by five, then adds the product to the length of the succeeding IP packet to generate a sum. This sum accounts for the addressed byte-storage locations (three of which are virtual in character) skipped over in writing IP packets into rows of byte-storage locations in the memory 122. In a subsequent procedural step 137 the microprocessor 123 adds this sum to the stored address in the initial two byte-storage locations in the currently considered row, thus to determine the distance in byte epochs to the initial byte of the succeeding IP packet from the beginning of the IP packet data field in the currently considered row of byte-storage locations in memory 122.

In a subsequent compound procedural step 138, the microprocessor 123 calculates the distances in byte epochs to the initial byte of the succeeding IP packet from the beginnings of the IP packet data fields in rows of byte-storage locations in memory 122 after the currently considered one. In step 138 the microprocessor 123 decrements the distance to the initial byte of the succeeding IP packet from the beginning of the IP packet data field in the currently considered row of byte-storage locations in memory 122 by 188 per row to determine these distances. The microprocessor 123 writes each decremented distance into the initial two byte-storage locations of the next row of byte-storage locations in memory 122. During its writing of selected byte-storage locations within the memory 122 in step 138, the microprocessor 123 generates control signal for the write-input multiplexer 124 that conditions the multiplexer 124 to connect an output port of the microprocessor 123 to the write-input port of the memory 122. The microprocessor 123 also generates write-enable signal and write addressing supplied to the memory 122 during step 138. The microprocessor 123 concludes this step 138 when the initial byte of the succeeding IP packet is within a next row of byte-storage locations in memory 122. The decremented distance written into the initial two byte-storage locations of this next row of byte-storage locations is reduced to no more than 183 byte epochs.

If this next row of byte-storage locations is still within the current time-slice, the microprocessor 123 performs procedural step 139. In step 139 the microprocessor 123 loops back operation to step 133 after selecting the row in which the decremented distance has been reduced to no more than 183 byte epochs as the next currently considered row in step 133. However, the next row of byte-storage locations in memory 122 in which the decremented distance is reduced to no more than 183 byte epochs in the initial byte thereof is sometimes within the time-slice next after the current time-slice. The initial two byte-storage locations in each and every row of byte-storage locations within memory 122 for the current time-slice will have been written, as well as possibly one or more rows of byte-storage locations within memory 122 for the time-slice next after the current time-slice. In such case operation does not loop back to step 133.

When the initial two byte-storage locations in each and every row of byte-storage locations within memory 122 for the current time-slice have been written, the microprocessor 123 institutes procedural step 140. In step 140 the microprocessor 123 arranges for the contents temporarily stored in the rows of byte-storage locations for the current time-slice (or for a previous time-slice) to be read from the memory 122 to an input port of the multiplexer 22 or 85. The microprocessor 123 generates read-enable signal and read addressing supplied to the memory 122 during this reading out of a time-slice during step 140. During step 140 the microprocessor 123 generates control signal for the read-output switch 125 that conditions the read-output switch 125 to apply the final 185 bytes of each IPE packet read from the memory 122 to the input port of the multiplexer 22 or 85. A previous time-slice is read from the memory 122 in each step 140 if the memory 122 is twice read to support repeated transmission of time-slices in support of iterative-diversity reception. If a time-slice is not to be repeated in support of iterative-diversity reception, a current time-slice can be read from the memory 122 in each step 140, so the number of rows of byte-storage locations in the memory 122 can be minimal.

After a time-slice is read from the memory 122 to an input port of the multiplexer 22 or 85 in step 140, the microprocessor 123 loops overall operation back to the procedural step 131 to write a new time-slice into the memory 122. In a variant of the described operation, the memory 122 is operated in a read-and-then-overwrite mode that telescopes the procedural step 131 of writing the memory 122 with a new time-slice into the procedural step 140 of reading a previous time-slice from the memory 122.

FIG. 21 shows the initial portion of a DTV receiver designed for reception of COFDM signals as transmitted at VHF or UHF either by the portions of a DTV transmitter as depicted in FIGS. 1 and 2 or by the portions of a DTV transmitter as depicted in FIGS. 3 and 4. A reception antenna 141 captures the radio-frequency COFDM signal for application as input signal to a front-end tuner 142 of the receiver. Typically, the front-end tuner 142 is of a double-conversion type composed of initial single-conversion super-heterodyne receiver circuitry for converting radio-frequency (RF) COFDM signal to intermediate-frequency (IF) COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 142 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified IF COFDM signal with local oscillations from the final local oscillator to obtain the baseband COFDM signal, and a low-pass filter for suppressing image signal that otherwise would accompany the baseband COFDM signal. FIG. 21 shows an AFPC generator 143 for generating the automatic frequency and phase control (AFPC) signal for controlling the final local oscillator within the front-end tuner 142. In some designs of the front-end tuner 142, synchronous demodulation is performed in the analog regime before subsequent analog-to-digital conversion of the resulting complex baseband COFDM signal. In other designs of the front-end tuner 142 analog-to-digital conversion is performed before synchronous demodulation is performed in the digital regime.

Simply stated, the front-end tuner 142 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples.

The output port of the front-end tuner 142 is connected for supplying digitized samples of baseband COFDM signal to the input port of a cyclic prefix detector 144. The cyclic prefix detector 144 determines the duration of an effective COFDM symbol by trial-and-error correlation procedures. The cyclic prefix detector 144 differentially combines the digitized samples of baseband COFDM signal with those samples as delayed by the duration of an effective COFDM symbol. Nulls in the difference signal thus generated should occur, marking the guard intervals of the baseband COFDM signal. The nulls are processed to reduce any corruption caused by noise and to generate sharply defined indications of the phasing of COFDM symbols. The output port of the cyclic prefix detector 144 is connected to supply these indications to a first of two input ports of timing synchronization apparatus 145.

A first of two output ports of the timing synchronization apparatus 145 is connected for supplying gating control signal to the control input port of a guard-interval-removal unit 146, the signal input port of which is connected for receiving digitized samples of baseband COFDM signal from the output port of the front-end tuner 142. The output port of the guard-interval-removal unit 146 is connected for supplying windowed portions of the baseband COFDM signal that contains effective 2K, 4K or 8K COFDM samples to the input port of a fast-Fourier-transform demodulator 147 for OFDM. A second of the output ports of the timing synchronization apparatus 145 is connected for supplying the FFT demodulator 147 with synchronizing information concerning the effective COFDM samples. The indications concerning the phasing of COFDM symbols that the cyclic prefix detector 144 supplies to the timing synchronization apparatus 145 is sufficiently accurate for initial windowing of the baseband COFDM signal that the guard-interval-removal unit 146 supplies to the FFT demodulator 147. FFT demodulators for 2K, 4K and 8K COFDM have become commercially available. The construction of such an FFT demodulator can, for example, be an extension of the construction of FFT demodulators for 2K and 8K COFDM described in U.S. Pat. No. 7,577,216 issued 18 Aug. 2009 to Junling Zhang with the title "Guard interval and FFT mode detector in DVB-T receiver".

A first output port of the FFT demodulator 147 is connected for supplying demodulated pilot carrier information to the input port of a pilot and TPS carriers processor 148. The information concerning unmodulated pilot carriers is processed in the processor 148 to support more accurate windowing of the baseband COFDM signal that the guard-interval-removal unit 146 supplies to the FFT demodulator 147. Such processing can be done similarly to the way described by Nicole Alcouffe in U.S. Pat. No. 20030138060-A1 published 24 Jul. 2003 with the title "CFFT demodulator with an optimal FFT analysis window positioning", for example. A first of five output ports of the pilot and TPS carriers processor 148 is connected for supplying more accurate window positioning information to the second input port of the timing synchronization apparatus 145.

The pilot and TPS carriers processor 148 demodulates the TPS information conveyed by modulated pilot signals. The second output port of the pilot and TPS carriers processor 148 is connected for supplying the TPS information to an SMT-MH processing unit 192 shown in FIG. 24.

The third output port of the pilot and TPS carriers processor 148 is connected for forwarding unmodulated pilot carriers to the input port of the AFPC generator 143. The real components of the unmodulated pilot carriers are multiplied by their respective imaginary components in the AFPC generator 143. The resulting products are summed and low-pass filtered to develop the AFPC signal that the AFPC generator 143 supplies to the front-end tuner 142 for controlling the final local oscillator therein. Other ways of developing AFPC signals for the final local oscillator in the front-end tuner 142 are also known, which can replace or supplement the method described above. One such other way is described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997. That patent describes complex digital samples from the tail of each OFDM symbol being multiplied by the conjugates of corresponding digital samples from the cyclic prefix of the OFDM symbol. The resulting products are summed and low-pass filtered to develop the AFPC signal that the AFPC generator 143 supplies to the front-end tuner 142 for controlling the final local oscillator therein.

The fourth output port of the pilot and TPS carriers processor 148 supplies an indication as to whether the COFDM signal being currently received is being transmitted for reception by DTV receivers at a fixed reception site or for reception by M/H DTV receivers apt to be moving. The pilot and TPS carriers processor 148 extracts this indication from the modulation of a TPS carrier. The fifth output port of the pilot and TPS carriers processor 148 is connected for supplying information concerning the respective energies of unmodulated pilot carriers. This information is used for maximal-ratio code combining to be performed in the FIG. 22 portion of the receiver.

A second output port of the FFT demodulator 147 is connected to supply demodulated complex digital samples of 512QAM or 64QAM to the first input port of a frequency-domain channel equalizer 149. FIG. 21 shows the frequency-domain channel equalizer 149 having a second input port connected for receiving pilot carriers supplied from the first output port of the FFT demodulator 147. A simple form of frequency-domain channel equalizer 149 measures the amplitude of the unmodulated pilot carriers to determine basic weighting coefficients for various portions of the frequency spectrum. The carriers conveying convolutional coding in QAM format are then multiplied by respective weighting coefficients determined by interpolation among the basic weighting coefficients determined by measuring the amplitudes of the unmodulated pilot carriers. Various alternative types of frequency-domain channel equalizer are also known. As thusfar described, the FIG. 21 initial portion of a COFDM receiver is similar to the initial portions of COFDM receivers used for DVB in Europe.

The output port of the channel equalizer 149 is connected for supplying equalized carriers conveying convolutional coding in QAM format to the input port of a de-mapper 150 for cruciform 512QAM symbol constellations. Preferably, the close-to-Gray mapping of the 512QAM de-mapper 150 is such that the data bits of the PCCC change value with smaller changes in spatial frequency than the parity bits of the PCCC. The 512QAM de-mapper 150 is operable for reproducing at output ports thereof soft decisions regarding the successive bits of the one-third-code-rate PCCC generated by the PCCC encoder 10 in the FIG. 2 portion of the DTV transmitter. Preferably, the 512QAM de-mapper 150 generates these bit-soft decisions in the log-likelihood-ratio (LLR} format, or approximations thereto which are also suitable for subsequent turbo decoding. A way of generating bit-soft decisions that closely adhere to the LLR format is described in U.S. Pat. No. 6,907,084 granted 14 Jun. 2005 to Gibong Jeong and titled "Method and apparatus for processing modulation symbols for soft input decoders". U.S. Pat. No. 7,076,000 granted 11 Jul. 2006 to Michael J. Rodriguez and titled "Soft-decision metric generation for higher order modulation" describes a simple method of de-mapping Gray-mapped QAM symbol constellations. One way of generating bit-soft decisions that approximate the LLR format is described in U.S. Pat. No. 7,179,335 granted 21 Nov. 2006 to Thomas J. Kolze and titled "Optimal decision metric approximation in bit-soft decisions". Another way of generating bit-soft decisions that approximate the LLR format is described in U.S. Pat. No. 7,480,342 titled "Soft value calculation for multilevel signals", which was granted 20 Jan. 2009 to Leif Wilhelmsson and Peter Maim.

The output port of the channel equalizer 149 is further connected for supplying equalized carriers conveying convolutional coding in QAM format to the input port of a de-mapper 151 for square 64QAM symbol constellations. Preferably, the Gray mapping of the 64QAM de-mapper 151 is such that the data bits of the PCCC change value with smaller changes in spatial frequency than the parity bits of the PCCC. The 64QAM de-mapper 151 is operable for reproducing at output ports thereof soft decisions regarding the successive bits of the one-third-code-rate PCCC generated by the PCCC encoder 35 in the FIG. 4 portion of the DTV transmitter. Preferably, the 64QAM de-mapper 151 generates these bit-soft decisions in the log-likelihood-ratio (LLR} format, or approximations thereto which are also suitable for subsequent turbo decoding.

The output ports of the de-mappers 150 and 151 respectively connect to first and second input ports of a selector 152 for reproducing at an output port thereof the soft de-mapping results from a selected one of those de-mappers 150 and 151. This selection is made responsive to an indication of whether or not received transmissions were designed for M/H reception, which indication is supplied from the fourth output port of the pilot and TPS carriers processor 148. The output port of the selector 152 is connected for supplying the soft de-mapping results reproduced therefrom to the input ports of selectors 153 and 154 depicted in FIG. 22.

FIG. 22 shows the selector 153 as being operable for reproducing at its output port just transmissions that are not repeated and the final ones of those transmissions that are repeated for iterative-diversity reception. FIG. 22 shows the selector 154 as being operable for reproducing at its output port just the initial ones of those transmissions subsequently repeated for iterative-diversity reception. The output port of the selector 154 is connected for writing to the input port of a delay memory 155 which memory is employed to delay the initial transmissions subsequently once-repeated for iterative-diversity reception. The delay can be prescribed fixed delay or, alternatively, can be programmable responsive to delay specified by bits of TPS coding. In either case, the delay is such that the transmissions subsequently repeated for iterative-diversity reception are supplied from the output port of the delay memory 155 concurrently with the corresponding final transmissions as repeated for iterative-diversity reception that are supplied from the output port of the selector 153.

FIG. 22 shows a maximal-ratio code combiner 156 that is connected for receiving at a first of its two input ports the soft bits of one-third-rate PCCC of delayed initial transmissions read from the output port of the delay memory 155. The second input port of the maximal-ratio code combiner 156 is connected for receiving the soft bits of one-third-rate PCCC of final transmissions supplied from the output port of the selector 153. The maximal-ratio code combiner 156 combines the two soft PCCC signals input thereto in accordance with information concerning the respective strengths of their pilot carriers as supplied thereto from the fifth output port of the pilot and TPS carriers processor 148. The output port of the maximal-ratio code combiner 156 is connected for supplying best soft estimates of code-combined one-third-rate PCCC to the respective input ports of three selectors 157, 158 and 159.

FIG. 22 shows the selector 157 connected for selectively reproducing at its output port just the soft data bits of one-third-rate PCCC supplied to its input port from the output port of the maximal-ratio code combiner 156. The output port of the selector 157 is connected for supplying best soft estimates of the data bits of received one-third-rate PCCC as write input signal to a memory 160, which temporarily stores those soft data bits. The memory 160 also temporarily stores soft extrinsic data bits determined during the subsequent turbo decoding procedures. Soft data bits are read from the memory 160 without being combined with corresponding soft extrinsic data bits during the initial half cycle of an iterative turbo decoding procedure. Thereafter, when soft data bits are read from the memory 160 during subsequent half cycles of the iterative turbo decoding procedure, the soft data bits have respectively corresponding soft extrinsic data bits additively combined therewith. The soft extrinsic data bits temporarily stored in the memory 160 are updated responsive to the results of decoding one-third-rate PCCC each half cycle of the iterative turbo decoding procedure.

FIG. 22 shows the selector 158 connected for selectively reproducing at its output port just a first set of soft parity bits from the one-third-rate PCCC supplied to its input port from the output port of the maximal-ratio code combiner 156. The output port of the soft-parity-bits selector 158 is connected to supply these selectively reproduced soft parity bits as write input signal to a memory 161 for temporarily storing the soft parity bits of the one-third-rate PCCC for each successive even-numbered time-slice.

FIG. 22 shows the selector 159 connected for selectively reproducing at its output port just a second set of soft parity bits from the one-third-rate PCCC supplied to its input port from the output port of the maximal-rate code combiner 156. The output port of the soft-parity-bits selector 159 is connected to supply these selectively reproduced soft parity bits as write input signal to a memory 162 for temporarily storing the soft parity bits of the one-third-rate PCCC for each successive delayed odd-numbered time-slice.

The memories 160, 161 and 162 together temporarily store all the components of the PCCC for a given service to be received by the COFDM DTV receiver depicted in FIGS. 21, 22, 23 and 24. The PCCC is turbo decoded by soft-input/soft-output decoders 163 and 164 in FIG. 22, which preferably employ the sliding-window log-MAP algorithm. The term "log-MAP" is short for "logarithmic maximum a posteriori". During the initial half of each cycle of turbo decoding, the SISO decoder 163 decodes one-half-rate CC that includes soft parity bits from an even-numbered time-slice of the service being received. During the final half of each cycle of turbo decoding, the SISO decoder 164 decodes one-half-rate CC that includes soft parity bits from an odd-numbered time-slice of the service being received. The soft data bits that the SISO decoders 163 and 164 supply from their respective output ports as respective decoding results are compared to combined soft data bits and soft extrinsic data bits read from the memory 160. This is done to generate updated soft extrinsic data bits to be written back to the memory 160. At the conclusion of turbo decoding, combined soft data bits and soft extrinsic data bits are read from the memory 160 to supply an ultimate soft turbo decoding result to the FIG. 23 portion of the DTV receiver.

FIG. 22 shows a soft-symbols selector 165 that selects soft data bits and soft parity bits to be supplied from first and second output ports thereof, respectively, to first and second input ports of the SISO decoder 163 during the initial half of each cycle of turbo decoding. The soft-symbols selector 165 relays soft data bits additively combined with soft extrinsic data bits, if any, as read to a first input port thereof from the memory 160, thus to generate the soft data bits supplied to the first input port of the SISO decoder 163. The soft-symbols selector 165 reproduces the soft parity bits read to a second input port thereof from the memory 161, thus generating the soft parity bits supplied to the second input port of the SISO decoder 163. In actual practice, the soft-symbols selector 165 will usually be incorporated into the structures of the memories 160 and 161.

The soft data bits supplied from the output port of the SISO decoder 163 as decoding results during the initial half of each cycle of turbo decoding are supplied to a first of two input ports of an extrinsic-data-feedback processor 165. The processor 165 differentially combines soft data bits read from the memory 160 with corresponding soft data bits of the SISO decoder 163 decoding results to generate extrinsic data feedback written into the memory 160 to update the soft extrinsic data bits temporarily stored therein.

FIG. 22 shows a soft-symbols selector 167 that selects soft data bits and soft parity bits to be supplied as input soft symbols to a soft-symbols de-interleaver 168. The soft-symbols de-interleaver 168 responds to supply de-interleaved soft data bits and de-interleaved soft parity bits from first and second output ports thereof, respectively, to first and second input ports of the SISO decoder 164 during the final half of each cycle of turbo decoding. The soft symbols selector 167 relays soft data bits additively combined with soft extrinsic data bits, if any, as read to a first input port thereof from the memory 160, thus to generate the soft data bits supplied to the soft-symbols de-interleaver 168. The soft-symbols selector 167 reproduces the soft parity bits read to a second input port thereof from the memory 162, thus to generate the soft parity bits supplied to the soft symbols de-interleaver 168. The de-interleaving provided by soft-symbols de-interleaver 168 complements the bit interleaving of data bits when the second set of parity bits for one-third rate PCCC are generated by the encoder 10 in the FIG. 2 portion of a DTV transmitter or by the encoder 35 in the FIG. 4 portion of a DTV transmitter.

The soft data bits supplied from the output port of the SISO decoder 164 as decoding results during the final half of each cycle of turbo decoding are supplied to the input port of a soft-bits interleaver 169 in FIG. 22. FIG. 22 shows the output port of the soft-bits interleaver 169 connected to a first of two input ports of an extrinsic data feedback processor 170. The interleaving provided by soft-bits interleaver 169 is similar to the bit interleaving of data bits when the second set of parity bits for one-third rate PCCC are generated by the encoder 10 in the FIG. 2 portion of a DTV transmitter or by the encoder 35 in the FIG. 4 portion of a DTV transmitter. The processor 170 differentially combines soft data bits read to its second input port from the memory 160 with corresponding soft data bits of the soft-bits interleaver 169 response to generate extrinsic data feedback written into the memory 160 to update the soft extrinsic data bits temporarily stored therein.

In actual practice, the soft-symbols selector 167 will usually be incorporated into the structures of the memories 160 and 162. The soft-symbols de-interleaver 168 will usually not appear as a separate physical element either. Instead, its function is subsumed into the memories 160 and 162 by suitable addressing of them when reading soft data bits and soft parity bits directly to the first and second input ports of the SISO decoder 164. The soft-bits interleaver 169 need not appear as a separate physical element either, its function being subsumed into the memory 160 by suitable addressing thereof during operation of the extrinsic feedback data processor 170. More particularly, the memory 160 is addressed in de-interleaved bits order during reading of soft data bits including soft extrinsic data from the memory 160 to the second input port of the processor 170; and the memory 160 is addressed in that same de-interleaved bits order during updating of the soft bits of extraneous data temporarily stored therein with soft bits supplied from the output port of the processor 170. Since the operations of the SISO decoders 163 and 164 alternate in time, a single decoder structure is apt be used for implementing both the SISO decoders 163 and 164, as will be described infra with reference to FIG. 32. The foregoing description of turbo decoding describes each cycle as beginning with decoding of an even-numbered time-slice and concluding with the decoding of an odd-numbered time-slice. The order of decoding is arbitrarily chosen, however. Alternatively, turbo decoding can be done with each cycle thereof beginning with decoding of an odd-numbered time-slice and concluding with the decoding of an even-numbered time-slice.

After a last half cycle of the iterative turbo decoding procedure, soft data bits as additively combined with respectively corresponding soft extrinsic data bits are read from the memory 160 to the input port of the quantizer 171 depicted in FIG. 23. The read addressing for the memory 160 is such that soft bits of (204, 188) lateral Reed-Solomon (LRS) coding are read to the input port of the quantizer 171.

FIG. 23 shows an 8-bit-byte former 172 connected for forming the serial-bit response of the quantizer 171 into eight-bit bytes. An extended-byte former 173 is connected for receiving the 8-bit bytes formed by the 8-bit-byte former 172 and appending to each of those bytes a number of bits indicative of the likelihood that that byte is in error. These bits, indicative of the level of lack of confidence that a byte is correct, are generated in the following way. A bank 174 of XOR gates is connected for exclusive-ORing the hard bit of each successive soft data bit in the turbo decoding results read from the memory 160 with each of the soft bits descriptive of the level of confidence that hard bit is correct. The bank 174 of XOR gates thus generates a respective set of bits indicative of the level of lack of confidence that each successive hard bit is correct. A selector 175 selects the largest of the successive lack-of-confidence levels regarding the eight bits in each 8-bit-byte, to determine a level of lack of confidence that the byte is correct. The selector 175 provides the extended-byte former 173 with bits indicative of the level of lack of confidence that the byte is correct, which bits are appended to the byte to generate an extended-byte. Typically, there are four to eight bits in the byte extensions. The output port of the extended-byte former 173 is connected for supplying successive extended-bytes to the input port of an LRS decoder 176 for (204, 188) lateral Reed-Solomon (LRS) coding.

FIG. 23 shows the LRS decoder 176 as being of a preferred type that uses a decoding algorithm for correcting up to sixteen byte errors in each (204, 188) LRS codeword, but requires that byte errors be located by means other than that decoding algorithm. Accordingly, the LRS decoder 176 can include a threshold detector that compares the levels of lack of confidence for each byte in each successive (204, 188) LRS codeword to a threshold value. This threshold detector generates a byte error indication for each byte having a level of lack of confidence that exceeds the threshold value. The threshold detector then provides the LRS decoder 176 with indications of the locations of the byte errors in the (204, 188) LRS codeword next to be corrected. The threshold detector is preferably an adaptive threshold detector similar to the adaptive threshold detector 200 in FIG. 25. The LRS decoder 176 is unusual also in that it is provided capability for adjusting the extension of each byte in the 188-byte IPE packets in the decoding results therefrom. The output port of the LRS decoder 176 supplies the input port of a re-interleaver 177 with de-interleaved bytes of 188-byte data-randomized IPE packets with each byte accompanied by a byte extension indicative of the level of lack of confidence in that byte being correct. If the LRS decoder 176 was capable of correcting de-interleaved bytes from data-randomized IPE packets, the byte extensions are zero-valued. If the LRS decoder 176 was incapable of correcting the de-interleaved bytes from data-randomized IPE packets, the byte extensions retain the values they had upon entry into the LRS decoder 176.

The re-interleaver 177 for extended bytes supplies extended bytes of successive data-randomized IPE packets from its output port to the input port of a data-packet separator 178. If the LRS encoder 33 is not preceded by the byte de-interleaver 32 in the FIG. 3 portion of the DTV transmitter, the re-interleaver 177 for extended bytes is replaced by a direct connection from the output port of the LRS decoder 176 to the input port of the data-packet separator 178.

Responsive to indications from the pilot and TPS carriers processor 148 in FIG. 21 as to whether or not received DTV signals were transmitted for reception by M/H receivers, the data-packet separator 178 separates data packets with MPE-FEC coding from data packets without MPE-FEC coding. The data packets without MPE-FEC coding, transmitted for reception by stationary receivers, are selectively reproduced from a first output port of the data-packet separator 178. The data packets with MPE-FEC coding, transmitted for reception by M/H receivers, are selectively reproduced from a second output port of the data-packet separator 178 for application to the random-access write-input port of a random-access memory 179, to be written into row after row of extended-byte storage locations in that RAM 179. The RAM 179 is operated to perform the matrix-type block de-interleaving procedure that is a first step of the TRS decoding routine.

After the extended bytes of data-randomized IPE packets are written into rows of extended-byte storage locations in the RAM 179, the RAM 179 is subsequently read column of extended-byte storage locations by column to a TRS decoder 180 of transverse (255, 191) Reed-Solomon code. The extension bits accompanying the 8-bit bytes of the TRS code are used to help locate byte errors for the TRS code. Such previous location of byte errors facilitates successful use of a Reed-Solomon erasure-decoding algorithm capable of correcting more byte errors than a decoding algorithm that must locate byte errors as well as correct them. So, as many as sixty-four erroneous bytes can be corrected in each (255, 191) TRS codeword. The 8-bit data bytes that have been corrected insofar as possible by the TRS decoder 180 are written, column by column, into respective columns of byte-storage locations of a random-access memory 181. In a final step of the TRS decoding routine, the byte-storage locations in the RAM 181 are read from row by row for supplying reproduced randomized M/H data to a first input port of a data packet selector 182.

A second input port of the data packet selector 182 is connected for receiving data packets without MPE-FEC coding, transmitted for reception by stationary receivers, as selectively reproduced from a first output port of the data-packet separator 178. Responsive to indications from the pilot and TPS carriers processor 148 in FIG. 21 as to whether or not received DTV signals were transmitted for reception by M/H receivers, the data packet selector 182 reproduces the data packets it receives at its first input port or the data packets it receives at its second input port. The output port of the data packet selector 182 is connected for supplying the data packets that it reproduces to the input port of a data de-randomizer 183 in the FIG. 24 portion of the M/H receiver.

Referring to FIG. 24, the data de-randomizer 183 de-randomizes those data packets by converting them to serial-bit form and exclusive-ORing the bits of the final 187 bytes of each of them with the pseudo-random binary sequence (PRBS) prescribed for data randomization. The data de-randomizer 183 then converts the de-randomized bits into bytes of IP transfer-stream packets. From this point on, the DTV receiver resembles a mobile/handheld (M/H) receiver for M/H transmissions made using 8 VSB specified by the standard adopted by ATSC on 15 Oct. 2009 that is directed to broadcasting digital television and digital data to mobile receivers. The IP transfer-stream packets essentially correspond to the IP transfer-stream packets that an M/H receiver recovers from M/H transmissions made in accordance with this standard.

The input port of a parsing unit 184 for parsing the data stream into internet-protocol (IP) packets is connected for receiving bytes of DVB-H data from the output port of the DVB-H data de-randomizer 183. The IP-packet parsing unit 184 performs this parsing responsive to two-byte row headers respectively transmitted at the beginning of each row of IP data in the FEC frame. This row header indicates where the earliest start of an IP packet occurs within the row of IP data bytes from the FEC frame. If a short IP packet is completely contained within a row of bytes within the FEC frame, the IP-packet parsing unit 184 calculates the start of a later IP packet proceeding from the packet length information contained in the earlier IP packet from that same row of bytes within the FEC frame.

The IP-packet parsing unit 184 is connected for supplying IP packets to a decoder 185 for cyclic-redundancy-check (CRC) coding in IP packets. Each IP packet begins with a nine-byte header and concludes with a four-byte, 32-bit checksum for CRC coding of that IP packet. The decoder 185 is constructed to preface each IP packet that it reproduces with a prefix bit indicating whether or not error has been detected in that IP packet. The decoder 185 is connected to supply these IP packets as so prefaced to a detector 186 of a "well-known" SMT-MH address and to a delay unit 187. The delay unit 187 delays the IP packets supplied to a packet selector 188 for selecting SMT-MH packets from other IP packets. The delay unit 187 provides delay of a part of an IP packet header interval, which delay is long enough for the detector 186 to ascertain whether or not the "well-known" SMT-MH address is detected.

If the detector 186 does not detect the "well-known" SMT-MH address in the IP packet, the detector 186 output response conditions the packet selector 188 to reproduce the IP packet for application to a packet sorter 189 as input signal thereto. The packet sorter 189 sorts out those IP packets in which the preface provides no indication of CRC coding error for writing to a cache memory 190 for IP packets. The prefatory prefix bit before each of the IP packets that indicates whether there is CRC code error in its respective bytes is omitted when writing the cache memory 190. The cache memory 190 temporarily stores at least those IP packets not determined to contain CRC code error for possible future reading to the later stages 191 of the receiver.

If the detector 186 does detect the "well-known" SMT-MH address in the IP packet, establishing it to be an SMT-MH packet, the detector 186 output response conditions the packet selector 188 to reproduce the SMT-MH packet for application to an SMT-MH processing unit 192, which includes circuitry for generating control signals for the later stages 191 of the M/H DTV receiver. FIG. 24 shows the SMT-MH processing unit 192 connected for receiving FIC information from the TPS carriers processor 184 in FIG. 21. The SMT-MH processing unit 192 integrates this information with information from SMT-MH packets during the generation of Service Map Data. The Service Map Data generated by the SMT-MH processing unit 192 is written into memory 193 for temporary storage therein and subsequent application to the later stages 194 of the M/H DTV receiver. The SMT-MH processing unit 192 relays those SMT-MH packets that have bit prefixes that do not indicate error in the packets to a user interface 194, which includes an Electronic Service Guide (ESG) and apparatus for selectively displaying the ESG on the viewing screen of the M/H DTV receiver. A patent application filed for A. L. R. Limberg, published 11 Mar. 2010 as US-2010-0061465-A1, and titled "Sub-channel Acquisition in a Digital Television Receiver Designed to Receive Mobile/Handheld Signals" provides more detailed descriptions of the operations of the portion of an M/H receiver similar to what FIG. 24 depicts. The description with reference to the drawing FIGS. 12, 13 and 14 of that application describe operations relying on the SMT-MH tables prescribed by ATSC standard A/153.

FIG. 25 is a schematic diagram showing in greater detail a representative adaptive threshold detector 200 used to locate byte errors for decoding (204, 188) LRS coding in the FIG. 23 portion of a DTV receiver. The adaptive threshold detector 200 comprises elements 201-208. The output port of the selector 175 is connected for supplying lack-of-confidence levels for successive bytes of (204, 188) LRS codewords to first of two input ports of a comparator 201, the second input port of which is connected for receiving an adjustable error threshold. The adjustable error threshold, like each of the lack-of-confidence levels, is a binary number. So, the comparator 201 can be a simple digital subtractor connected for receiving the selector 175 response as minuend, for receiving the adjustable error threshold as subtrahend, and for supplying a difference response that locates byte errors for the LRS decoder 176. When the lack-of-confidence level in regard to a current byte exceeds the adjustable error threshold, the comparator 201 signals the erroneous byte by supplying a ONE to the LRS decoder 176 to indicate that the current byte contains bit error. When the lack-of-confidence level in regard to a current byte is below the adjustable error threshold, the comparator 201 supplies the LRS decoder 176 a ZERO to signal that the byte is error-free.

FIG. 25 shows the sum output signal from a clocked digital adder 202 supplied to the comparator 201 as the adjustable error threshold. The value of the error threshold is initialized in the following way at the outset of each (204, 188) LRS codeword being read from the memory 160. A two-input multiplexer 203 is connected to supply its response as a first of two summand signals supplied to the adder 202, the second summand signal being arithmetic one. The sum output signal from the clocked adder 202 is applied as one of two input signals to the multiplexer 203, and an initial error threshold value less one is applied as the other input signal to the multiplexer 203. Just before each (204, 188) LRS codeword is read from the memory 160 a respective pulsed logic ONE is generated by an LRS decoding controller 204. The pulsed logic ONE is applied as control signal to the multiplexer 203, conditioning it to reproduce the initial error threshold value less one in its response supplied to the adder 202 as a summand input signal. The clocked adder 202 receives its clock signal from an OR gate 205 connected to receive the pulsed logic ONE at one of its input connections. The OR gate 205 reproduces the pulsed logic ONE in its response, which pulsed logic ONE clocks an addition by the adder 202. The adder 202 adds its arithmetic one summand input signal to the initial error threshold value less one summand input signal received from the multiplexer 203, generating the initial error threshold value as its sum output signal supplied to the comparator 201.

The pulsed logic ONE also resets to arithmetic zero the binary-number output count from a byte-error counter 206 that is connected for counting the number of logic ONEs that the comparator 201 generates during the decoding of each (204, 188) LRS codeword. This binary-number output count is applied as subtrahend input signal to a digital subtractor 207, the minuend input signal of which is sixteen expressed as a binary number. Sixteen is the number of parity bytes in a (208, 188) LRS codeword and is the maximum number of erroneous bytes that can be corrected in such a codeword by using erasure decoding. A minus-sign-bit detector 208 is connected for responding to the sign bit of the difference output signal from the subtractor 207. The minus-sign-bit detector 208 generates a logic ONE if and when the number of byte errors in a (204, 188) LRS codeword counted by the counter 206 exceeds sixteen. This logic ONE is supplied to the RS decoding controller 204 as an indication that the current (204, 188) LRS codeword is to be read again from the memory 160. This logic ONE is supplied to the OR gate 205 as an input signal thereto. The OR gate 205 responds with a logic ONE that resets the counter 206 to zero output count and that clocks the clocked digital adder 202. Normally, the multiplexer 203 reproduces the error threshold supplied as sum output from the adder 202. This reproduced error threshold is applied to the adder 202 as a summand input signal, connecting the clocked adder 202 for clocked accumulation of arithmetic ones in addition to the previous error threshold. The logic ONE from the OR gate 205 causes the error threshold supplied as sum output from the adder 202 to be incremented by arithmetic one. This tends to reduce the number of erroneous bytes located within the (204, 188) LRS codeword upon its being read again from the memory 160. If and when the number of erroneous bytes located in the (204, 188) LRS codeword is sixteen or less, the LRS decoding controller 204 will cause the next (204, 188) LRS codeword in the M/H Group to be processed, if there is such next RS codeword.

FIG. 25 shows a dual-port random-access memory 195 that provides for the temporary storage of data-randomized MPEG-2 data packets or data-randomized IPE packets. The output port of the LRS decoder 176 is connected to the random-access write input port of the RAM 195, and the serial read-output port of the RAM 195 is connected to the input port of the data de-randomizer 183 shown in FIG. 23. If the convolutional byte interleaving of (204, 188) LRS codewords in the DTV transmitter is coded byte interleaving, the 188-byte data packets that the LRS decoder 176 supplies for being written into addressable byte-storage locations in the RAM 195 will require convolutional byte interleaving to generate data-randomized MPEG-2 packets or data-randomized IPE packets to be read from the serial read-output port of the RAM 195 to the input port of the data de-randomizer 183 depicted in FIG. 23. Such byte interleaving is arranged for by suitable write addressing when the 188-byte data packets supplied from the LRS decoder 176 are written into addressable byte-storage locations in the RAM 195. The RAM 195 is operable as the convolutional byte interleaver 177 shown in FIG. 23.

If the convolutional byte interleaving of (204, 188) RS codewords in the DTV transmitter is not coded in nature, the LRS decoder 176 will supply data-randomized MPEG-2 packets or data-randomized IPE packets for being written into addressable byte-storage locations in the RAM 195. The write addressing of RAM 195 will be such that the data-randomized packets will simply be temporarily stored for subsequently being read out in original order from the serial read-output port of the RAM 195 to the input port of the data-packet separator 178 depicted in FIG. 23.

Data-randomized MPEG-2 packets or data-randomized IPE packets from each time-slice are read from the RAM 195 only after completion of the respective turbo decoding of that time-slice, which can be arranged for as follows. The LRS decoder 176 is connected for supplying indications of when it supplies the input port of the RAM 195 with a randomized data packet that is correct. These indications are supplied as count input signal to a counter 196. The count output from the counter 196 is reset to arithmetic zero at the beginning of each cycle of turbo decoding a time-slice. The count output from the counter 196 is supplied to a detector 197 for determining when the counter 196 is able to reach full count by the conclusion of a cycle of turbo decoding a time-slice. The full count is the total number of correct (204, 188) LRS codewords in a time-slice, which information is supplied from the pilot and TPS carriers processor 148 in FIG. 21. If the full count of correct (204, 188) LRS codewords per time-slice is reached at the conclusion of a cycle of turbo decoding, the detector 197 supplies an indication of this condition to a PCCC decoding controller. The PCCC decoding controller, not shown in FIG. 25, can respond to this indication by concluding turbo decoding of the time-slice before the maximum allowed number of decoding iterations is reached. This indication also enables the reading of successive data-randomized MPEG-2 data packets or data-randomized IPE data packets from the serial read-output port of the RAM 195.

FIG. 26 shows in more detail the connections to and from the extended-byte-organized RAM 179 for de-interleaving extended bytes of (255, 191) TRS codewords and temporarily storing them in respective columns of extended-byte storage locations. A random-access write-input port of the RAM 179 is connected for receiving the extended bytes of data-randomized IPE packets selected by the data-packet separator 178 shown in FIG. 23 because they have MPE-FEC coding. The addressing of the extended-byte storage locations in the RAM 179 is such as to write the extended bytes of successive data-randomized IPE packets into rows of those extended-byte storage locations.

FIG. 26 shows the RAM 179 connected for reading successive data-randomized IPE packets to the input port of a data de-randomizer 126 the output port of which supplies IPE packets to the input port of a decoder 127 of the cyclic-redundancy-check (CRC) coding of IP packets. The CRC decoder 127 de-encapsulates the IP packets for CRC decoding. The CRC decoder 127 adjusts the byte extensions of IP packets it finds to be correct during CRC decoding so as to decrease their levels of lack-of-confidence—e.g., to arithmetic zero—and supplies the updated byte extensions to the RAM 179 for over-writing their previous values. Owing to drafting limitations, FIG. 26 does not explicitly show the details of how this over-writing is performed. However, arranging for such over-writing is within the average skill of digital systems designers. These procedures for updating the extensions of IP packet bytes improve the byte-error location capability of an adaptive threshold detector 210 that FIG. 26 shows for locating byte errors for the TRS decoder 180 used to decode (255, 191) Reed-Solomon coding in the FIG. 23 portion of a DTV receiver.

Preferably, the LRS decoder 176 shown in FIG. 23 is provided with capability for adjusting the extensions of bytes supplied from its output port. These adjustments can improve the byte-error location capability of the adaptive threshold detector 210 that FIG. 26 shows for locating byte errors for the TRS decoder 180 used to decode (255, 191) Reed-Solomon coding in the FIG. 23 portion of a DTV receiver. If the convolutional byte interleaving of the (204, 188) LRS codewords is coded or implied in nature, the byte-error location capability afforded by the LRS decoder 176 will be skewed respective to the byte-error location capability afforded by the CRC decoder 127. So, the byte-error location capabilities respectively afforded by the LRS decoder 176 and by the CRC decoder 127 will be substantially independent from each other. If the convolutional byte interleaving of the (204, 188) LRS codewords is not coded or implied, byte-error location capabilities respectively afforded by the LRS decoder 176 and by the CRC decoder 127 will overlap in considerable degree. Substantial independence of the byte-error location capabilities respectively afforded by the LRS decoder 176 and by the CRC decoder 127 provides subsequent TRS decoding operations more byte-error location information.

FIG. 26 shows the RAM 179 having a first read-output port for supplying the 8-bit bytes of (255, 191) TRS codewords to the TRS decoder 180 and having a second read-output port for supplying the extension bits for each of those bytes to the adaptive threshold detector 210 comprising elements 211-218. The second read-output port of the RAM 179 is connected for supplying lack-of-confidence levels for successive bytes of (255, 191) RS codewords to first of two input ports of a comparator 211, the second input port of which is connected for receiving an adjustable error threshold. The adjustable error threshold, like each of the lack-of-confidence levels, is a binary number. So, the comparator 211 can be a simple digital subtractor connected for receiving the byte extensions read from the second read-output port of the RAM 179 as minuend, for receiving the adjustable error threshold as subtrahend, and for supplying a difference response that locates byte errors for the TRS decoder 180. When the lack-of-confidence level in regard to a current byte exceeds the adjustable error threshold, the comparator 211 signals the erroneous byte by supplying a ONE to the TRS decoder 180 for indicating that the current byte contains bit error. When the lack-of-confidence level in regard to a current byte is below the adjustable error threshold, the comparator 211 supplies the TRS decoder 180 a ZERO to signal that the byte is error-free.

FIG. 26 shows the sum output signal from a clocked digital adder 212 supplied to the comparator 211 as the adjustable error threshold. The value of the error threshold is initialized in the following way at the outset of each (255, 191) TRS codeword being read from the RAM 179. A two-input multiplexer 213 is connected to supply its response as a first of two summand signals supplied to the adder 212, the second summand signal being arithmetic one. The sum output signal from the clocked adder 212 is applied as one of two input signals to the multiplexer 213, and an initial error threshold value less one is applied as the other input signal to the multiplexer 213. Just before each (255, 191) TRS codeword is read from the RAM 179 a respective pulsed logic ONE is generated by a TRS decoding controller 214. The pulsed logic ONE is applied as control signal to the multiplexer 213, conditioning it to reproduce the initial error threshold value less one in its response supplied to the adder 212 as a summand input signal. The clocked adder 212 receives its clock signal from an OR gate 215 connected to receive the pulsed logic ONE at one of its input connections. The OR gate 215 reproduces the pulsed logic ONE in its response, which pulsed logic ONE clocks an addition by the adder 212. The adder 212 adds its arithmetic one summand input signal to the initial error threshold value less one summand input signal received from the multiplexer 213, generating the initial error threshold value as its sum output signal supplied to the comparator 211.

The pulsed logic ONE also resets to arithmetic zero the binary-number output count from a byte-error counter 216 that is connected for counting the number of logic ONEs that the comparator 211 generates during the decoding of each (255, 191) TRS codeword. This binary-number output count is applied as subtrahend input signal to a digital subtractor 217, the minuend input signal of which is sixty-four expressed as a binary number. A minus-sign-bit detector 218 is connected for responding to the sign bit of the difference output signal from the subtractor 217. The minus-sign-bit detector 218 generates a logic ONE if and when the number of byte errors in a (255, 191) TRS codeword counted by the counter 216 exceeds sixty-four. This logic ONE is supplied to the TRS decoding controller 214 as an indication that the current (255, 191) TRS codeword is to be read again from a column of extended-byte storage locations in the RAM 179. This logic ONE is supplied to the OR gate 215 as an input signal thereto. The OR gate 215 responds with a logic ONE that resets the counter 216 to zero output count and that clocks the clocked digital adder 212. Normally, the multiplexer 213 reproduces the error threshold supplied as sum output from the adder 212. This reproduced error threshold is applied to the adder 212 as a summand input signal, connecting the clocked adder 212 for clocked accumulation of arithmetic ones in addition to the previous error threshold. The logic ONE from the OR gate 215 causes the error threshold supplied as sum output from the adder 212 to be incremented by arithmetic one. This tends to reduce the number of erroneous bytes located within the (255, 191) TRS codeword upon its being read again from the RAM 179. If and when the number of erroneous bytes located in the (255, 191) TRS codeword is sixty-four or less, the TRS decoding controller 214 will cause the next (255, 191) TRS codeword in the M/H Group to be processed, if there is such next TRS codeword.

FIG. 27 replaces FIG. 22 in the schematic diagram of FIGS. 21, 22, 23 and 24 to provide a schematic diagram of a DTV receiver for reception of COFDM signals that convey different sets of convolutional coding of the same data at different times, which different sets of convolutional coding are combined by the DTV receiver to form PCCC to be turbo decoded. As in FIG. 22, FIG. 27 depicts the input ports of the selectors 153 and 154 connected for receiving the soft de-mapping results reproduced at the output port of the selector 152 shown in FIG. 21. FIG. 27 also shows the selector 153 as being operable for reproducing at its output port just transmissions that are not repeated and the final ones of those transmissions that are repeated for iterative-diversity reception. FIG. 27 also shows the selector 154 as being operable for reproducing at its output port just the initial ones of those transmissions subsequently repeated for iterative-diversity reception. The output port of the selector 154 is connected for writing to the input port of the delay memory 155 which memory is employed to delay the initial transmissions subsequently once-repeated for iterative-diversity reception.

FIG. 27 shows a selector 220 connected for selectively reproducing at its output port just the soft data bits from the one-half-rate CC selected to its input port by the selector 153. FIG. 27 shows a selector 221 connected for selectively reproducing at its output port just the soft data bits from the one-half-rate CC read to its input port from the delay memory 155. A maximal-ratio code combiner 230 is connected for receiving at a first of its two input ports the soft data bits selectively reproduced at the output port of the soft-data-bits selector 220. The second input port of the maximal-ratio code combiner 230 is connected for receiving the soft data bits selectively reproduced at the output port of the soft-data-bits selector 221. The output port of the maximal-ratio code combiner 230 is connected for supplying best soft estimates of the data bits of the one-half-rate CC as write input signal to the memory 160, which temporarily stores those soft data bits.

The memory 160 also temporarily stores soft extrinsic data bits determined during the subsequent turbo decoding procedures. Soft data bits are read from the memory 160 without being combined with corresponding soft extrinsic data bits during the initial half cycle of an iterative turbo decoding procedure. Thereafter, when soft data bits are read from the memory 160 during subsequent half cycles of the iterative turbo decoding procedure, the soft data bits have respectively corresponding soft extrinsic data bits additively combined therewith. The soft extrinsic data bits temporarily stored in the memory 160 are updated responsive to the results of decoding CC each half cycle of the iterative turbo decoding procedure.

FIG. 27 shows a selector 221 connected for selectively reproducing at its output port just the soft parity bits from the one-half-rate CC selected to its input port by the selector 153. The output port of the soft-parity-bits selector 221 is connected to supply these selectively reproduced soft parity bits as write input signal to the memory 161 for temporarily storing the soft parity bits of the one-half-rate CC for each successive even-numbered time-slice.

FIG. 27 shows a selector 22 connected for selectively reproducing at its output port just the soft parity bits from the one-half-rate CC read to its input port from the delay memory 155. The output port of the soft-parity-bits selector 222 is connected to supply these selectively reproduced soft parity bits as write input signal to the memory 162 for temporarily storing the soft parity bits of the one-half-rate CC for each successive delayed odd-numbered time-slice.

The memories 160, 161 and 162 together temporarily store all the components of the PCCC for a given service to be received by the DTV receiver depicted in FIGS. 21, 27, 23 and 24. This PCCC is turbo decoded by turbo decoding apparatus comprising elements 163, 164, 165, 166, 167, 168, 169 and 170 constructed and operated similarly to the correspondingly numbered elements of the turbo decoding apparatus depicted in FIG. 22.

FIG. 28 is a more detailed schematic diagram showing the interconnection of elements 231, 232, 233, 234, 235, 236, 237, 238 and 239 of the maximal-ratio code combiner 230 shown in FIG. 27. FIG. 28 shows the code combiner 230 is connected for receiving pilot-carrier-energy information from the pilot and TPS carriers processor 148 shown in FIG. 21. The pilot and TPS carriers processor 148 squares the real and imaginary terms of each unmodulated pilot carrier, sums the resulting squares and square-roots the sum to determine the root-mean-square (RMS) energy of that unmodulated pilot carrier. This procedure can be carried out for each unmodulated pilot carrier using read-only memory addressed by the real and imaginary terms of each successively considered unmodulated pilot carrier. The RMS energies of the unmodulated pilot carriers are then summed by an accumulator to determine the total RMS energy of the unmodulated pilot carriers for each OFDM symbol epoch.

The value of the total RMS energy supplied from the pilot and TPS carriers processor 148 is delayed by shim delay 229 for application to the respective input ports of selectors 231 and 232. The selector 231 reproduces at its output port the total energy of the unmodulated pilot carriers during those transmissions that are not repeated and the final ones of the those transmissions repeated for iterative-diversity reception. The selector 232 reproduces at its output port the total energy of the unmodulated pilot carriers during the initial ones of those transmissions repeated for iterative-diversity reception. A delay memory 233 is connected for delaying the selector 232 response for supplying a delayed selector 232 response concurrent with the selector 231 response.

The length of delay afforded by the delay memory 233 is essentially the same as the length of delay afforded by the delay memory 155. Presumably, the latent delay of the pilot and TPS carriers processor 148 in generating the total energy of the unmodulated pilot carriers is shorter than the combined latent delays through the channel equalizer 151, the de-mapper 150 or 151, and the selectors 152, 153 and 154 etc. The shim delay 229 compensates for this. However, the latent delay of the pilot and TPS carriers processor 148 in generating the total energy of the unmodulated pilot carriers could be longer. If so, the shim delay 229 is replaced by direct connection from the pilot and TPS carriers processor 148 to the selectors 231 and 232. Shim delay is instead introduced in the cascade connection of the channel equalizer 151 and elements that follow.

A digital adder 234 is connected for adding the selector 231 response and the delayed selector 232 response read from the delay memory 233. The sum output response from the adder 234 combines the total energies of the initial and final transmissions for iterative-diversity reception, to be used for normalizing the weighting of the responses from the soft-data-bits selector 153 and delay memory 155, or from the soft-data-bits selectors 220 and 222.

A read-only memory 235 is connected for multiplying the response from the selector 153 in FIG. 22 (or from the soft-data-bits selector 220 in FIG. 27) by the total energy of a final transmission for iterative-diversity reception. A read-only memory 236 is connected for multiplying the response from the delay memory 155 in FIG. 22 (or from the soft-data-bits selector 222 in FIG. 27) by the total energy of the corresponding initial transmission for iterative-diversity reception. The product from the ROM 235 is a weighted response from the from the selector 153 in FIG. 22 (or from the soft-data-bits selector 220 in FIG. 27) that is then normalized with respect to the total energies of the initial and final transmissions for iterative-diversity reception. A read-only memory 237 is connected for performing this normalization, dividing the product from the ROM 235 by the sum output response from the adder 234. The product from the ROM 236 is a weighted response from the delay memory 155 in FIG. 22 (or from the soft-data-bits selector 222 in FIG. 27) that is then normalized with respect to the total energies of the initial and final transmissions for iterative-diversity reception. A read-only memory 238 is connected for performing this normalization, dividing the product from the ROM 236 by the sum output response from the adder 234. A digital adder 239 is connected for summing the respective quotients from the ROMs 237 and 238 to generate the response that the maximal-ratio code combiner 230 supplies for being written to the memory 160 for soft data bits shown in FIG. 27.

One skilled in digital design is apt to perceive that, alternatively, normalization of the coefficients for weighting of the responses from the soft-data-bits selector 153 and delay memory 155, or from the soft-data-bits selectors 220 and 222, can be performed before such weighting, rather than after. A single read-only memory can be designed to perform the combined functions of the ROMs 235 and 237; and a single read-only memory can be designed to perform the combined functions of the ROMs 236 and 238. Alternatively, a very large single read-only memory can be designed to perform the combined functions of the digital adder 239 and of the ROMs 235, 236, 237 and 238. The computations can be performed by digital circuitry other than read-only memories, but problems with proper timing are considerably more difficult.

The operation of the maximal-ratio code combiner 230 following a change in RF channel or sub-channel is of interest. Following such a change, a DTV receiver as described supra will not have correct foregoing initial transmissions for iterative-diversity reception stored in its delay memory 155. Accordingly, the DTV receiver erases in bulk the contents of the delay memory 155. The pilot and TPS carriers processor 148 will not have supplied the maximal-ratio code combiner 230 with correct information concerning the RMS-energy of pilot carriers accompanying the foregoing initial transmissions for iterative-diversity reception. Accordingly, the DTV receiver erases the contents of delay memory 233 within the maximal-ratio code combiner 230 that stores such information. This erasure conditions the maximal-ratio code combiner 230 for single-transmission reception until the delay memory 233 therein refills with information concerning the RMS-energy of pilot carriers accompanying the foregoing initial transmissions for iterative-diversity reception. During this delay in the maximal-ratio code combiner 230 beginning iterative-diversity reception, the delay memory 155 fills with initial transmissions for iterative-diversity reception to be supplied with delay to the code combiner 230 when iterative-diversity reception begins.

The construction and operation of the maximal-ratio code combiner 156 in FIG. 22 are similar to the construction and operation of the maximal-ratio code combiner 230 Each of these maximal-ratio code combiners combines one-dimensional, real-only coded data obtained from separately demapping paired QAM constellation maps. In accordance with a further aspect of the invention, the QAM constellation maps are designed so as not to admix data bits and parity bits of the PCCC in the bits that they respectively map. The transmitter apparatuses depicted in FIGS. 11, 12, 16 and 17 are designed to allow this sort of iterative-diversity reception, making it possible to use maximal-ratio code combining of the complex coordinates of the QAM constellation maps of data bits from the pairs of transmissions designed for iterative-diversity reception. When both the earlier transmissions of the QAM constellations and the later transmissions of the same QAM constellations are received in strength, such combining of the complex coordinates of paired QAM constellation maps of data bits permits improvement of coordinates estimation in the presence of additive white Gaussian noise (AWGN). This is because the complex coordinates of the paired QAM constellation maps of data bits should be correlated, while the AWGN is uncorrelated. Accordingly, errors in de-mapping are less likely to occur, as well as gaps in reception tending to be filled. Maximal-ratio code combining performed on the results of de-mapping QAM constellation maps of data bits tends to fill gaps in reception, but is not adapted to reducing AWGN. The two-dimensional maximal-ratio code combining of the complex coordinates of two similar QAM constellation maps is referred to as "maximal-ratio QAM combining" in the rest of this specification, and the apparatus for performing such code combining is referred to as a "maximal-ratio QAM combiner". The operation of the maximal-ratio QAM combiner following a change in RF channel or sub-channel is analogous to the operation of a maximal-ratio coder combiner following a change in RF channel or sub-channel, as described in the paragraph just previous.

FIGS. 29, 30 and 31 combine with FIGS. 23 and 24 to provide a schematic diagram of a DTV receiver for reception of COFDM signals that convey different sets of convolutional coding of the same data at different times, using different QAM symbol constellations for data bits and for parity bits of convolutional coding. These different sets of convolutional coding are combined by the DTV receiver to form PCCC to be turbo decoded. FIG. 29 shows modifications made to FIG. 21 of the M/H DTV receiver of FIGS. 21, 22, 23 and 24 in an alternative M/H DTV receiver suited for receiving such transmissions. FIG. 29 differs from FIG. 21 in that the de-mappers 150 and 151 for QAM symbol constellations are omitted, together with the soft demapping results selector 152. The response of the frequency-domain channel equalizer 149 is supplied directly to the input port of a selector 240 operable for reproducing at its output port the complex coordinates of just the QAM symbol constellations that encode transmissions of data that are not repeated and the final transmissions of data that are repeated for iterative-diversity reception. The response of the frequency-domain channel equalizer 149 is supplied directly to the input port of a selector 241 operable for reproducing at its output port complex coordinates of just the QAM symbol constellations that encode initial transmissions of data subsequently retransmitted for iterative-diversity reception. That is, the selectors 240 and 241 selectively respond to the complex coordinates of QAM symbol constellations supplied from the frequency-domain channel equalizer 149, rather than to PCCC generated by de-mapping QAM symbol constellations. The output port of the selector 241 is connected for writing to the input port of a delay memory 242 which memory is employed to delay the initial transmissions of the data subsequently once-repeated for iterative-diversity reception. The delay is such that the complex coordinates of delayed QAM symbol constellations that encode initial transmissions of data are supplied from the output port of the delay memory 242 concurrently with the complex coordinates of QAM symbol constellations supplied from the output port of the selector 240 that encode the corresponding final transmissions of similar data.

The complex coordinates of just the QAM symbol constellations that encode transmissions of data that are not repeated and the final transmissions of data that are repeated for iterative-diversity reception, which are supplied from the output port of the selector 240, are supplied to the input ports of selectors 243 and 244 depicted in FIG. 30. The complex coordinates of delayed QAM symbol constellations that encode initial transmissions of data, which are supplied from the output port of the delay memory 242, are supplied to the input ports of selectors 245 and 246 depicted in FIG. 30.

FIG. 30 shows a maximal-ratio QAM combiner 250 for combining the complex coordinates of QAM symbol constellations descriptive of data bits, as selected by the selector 243 from the final transmissions for iterative-diversity reception, with the complex coordinates of any QAM symbol constellations descriptive of the same data bits, as selected by the selector 245 from the delayed earlier initial transmissions for corresponding iterative-diversity reception. The output port of the selector 243 is connected for supplying a first of two input ports of the QAM combiner 250 with complex coordinates of QAM symbol constellations descriptive of data bits, as selected from complex coordinates of corresponding QAM symbol constellations from the final transmissions that are supplied to the input port of the selector 243 from the output port of the selector 240. The complex coordinates of QAM symbol constellations descriptive of data bits, as selected from the delayed initial transmissions for iterative-diversity reception, if any, are supplied to the second input port of the QAM combiner 250 from the output port of the selector 245. The maximal-ratio QAM combiner 250 combines the two sets of complex coordinates of QAM symbol constellations applied to its first and its second input ports, respectively, in accordance with pilot energy information supplied from the pilot and TPS carriers processor 148 depicted in FIG. 29 regarding each of these two sets of complex coordinates of QAM symbol constellation.

The output port of the QAM combiner 250 connects to the respective input ports of a de-mapper 251 for 256QAM symbol constellations and a de-mapper 252 for 64QAM symbol constellations. FIG. 30 shows a selector 253 for selecting soft data bits to be written to the memory 160 shown in FIG. 31. A first of two data input ports of the selector 253 is connected for receiving soft data bits from an output port of the de-mapper 251 for 256QAM symbol constellations. The second data input port of the selector 253 is connected for receiving soft data bits from an output port of the de-mapper 252 for 64QAM symbol constellations. The selector 253 reproduces from its data output port the soft data bits supplied to one of its first and second data input ports, as selected by control signal supplied from the pilot and TPS carriers processor 148 via a connection not explicitly shown in FIG. 30.

The output port of the selector 244 connects to the respective input ports of a de-mapper 254 for 256QAM symbol constellations and a de-mapper 255 for 64QAM symbol constellations to supply them the complex coordinates of the QAM symbol constellations that encode parity bits of transmissions of data that are not repeated and of the final transmissions of data that are repeated for iterative-diversity reception. FIG. 30 shows a selector 256 for selecting soft parity bits to be written to the memory 161 shown in FIG. 31. A first of two parity input ports of the selector 256 is connected for receiving soft parity bits from an output port of the de-mapper 254 for 256QAM symbol constellations. The second parity input port of the selector 256 is connected for receiving soft parity bits from an output port of the de-mapper 255 for 64QAM symbol constellations. The selector 256 reproduces from its parity output port the soft parity bits supplied to one of its first and second parity input ports, as selected by control signal supplied from the pilot and TPS carriers processor 148 via a connection not explicitly shown in FIG. 30.

The output port of the selector 246 connects to the respective input ports of a de-mapper 257 for 256QAM symbol constellations and a de-mapper 258 for 64QAM symbol constellations to supply them the complex coordinates of the QAM symbol constellations that encode parity bits of the initial transmissions of data as delayed by the delay memory 242 shown in FIG. 29. FIG. 30 shows a selector 259 for selecting soft parity bits to be written to the memory 162 shown in FIG. 31. A first of two parity input ports of the selector 259 is connected for receiving soft parity bits from an output port of the de-mapper 257 for 256QAM symbol constellations. The second parity input port of the selector 256 is connected for receiving soft parity bits from an output port of the de-mapper 258 for 64QAM symbol constellations. The selector 259 reproduces from its parity output port the soft parity bits supplied to one of its first and second parity input ports, as selected by control signal supplied from the pilot and TPS carriers processor 148 via a connection not explicitly shown in FIG. 30.

FIG. 31 depicts turbo decoding apparatus essentially similar to that depicted in FIG. 22. The memories 160, 161 and 162 together temporarily store all the components of the PCCC for a given service to be received by the M/H DTV receiver depicted in FIGS. 29, 30, 31, 23 and 24. The PCCC is turbo decoded by soft-input/soft-output decoders 163 and 164 in FIG. 31 in cooperation with the elements 164-170, operation being similar to that described supra with reference to FIG. 21. At the conclusion of turbo decoding, combined soft data bits and soft extrinsic data bits are read from the memory 160 to supply an ultimate turbo decoding result to the input port of the quantizer 171 shown in FIG. 23.

FIG. 32 is a schematic diagram of turbo decoding apparatus alternative to any of those shown in FIGS. 22, 27 and 31, which alternative turbo decoding apparatus employs a single SISO decoder 264 instead of the two SISO decoders 163 and 164. During one half of the turbo decoding cycle the selector 165 supplies the second CC component of the PCCC to the input port of the SISO decoder 264, and during the other half of the turbo decoding cycle the selector 167 supplies the first CC component of the PCCC to the input port of the SISO decoder 264. This alternative turbo decoding apparatus employs one extrinsic data feedback processor 265 rather than the two extrinsic data feedback processors 166 and 170. The extrinsic data feedback processor 265 differentially combines soft data bits read from the memory 160 with corresponding soft data bits of the SISO decoder 264 decoding results, thus to generate extrinsic data feedback written into that memory to update the soft extrinsic data bits temporarily stored therein.

FIG. 33 depicts a modification or further modification of any of the turbo decoders shown in FIGS. 22, 27 and 31 so it can decode PCCC in which the first and second sets of parity bits have different coded interleaving. FIG. 33 shows the output port of the soft-symbols selector 165 connected for supplying soft symbols to the input port of a soft symbols de-interleaver 268, rather than connecting directly to the input port of the SISO decoder 163 for one-half-rate CC. The output port of the soft-symbols de-interleaver 268 is connected for supplying de-interleaved soft symbols to the input port of the SISO decoder 163. FIG. 33 does not show the output port of the SISO decoder 163 connected directly to the first input port of the extrinsic-data-feedback processor 166. FIG. 33 shows the output port of the SISO decoder 163 connected instead to the input port of a soft-bits interleaver 269 which re-interleaves soft data bits for application to the first input port of the extrinsic-data-feedback processor 166. In practice, the soft symbols selector 165 and the soft-symbols de-interleaver 268 will usually not appear as separate physical elements. Instead, their functions are subsumed into the memories 160 and 161 by suitably addressing them when reading soft data bits and soft parity bits directly to the first and second input ports of the SISO decoder 163. The soft-bits interleaver 269 need not appear as a separate physical element either, its function being subsumed into the memory 160 by suitable addressing during operation of the extrinsic feedback data processor 166.

FIG. 34 shows further elements included in preferred connections to and from the memory 160 for soft data bits and extrinsic data, as shown in any of FIG. 22, 27, 32 or 33. These further elements are operable to decrease lack-of-confidence levels of data bits of correct (204, 188) lateral Reed-Solomon (LRS) codewords temporarily stored within the memory 160 during the performance of turbo decoding procedures. A third address generator comprising a read-only memory 283 shown in FIG. 35, but not explicitly shown in FIG. 34, is used for addressing the memory 160 so as to de-interleave the convolutional byte interleaving of soft bits of (204, 188) LRS codewords read from the memory 160 during a break in a normal cycle of turbo decoding procedure. The respective hard-decision bits of these soft bits of (204, 188) LRS codewords are supplied to the input port of an LRS decoder 271 for (204, 188) Reed-Solomon coding. The respective further bits of these soft bits expressive of confidence levels for their respective hard-decision bits are supplied to an input port of a generator 272 of lower or lowest lack-of-confidence levels for bits of (204, 188) RS codewords that are correct(ed). I e., for bits of (204, 188) LRS codewords that were originally correct or that have been corrected by the LRS decoder 271 for (204, 188) LRS coding. The lack-of-confidence level generator 272 includes a temporary storage register for the lack-of-confidence levels of each successive (204, 188) LRS codeword.

The lack-of-confidence level generator 272 can include circuitry responsive to the lack-of-confidence levels of hard-decision bits in each (204, 188) LRS codeword to locate byte errors for the LRS decoder 271. This allows the LRS decoder 271 to use a byte-error-correction-only algorithm that can correct sixteen byte errors per (204, 188) LRS codeword, rather than a byte-error-location-and-correction-only algorithm that can correct only eight byte errors per (204, 188) LRS codeword. FIG. 34 shows a connection 273 for conveying byte-error-location information from the lack-of-confidence level generator 272 to the LRS decoder 271.

When the LRS decoder 271 finds a (204, 188) LRS codeword to be correct or is able to correct it, the LRS decoder 271 supplies the memory 160 an over-write enable signal conditioning the memory 160 to accept over-writing of the soft data bits regarding that (204, 188) RS codeword. The soft data bits used for such over-writing are composed of hard-decision bits supplied by the LRS decoder 271 and accompanying further bits indicative of the lack-of-confidence levels regarding those hard-decision bits, which further bits are supplied by the lack-of-confidence level generator 272. The over-write enable signal conditions the third address generator comprising the ROM 283, used to address the memory 160 during over-writing the soft data bits regarding a (204, 188) LRS codeword, so as to interleave convolutionally the bytes of the correct(ed) LRS codeword.

When the LRS decoder 271 finds a (204, 188) RS codeword to be correct or is able to correct it, the LRS decoder 271 supplies the lack-of-confidence level generator 272 a pulse indication that this is so. The lack-of-confidence level generator 272 responds to this pulse indication to decrease, if possible, the lack-of-confidence levels of the bits of the correct(ed) RS codeword written back to the memory 160. This can be done, for example, by subtracting a specified increment from the lack-of-confidence level of each soft data bit stored in the temporary storage register and replacing any negative lack-of-confidence level with a zero-valued lack-of-confidence level.

FIG. 34 shows an up-counter 274, the count input port of which is connected for receiving the pulse indications the RS decoder 271 supplies responsive to finding (204, 188) RS codewords to be correct(ed). The count supplied from the count output port of the up-counter 274 is reset to zero at the beginning of each cycle of turbo decoding. The count output port of the up-counter 274 is connected for supplying the count of correct (204, 188) LRS codewords per time-slice to the input port of a detector 275 of reaching the full count of correct LRS codewords per time-slice. That is, the count of correct LRS codewords per time-slice associated with every one of the (204, 188) LRS codewords in a time-slice being correct. The value for such full count for a time-slice is specified to the detector 275 from the pilot and TPS carriers processor 148. If the full count of correct LRS codewords per time-slice is reached at the conclusion of a cycle of turbo decoding, the detector 275 supplies an indication of this condition to a PCCC decoding controller 276. The PCCC decoding controller 276, shown in FIG. 35, can respond by concluding turbo decoding of the time-slice earlier than a prescribed maximum time for turbo decoding of the time-slice.

The up-counter 274 for counting correct LRS codewords per time-slice and the detector 275 of the full count of correct LRS codewords per time-slice being reached can be replaced by a down-counter and a detector for zero count being reached in an alternative arrangement for concluding turbo decoding of the time-slice earlier than a prescribed maximum time for turbo decoding of the time-slice. At the beginning of each cycle of turbo decoding, the count supplied from the count output port of the down-counter is reset to a top count specified by the pilot and TPS carriers processor 148. The count output from the down-counter is supplied to the input port of the detector for zero count being reached. If zero count has been reached at the conclusion of a cycle of turbo decoding, the PCCC decoding controller 276, shown in FIG. 35, can respond by concluding turbo decoding of the time-slice.

Variants of the lack-of-confidence level generator 272 described above simply replace the lack-of-confidence levels of all the soft bits of correct(ed) LRS codewords written back to the memory 160 with zero-valued or very-low-valued lack-of-confidence levels. The convolutional byte interleaving of a correct(ed) LRS codeword written back to the memory 160 disperses the soft data bits with decreased levels of lack-of-confidence throughout the CC presented to the SISO decoder 163 for decoding. The convolutional byte interleaving of the correct(ed) LRS codeword also disperses the soft data bits with decreased levels of lack-of-confidence throughout the CC presented to the SISO decoder 164 for decoding. The dispersal of data bits with low lack-of-confidence levels throughout the CC presented to the SISO decoder 163 facilitates its selecting data bit sequences most likely to be correct as its decoding results. The dispersal of data bits with low lack-of-confidence levels throughout the CC presented to the SISO decoder 164 facilitates its selecting data bit sequences most likely to be correct as its decoding results.

FIG. 35 depicts apparatus for addressing memories within of any of the turbo decoders shown in FIGS. 22, 27, 32 and 33, as modified per FIG. 34. FIG. 35 shows the memory 160, the memory 161 for a first set of PCCC parity bits in a time-slice, and the memory 162 for a second set of PCCC parity bits in a time-slice, all of which memories are connected for receiving addresses from an addressing selector 280. The respective temporarily stored contents of the memories 160, 161 and 162 are erased in bulk before being reloaded to begin the processing of a succeeding time-slice. The addressing selector 280 is connected for receiving control signal from the PCCC decoding controller 276, which control signal determines the selection of addressing made by the addressing selector 280. The addressing selector 280 is operable for reproducing at its output port the read output response from a selected one of the ROMs 281, 282 and 283 connected for supplying their respective read output responses to respective ones of first, second and third input ports of the addressing selector 280. The PCCC decoding controller 276 is connected for supplying a dual-bit control signal to the addressing selector 280 to control selection of the appropriate one of the addressing scans read from the ROMs 281, 282 and 283.

A clocked up/down symbol counter 277 is reset to initial count, ordinarily arithmetic zero for an up count, at the beginning of each address scan of the memories 160, 161 and 162. The count from the symbol counter 277 is supplied as read addressing to each of three read-only memories 281, 282 and 283. The symbol counter 277 is connected for receiving an up/down control signal from the PCCC decoding controller 276. The symbol counter 277 is conditioned to count up when the memories 160, 161 and 162 are originally written using write addressing generated by scanning the first list of addresses stored in the ROM 281. The symbol counter 277 is conditioned to count down during the reversed-time scanning of symbols performed during turbo decoding procedures.

The ROM 281, storing a first list of addresses for the memories 160, 161 and 162, functions as a first address generator. The memories 160, 161 and 162 are addressed according to forward scanning of a suitable first list when they are initially written with soft bits of a new time-slice. Such operations are described more particularly, as follows. The memories 160, 161 and 162 in FIG. 22 are addressed according to forward scanning of a suitable first list when selected ones of them are initially written with soft bits of a new time-slice supplied from the soft de-mapping results selector 152 in FIG. 21. The memories 160, 161 and 162 in FIG. 27 are addressed according to forward scanning of a suitable first list when selected ones of them are initially written with soft bits of a new time-slice supplied from the code combiner 180, from the soft parity bits selector 228 and from the soft parity bits selector 230, respectively. The memories 160, 161 and 162 in FIG. 31 are addressed according to forward scanning of a suitable first list when selected ones of them are initially written with soft bits of a new time-slice from the selector 253 of soft data bits, from the selector 256 of the first set of soft parity bits, and from the selector 259 of the second set of soft parity bits, respectively.

The memories 160 and 161 are addressed according to reversed scanning of a first list stored in ROM 281 when they read soft data bits, soft extrinsic-data bits and soft parity bits of first CC to the SISO decoder 163 for decoding of first CC in the time-slices. The memory 160 is addressed according to reversed scanning of a first list stored in ROM 281 when soft extrinsic data bits are updated by the extrinsic data feedback processor 166 responsive to decoding results from the SISO decoder 163.

The ROM 282, storing a second list of addresses for the memories 160 and 162, functions as a second address generator. The memories 160 and 162 are addressed according to this second list stored in the ROM 282 when reading soft data bits, soft extrinsic-data bits and soft parity bits of second CC to the SISO decoder 164 for decoding of second CC in the time-slices. Such read addressing provides de-interleaving to counteract symbol interleaving introduced at the DTV transmitter. The memory 160 is addressed according to this second list when soft extrinsic data bits are updated by the extrinsic data feedback processor 170 responsive to decoding results from the SISO decoder 164.

The ROM 283, storing a third list of addresses for the memory 160, functions as a third address generator. The memory 160 is addressed according to this third list stored in the ROM 283 when reading (204, 188) LRS codewords from the memory 160. Such read addressing provides de-interleaving to counteract the convolutional byte interleaving introduced at the DTV transmitter. The memory 160 is also addressed according to this third list stored in the ROM 283 when writing corrected (204, 188) LRS codewords back into the memory 160 together with updated confidence levels regarding the hard data bits in those codewords. Such write addressing restores the convolutional byte interleaving introduced at the DTV transmitter.

FIG. 36 is an informal flow chart that illustrates the improved method of turbo decoding employed by the turbo decoders shown in FIGS. 22, 27, 32 and 33 as modified to include the further elements shown in FIGS. 34 and 35. In an initial step 291 of the method, each set of three soft bits descriptive of a PCCC symbol are loaded into a respective one of the addressed storage locations within the turbo decoder memory composed of RAM 160 and further RAMs for PCCC parity bits.

FIG. 36 shows a next step 292 of the improved turbo decoding method, wherein the contents of the addressed storage locations within the RAM 160 temporarily storing PCCC data bits are read using addressing that de-interleaves the convolutional byte interleaving of the (204, 188) LRS codewords of the time-slice temporarily stored in turbo decoder memory. The step 292 supplies the LRS decoder 271 shown in FIG. 34 with (204, 188) LRS codewords of a time-slice, as transmitted only one time or as finally transmitted for iterative-diversity reception.

FIG. 36 shows a next step 293 of the improved turbo decoding method, wherein each of the (204, 188) LRS codewords are decoded and byte errors are corrected insofar as possible. In the portion of the turbo decoder shown in FIG. 34, the decoder 271 for (204, 188) LRS codewords performs this part of the step 293. The step 293 is a compound step in which indications are generated as to whether or not each byte of the (204, 188) LRS codewords is correct at the conclusion of the step 293. In this part of the step 293, the decoder 271 generates a respective bit indicating whether or not each LRS codeword it has processed will be correct at the conclusion of the step 293.

FIG. 36 shows a next step 294 of the improved turbo decoding method, wherein the bytes of (204, 188) LRS codewords are re-interleaved while being written back to the RAM 160 after LRS decoding and possible correction. The re-interleaved bytes, together with appended indications as to whether each byte is correct supplied by the generator 272 shown in FIG. 34, update the temporarily stored contents of the RAM 160 in step 295 of the improved turbo decoding method.

The steps 292, 293 and 294 provide the crux of the improvement in the FIG. 36 method of turbo decoding. FIG. 36 shows these steps being carried out successively, processing consecutive (204, 188) LRS codewords from each time-slice as a group, rather than individually. This facilitates understanding the general concept of what the improvement is in the turbo decoding method. However, processing the consecutive (204, 188) LRS codewords of each time-slice as a group, rather than individually, requires the LRS decoder 271 to have a considerable amount of memory of its own. This memory is needed to temporarily store each LRS codeword as it is corrected until such time as the group of corrected LRS codewords is written back to RAM 160 to update the contents temporarily stored therein. Preferably, the steps 292, 293 and 294 are performed sequentially for each (204, 188) LRS codeword read from the RAM 160. In the turbo decoding circuitry, such procedure substantially reduces the requirement for memory in the LRS decoder 271 shown in FIG. 34. Such procedure moves to the RAM 160 the temporary storage of (204, 188) LRS codewords required after their correction insofar as possible by the LRS decoder 271. The temporary storage of the (204, 188) LRS codewords after processing by the LRS decoder 271 updates addressed storage locations in the RAM 160, without requiring additional byte-storage capability.

After the steps 292, 293, 294 and 295 are carried out for all (204, 188) LRS codewords from a time-slice, one cycle of PCCC decoding is performed in step 296 of the improved method of PCCC decoding shown in FIG. 36. If the cycle of PCCC decoding performed in step 296 is not the sole one nor the final iteration of a series of PCCC decoding cycles in a turbo decoding procedure, the results from this cycle of PCCC decoding provide turbo feedback for a subsequent step 297. In the step 297 the extrinsic data concerning soft data bits from decoding the outer CC that are temporarily stored in the RAM 160 are updated dependent on the turbo feedback provided by the immediately preceding step 296. The step 297 concludes one cycle of PCCC decoding and begins the next cycle of PCCC decoding in which the step 297 is followed by repeated steps 292, 293 and 294.

The step 296 is followed by a step 298 if the cycle of PCCC decoding performed in step 296 is the sole one or is the final iteration of a series of PCCC decoding cycles in a turbo decoding procedure. In the step 298 the soft data bits of the ultimate PCCC decoding results are forwarded to the quantizer 171 as shown in FIG. 23.

FIG. 36 shows the steps 292, 293 and 294 being performed after every cycle of decoding PCCC. The methods of turbo decoding illustrated by FIG. 36 may be modified so as to skip the steps 292, 293 and 294 in some cycles of decoding PCCC. For example, the steps 292, 293 and 294 can be skipped in the first few cycles of decoding PCCC when the accumulated value of the confidence levels of data bits is low enough to indicate that LRS codewords are likely not to be correct or correctable.

FIG. 37 shows further elements included in preferred connections to and from the RAM 160 for soft data bits and extrinsic data as shown in any of FIG. 22, 27, 32 or 33, which further elements are operable to increase confidence levels of soft data bits of correct IP packets temporarily stored within the RAM 160 during the performance of turbo decoding procedures. The respective hard-decision bits of the soft bits of IP packets temporarily stored within the RAM 160 are read therefrom, de-randomized by a data de-randomizer 300, and supplied to the input port of a decoder 301 for cyclic-redundancy-check (CRC) coding of IP packets. FIG. 37 shows connections for supplying the hard-decision bits of the soft bits of IP packets and the respective further bits of these soft bits expressive of lack-of-confidence levels for their respective hard-decision bits to an input port of a generator 302 of lower or lowest lack-of-confidence levels for bits of IP packets that the CRC decoder 301 finds to be correct. Typically, the lack-of-confidence level generator 302 includes a temporary storage register for the hard-decision bits of the soft bits of IP packets and further includes another temporary storage register for the lack-of-confidence levels for those soft bits.

The addressing of the RAM 160 during its reading to the respective input ports of the data de-randomizer 300 and the lack-of-confidence level generator 302 is generated by sequentially scanning the first list of addresses stored in the ROM 281 responsive to symbol count from the counter 277. Addressing for the RAM 160 is generated similarly when its contents are subsequently updated from the lack-of-confidence level generator 302 and possibly from the decoder 301 for CRC coding of IP packets.

The lack-of-confidence level generator 302 decreases, if possible, the lack-of-confidence levels of the bits of each IP packet apt to be written back to the RAM 160. This can be done, for example, by subtracting a specified increment from the lack-of-confidence level of each soft data bit stored in the temporary storage register and replacing any negative lack-of-confidence level with a zero-valued lack-of-confidence level.

When the CRC decoder 301 finds an IP packet to be correct, the CRC decoder 301 supplies the RAM 160 an over-write enable signal conditioning the RAM 160 to accept over-writing of the soft data bits regarding that IP packet. The soft data bits used for such over-writing are composed of hard-decision bits read from their temporary storage register and accompanying further bits indicative of the lack-of-confidence levels regarding those hard-decision bits. These further bits have been generated by the lack-of-confidence level generator 302, used to update the temporary storage register in the lack-of-confidence level generator 302 for such further bits, and are now used for over-writing soft data bits regarding an IP packet as temporarily stored in the RAM 160.

When the CRC decoder 301 finds an IP packet to be incorrect, the CRC decoder 301 simply withholds supplying the RAM 160 an over-write enable signal conditioning the RAM 160 to accept over-writing of the soft data bits regarding that IP packet. The soft bits of the IP packet temporarily stored in extended-byte storage locations in the RAM 160 are left unchanged.

In an alternative design, the RAM 160 is operated so that the hard-decision bits of soft bits of the IP packet are not over-written when the bits are that are indicative of the lack-of-confidence levels in those soft bits. In such an alternative design, the lack-of-confidence level generator 302 is not connected for receiving hard-decision bits read from the RAM 160 and does not include a temporary storage register for such hard-decision bits.

FIG. 37 shows a down-counter 303, the count input port of which is connected for receiving the pulse indications the CRC decoder 301 supplies responsive to finding IP packets to be correct. The count supplied from the count output port of the down-counter 303 is reset to topmost count at the beginning of each cycle of turbo decoding. The value for such topmost count for a time-slice is specified by the pilot and TPS carriers processor 148. The count output port of the down-counter 303 is connected for supplying the down count of correct IP packets per time-slice to the input port of a detector 304 of when zero count is reached. If zero count has been reached at the conclusion of a cycle of turbo decoding, the detector 304 supplies an indication of this condition to the PCCC decoding controller 276. The PCCC decoding controller 276 shown in FIG. 35 can respond by concluding turbo decoding of the time-slice.

Both the modifications shown in FIGS. 34 and 37 can be made to the turbo decoding apparatus shown in any of FIG. 22, 27, 32 or 33. In DTV transmissions designed for mobile or pedestrian reception, the CRC codewords are askew from the (204, 188) LRS codewords. In DTV transmissions designed for reception by stationary receivers, the CRC codewords are also askew from the (204, 188) LRS codewords, providing that the convolutional byte interleaving of the LRS codewords is coded in nature. If CRC codewords are askew from the LRS codewords, preliminary decoding of the CRC coding of IP packets by the CRC decoder 301 can improve the locating of erroneous byte errors for erasure decoding by the LRS decoder 271.

DTV receivers that use the LRS decoder 271 as described supra can be modified to omit the elements 171-177. The LRS decoder 271 and associated circuitry can then be used to perform the functions of the omitted elements 171-177.

Optimal Gray mapping and optimal close-to-Gray mapping of bit-wise FEC coding at one-half and one-third code rates to QAM symbol constellations are employed in the DTV transmitter apparatus described supra. Such mappings are described in some detail in U.S. patent application Ser. No. 13/555,117 filed by A. L. R. Limberg on 6 Aug. 2012 with the title "COFDM broadcast systems employing turbo coding". However, bit-wise FEC coding can be performed at other code rates, such as the 7/8, 5/6, 3/4 and 2/3 code rates that together with 1/2 code rate are the valid code rates for DVB DTV broadcasting. Transmissions for iterative-diversity reception will halve the overall code rate for bit-wise FEC coding. The turbo decoding procedures in DTV receiver apparatus described supra have to be modified to accommodate these additional code rates, which is done using known techniques.

The QAM symbol constellation mappers 11, 36, 68 and 106 may, per a customary DVB practice, include inner interleaving that permutes the temporal order of groups of bits before coding them into successive QAM symbols for constellation mapping. The bits should be grouped for such inner interleaving in such way as to maintain the nature of the bits at each lattice point of the QAM symbol constellations as specified in FIG. 32, 35, 38 or 40 of the drawing in the above-referenced U.S. patent application Ser. No. 13/493,198 filed on 11 Jun. 2012. If inner interleaving is used in the DTV transmissions, inner de-interleaving of the results of de-mapping the QAM symbol constellations is required. In receiver apparatus as partially shown in any of FIGS. 22, 27, 32 and 33 or modification thereof per FIG. 34, FIG. 37 or both FIGS. 34 and 37, suitable write addressing of the memories 160, 161 and 162 can implement this inner de-interleaving.

In DVB-H the number of (255, 191) outer RS codewords in the MPE-FEC frame is signaled in the service information (SI) and may take any of the values 256, 512, 768, or 1024. In a newly developed system using COFDM for DTV broadcasting in the United States of America, it would be preferable if the number of (255, 191) outer RS codewords in the MPE-FEC frame were to be multiples of 185, rather than multiples of 256. The reason is that this makes it much, much simpler to perform 2-dimensional decoding of the cross-interleaved RS coding (CIRC) in a DTV receiver. The extended bytes that result from "soft" decoding the inner convolutional coding or other bit-wise FEC coding, when written to rows of extended-byte storage locations in a framestore memory (such as the RAM 179 in FIG. 23), can then be aligned so that parity bytes of the inner RS coding are confined to columns of extended-byte storage locations separate from those containing the (255, 191) codewords of the outer RS coding. This considerably simplifies the addressing of such framestore memory during its writing and reading operations.

The foregoing specification considers DTV systems using RS coding serially concatenated with PCCC as the bit-wise FEC coding that is turbo decoded to generate soft bits of RS coding, the confidence levels of which soft bits are analyzed to locate byte error for subsequent decoding of the RS coding. The precepts of the invention extend to DTV systems using RS coding serially concatenated with species of turbo coding other than PCCC.

Frequency-domain equalization is augmented by time-domain equalization in some receiver designs. Recent advances in analog-to-digital converters will allow them to replace much of the front-end tuners in DTV receivers. It will be apparent to persons skilled in the art that various other modifications and variations can be made in the specifically described apparatus without departing from the spirit or scope of the invention. Accordingly, it is intended that these modifications and variations of the specifically described apparatus be considered to result in further embodiments of the invention, which are included within the scope of the appended claims and their equivalents.

In some of the appended claims, lateral Reed-Solomon forward-error-correction coding is specified to be (204, 188) Reed-Solomon forward-error-correction coding. If a different industry standard is used instead of (204, 188) RS FEC coding, it is to be considered by application of the doctrine of equivalency to be equivalent to (204, 188) RS FEC coding when determining whether a receiver infringes upon such claims.

In some of the appended claims, transverse Reed-Solomon forward-error-correction coding is specified to be (255, 191) Reed-Solomon forward-error-correction coding. If a different industry standard is used instead of (255, 191) RS FEC coding, it is to be considered by application of the doctrine of equivalency to be equivalent to (255, 191) RS FEC coding when determining whether a receiver infringes upon such claims.

In the appended claims, the word "said" rather than the word "the" is used to indicate the existence of an antecedent basis for a term being provided earlier in the claims. The word "the" is used for purposes other than to indicate the existence of an antecedent basis for a term having being provided earlier in the claims, the usage of the word "the" for other purposes being consistent with customary grammar in the American English language.

What is claimed is:

1. A receiver apparatus for coded orthogonal frequency-division multiplex (COFDM) transmissions of digital television (DTV) signals, which COFDM transmissions each comprise a plurality of successive time-slices for conveying parallel concatenated redundant coding (PCCC) of convolutionally byte-interleaved lateral Reed-Solomon (LRS) forward-error-correction (FEC) codewords that encode 188-byte packets of digital information, a prescribed number of which said successive time-slices are included in each of successive super-frames of prescribed duration, at least one of said time-slices included in each of said successive super-frames being an initial coded transmission of data repeated in a final coded transmission of the same data within one of said time slices included in a subsequent one of said successive super-frames occurring a prescribed interval later in time, said receiver apparatus comprising:
   demodulation apparatus responding to a selected radio-frequency analog COFDM signal for supplying unmodulated pilot carrier waves and any carrier waves modulated by Transmission Parameters Signaling (TPS) as a first output signal therefrom and for supplying complex samples of quadrature-amplitude-modulation (QAM) of further carrier waves as a second output signal therefrom;
   a processor of said unmodulated pilot carrier waves and said any carrier waves modulated by TPS;
   a frequency-domain channel equalizer for equalizing said complex samples of QAM of said further carrier waves, said equalizing being performed responsive to said unmodulated pilot carrier waves; and
   combinative apparatus for extracting said coded transmissions of data from said complex samples of said QAM of said further carrier waves after their equalization, for combining each said initial coded transmission of data from at least one of said time-slices included in each of said successive super-frames with said final coded transmission of the same data from one of said time-slices included in a subsequent one of said successive super-frames occurring a prescribed interval later in time, and for decoding coded transmissions resulting from such combining.

2. The receiver apparatus as set forth in claim 1, wherein said combinative apparatus comprises:
   a de-mapper of QAM symbol constellations connected for responding to equalized said complex samples of QAM from said frequency-domain channel equalizer to supply parallel concatenated parallel convolutional coding (PCCC) in soft-decision form;
   a selector for selectively reproducing time-slices of said PCCC in soft-decision form that are not repeated and alternatively are finally transmitted encodings of repeated data;
   delay memory connected for delaying time-slices of said PCCC in soft-decision form that are initially transmitted encodings of said repeated data to concur in time with time-slices of said PCCC in soft-decision form that are said finally transmitted encodings of said repeated data;
   a maximal-ratio code combiner for code-combining delayed time-slices of said PCCC in soft-decision form that are said initial encodings of said repeated data that concur in time with time-slices of said PCCC in soft-decision form that are said final encodings of said repeated data, thus to generate a PCCC code-combiner response in soft-decision form, said code-combining being done responsive to the respective energies of said time-slices supplied from said processor of said unmodulated pilot carrier waves and said any carrier waves modulated by TPS;
   a soft-input/soft-output turbo decoder connected for decoding said PCCC code-combiner response in soft-decision form to generate a turbo decoder response in soft-decision form; and
   a decoder connected for decoding LRS FEC codewords in said turbo decoder response in soft-decision form to reproduce said 188-byte packets of digital information.

3. The receiver apparatus as set forth in claim 2, wherein said de-mapper of QAM symbol constellations is operable for de-mapping cruciform 512QAM symbol constellations.

4. The receiver apparatus as set forth in claim 1, capable of usefully receiving COFDM transmissions each comprising a plurality of successive time-slices for conveying parallel concatenated redundant coding of convolutionally byte-interleaved LRS codewords that encode 188-byte internet-protocol-encapulation (IPE) packets of internet-protocol (IP) digital information that utilize MPE-FEC with transverse Reed-Solomon (TRS) additional FEC coding, wherein said combinative apparatus comprises:
    a demapper of QAM symbol constellations connected for responding to equalized said complex samples of QAM from said frequency-domain channel equalizer to supply parallel concatenated convolutional coding (PCCC) in soft-decision form;
    a selector for selectively reproducing time-slices of said PCCC in soft-decision form that are not repeated and alternatively are finally transmitted encodings of repeated data;
    delay memory connected for delaying time-slices of PCCC in soft-decision form that are initially transmitted encodings of said repeated data to concur in time with time-slices of said PCCC in soft-decision form that are said finally transmitted encodings of said repeated data;
    a maximal-ratio code combiner for code-combining delayed time-slices of said PCCC in soft-decision form that are said initially transmitted encodings of said repeated data that concur in time with time-slices of said PCCC in soft-decision form that are said finally transmitted encodings of said repeated data, thus to generate a PCCC code-combiner response in soft-decision form, said code-combining being done responsive to the respective energies of said time-slices supplied from said processor of said unmodulated pilot carrier waves and said any carrier waves modulated by TPS;
    a soft-input/soft-output turbo decoder connected for decoding said PCCC code-combiner response in soft-decision form to generate a turbo decoder response in soft-decision form; and
    a decoder connected for decoding said LRS codewords reproduced in soft-decision form in said turbo decoder response to reproduce said 188-byte IPE packets; said receiver apparatus further comprising apparatus for decoding said TRS additional FEC coding conveyed by said reproduced 188-byte IPE packets to reproduce said internet-protocol (IP) digital information.

5. The receiver apparatus as set forth in claim 4, wherein said de-mapper of QAM symbol constellations is operable for de-mapping square 64QAM symbol constellations.

6. The receiver apparatus as set forth in claim 1, capable of usefully receiving COFDM transmissions each comprising a plurality of successive time-slices for conveying parallel concatenated redundant coding of convolutionally byte-interleaved LRS codewords that encode 188-byte internet-protocol-encapulation (IPE) packets of internet-protocol (IP) digital information that utilize MPE-FEC with transverse Reed-Solomon (TRS) additional FEC coding, wherein said combinative apparatus comprises:
    a demapper of cruciform 512QAM symbol constellations connected for responding to equalized said complex samples of QAM from said frequency-domain channel equalizer to supply 512QAM de-mapping results in soft-decision form;
    a demapper of square 64QAM symbol constellations connected for responding to equalized said complex samples of QAM from said frequency-domain channel equalizer to supply 64QAM de-mapping results in soft-decision form;
    apparatus for selecting from said 512QAM de-mapping results and said 64QAM de-mapping results one of those sets of QAM de-mapping results to supply PCCC in soft-decision form for further processing;
    a selector for selectively reproducing time-slices of said PCCC in soft-decision form that are not repeated and alternatively are finally transmitted encodings of repeated data;
    delay memory connected for delaying time-slices of said PCCC in soft-decision form that are initially transmitted encodings of said repeated data to concur in time with time-slices of said PCCC in soft-decision form that are said finally transmitted encodings of said repeated data;
    a maximal-ratio code combiner for code-combining delayed time-slices of said PCCC in soft-decision form that are said initially transmitted encodings of said repeated data that concur in time with time-slices of said PCCC in soft-decision form that are said finally transmitted encodings of said repeated data, thus to generate a PCCC code-combiner response in soft-decision form, said code-combining being done responsive to the respective energies of said time-slices supplied from said processor of said unmodulated pilot carrier waves and said any carrier waves modulated by TPS;
    a soft-input/soft-output turbo decoder connected for decoding said PCCC code-combiner response in soft-decision form to generate a turbo decoder response in soft-decision form; and
    a decoder connected for decoding said LRS codewords reproduced in soft-decision form in said turbo decoder response to generate 188-byte packets.

7. The receiver apparatus as set forth in claim 6, said receiver apparatus further comprising:
    a separator for selectively reproducing 188-byte IPE packets with MPE-FEC coding separately from selectively reproducing 188-byte packets without MPE-FEC coding, such selective reproduction being controlled by information supplied from said processor of said unmodulated pilot carrier waves and said any carrier waves modulated by TPS;
    apparatus for decoding said TRS additional FEC coding conveyed by said selectively reproduced 188-byte IPE packets to reproduce said IP digital information; and
    a data packet selector for selectively reproducing IP digital information decoded by said apparatus for decoding said TRS additional FEC coding or selectively reproduced by said separator from 188-byte packets without MPE-FEC coding, selective reproduction by said data packet selector being controlled by information supplied from said processor of said unmodulated pilot carrier waves and said any carrier waves modulated by TPS.

8. The receiver apparatus as set forth in claim 1, capable of usefully receiving COFDM transmissions each comprising a plurality of successive time-slices each conveying a convolutional coding (CC) component of said parallel concatenated parallel convolutional coding (PCCC), wherein said combinative apparatus comprises:
    a de-mapper of QAM symbol constellations connected to respond to equalized said complex samples of QAM from said frequency-domain channel equalizer for reproducing successive convolutional coding (CC) components of parallel concatenated parallel convolutional coding (PCCC) in soft-decision form;
    a selector for selectively reproducing time-slices of first said CC components of PCCC in soft-decision form that are finally transmitted encodings of repeated data;
    delay memory connected for delaying time-slices of second said CC components of PCCC in soft-decision form that are initially transmitted encodings of said repeated data to concur in time with time-slices of said first CC components of said PCCC in soft-decision form that are said finally transmitted encodings of said repeated data;

a maximal-ratio code combiner connected for code-combining soft data bits selected from said second CC components of said PCCC in soft-decision form as delayed by said delay memory with corresponding soft data bits selected from said first CC components of said PCCC in soft-decision form, thus to generate code-combined soft data bits that better reproduce data bits of said PCCC in soft-decision form, said code-combining being done responsive to the respective energies of said time-slices supplied from said processor of said unmodulated pilot carrier waves and said any carrier waves modulated by TPS;

a soft-input/soft-output turbo decoder connected for decoding said PCCC as reproduced in soft-decision form, so as to include said code-combined soft data bits, so as to further include soft parity bits selected from said first CC components of said PCCC in soft-decision form, and so as to still further include soft parity bits selected from said second CC components of said PCCC in soft-decision form, thus to generate a turbo decoder response in soft-decision form; and a decoder connected for decoding LRS FEC codewords in said turbo decoder response in soft-decision form to reproduce said 188-byte packets of digital information.

9. The receiver apparatus as set forth in claim 8, wherein said de-mapper of QAM symbol constellations is operable for de-mapping square 256QAM symbol constellations.

10. The receiver as set forth in claim 8, capable of usefully receiving COFDM transmissions each comprising a plurality of successive time-slices, each time-slice conveying a convolutional coding (CC) component of parallel concatenated redundant coding of convolutionally byte-interleaved LRS codewords that encode 188-byte internet-protocol-encapulation (IPE) packets of internet-protocol (IP) digital information that utilize MPE-FEC with transverse Reed-Solomon (TRS) additional FEC coding, wherein said combinative apparatus comprises:

a de-mapper of QAM symbol constellations connected to respond to equalized said complex samples of QAM from said frequency-domain channel equalizer for reproducing successive convolutional coding (CC) components of parallel concatenated parallel convolutional coding (PCCC) in soft-decision form;

a selector for selectively reproducing time-slices of first said CC components of PCCC in soft-decision form that are finally transmitted encodings of repeated data;

delay memory connected for delaying time-slices of second said CC components of PCCC in soft-decision form that are initially transmitted encodings of said repeated data to concur in time with time-slices of said first CC components of said PCCC in soft-decision form that are said finally transmitted encodings of said repeated data;

a maximal-ratio code combiner connected for code-combining soft data bits selected from said second CC components of said PCCC in soft-decision form as delayed by said delay memory with corresponding soft data bits selected from said first CC components of said PCCC in soft-decision form, thus to generate code-combined soft data bits that better reproduce data bits of said PCCC in soft-decision form, said code-combining being done responsive to the respective energies of said time-slices supplied from said processor of said unmodulated pilot carrier waves and said any carrier waves modulated by TPS;

a soft-input/soft-output turbo decoder connected for decoding said PCCC as reproduced in soft-decision form, so as to include said code-combined soft data bits, so as to further include soft parity bits selected from said first CC components of said PCCC in soft-decision form, and so as to still further include soft parity bits selected from said second CC components of said PCCC in soft-decision form, thus to generate a turbo decoder response in soft-decision form; and a decoder connected for decoding LRS FEC codewords in said turbo decoder response in soft-decision form to reproduce said 188-byte IPE packets; said receiver apparatus further comprising apparatus for decoding said TRS additional FEC coding conveyed by said reproduced 188-byte IPE packets to reproduce said internet-protocol (IP) digital information.

11. The receiver apparatus as set forth in claim 10, wherein said de-mapper of QAM symbol constellations is operable for de-mapping square 64QAM symbol constellations.

12. The receiver apparatus as set forth in claim 8, capable of usefully receiving COFDM transmissions each comprising a plurality of successive time-slices, each time-slice conveying a convolutional coding (CC) component of said parallel concatenated redundant coding of convolutionally byte-interleaved LRS codewords, ones of which LRS codewords encode 188-byte internet-protocol-encapulation (IPE) packets of internet-protocol (IP) digital information that utilize MPE-FEC with transverse Reed-Solomon (TRS) additional FEC coding, wherein said combinative apparatus comprises:

a demapper of 256QAM symbol constellations connected for responding to equalized said complex samples of QAM from said frequency-domain channel equalizer to supply 256QAM de-mapping results in soft-decision form;

a demapper of 64QAM symbol constellations connected for responding to equalized said complex samples of QAM from said frequency-domain channel equalizer to supply 64QAM de-mapping results in soft-decision form;

apparatus for selecting from said 256QAM de-mapping results and said 64QAM de-mapping results one of those sets of QAM de-mapping results to supply convolutional coding (CC) in soft-decision form for further processing;

a selector for selectively reproducing time-slices of first said CC components of PCCC in soft-decision form that are finally transmitted encodings of repeated data;

delay memory connected for delaying time-slices of second said CC components of PCCC in soft-decision form that are initially transmitted encodings of said repeated data to concur in time with time-slices of said first CC components of said PCCC in soft-decision form that are said finally transmitted encodings of said repeated data;

a maximal-ratio code combiner connected for code-combining soft data bits selected from said second CC components of said PCCC in soft-decision form as delayed by said delay memory with corresponding soft data bits selected from said first CC components of said PCCC in soft-decision form, thus to generate code-combined soft data bits that better reproduce data bits of said PCCC in soft-decision form, said code-combining being done responsive to the respective energies of said time-slices supplied from said processor of said unmodulated pilot carrier waves and said any carrier waves modulated by TPS;

a soft-input/soft-output turbo decoder connected for decoding said PCCC as reproduced in soft-decision form, so as to include said code-combined soft data bits, so as to further include soft parity bits selected from said first CC components of said PCCC in soft-decision form, and so as to still further include soft parity bits selected from said second CC components of said PCCC in soft-decision form, thus to generate a turbo decoder response in soft-decision form; and a decoder connected for decoding LRS FEC codewords in said turbo decoder response in soft-decision form to reproduce said 188-byte packets.

13. The receiver apparatus as set forth in claim 12, said receiver apparatus further comprising:

a separator for selectively reproducing 188-byte IPE packets with MPE-FEC coding separately from selectively reproducing 188-byte packets without MPE-FEC coding, such selective reproduction being controlled by information supplied from said processor of said unmodulated pilot carrier waves and said any carrier waves modulated by TPS;

apparatus for decoding said TRS additional FEC coding conveyed by said selectively reproduced 188-byte IPE packets to reproduce said IP digital information; and a data packet selector for selectively reproducing IP digital information decoded by said apparatus for decoding said TRS additional FEC coding or selectively reproduced by said separator from 188-byte packets without MPE-FEC coding, selective reproduction by said data packet selector being controlled by information supplied from said processor of said unmodulated pilot carrier waves and said any carrier waves modulated by TPS.

14. The receiver apparatus as set forth in claim 1, capable of usefully receiving COFDM transmissions each comprising a plurality of successive time-slices each conveying a convolutional coding (CC) component of said parallel concatenated parallel convolutional coding (PCCC), the data bits of each CC component conveyed by QAM symbols separate from QAM symbols to convey the parity bits of that said CC component, wherein said combinative apparatus comprises:

a selector for selectively reproducing time-slices of complex coordinates of QAM symbols conveying first said CC components of PCCC in soft-decision form that are finally transmitted encodings of repeated data;

delay memory connected for delaying complex coordinates of QAM symbols conveying time-slices of second said CC components of PCCC in soft-decision form that are initially transmitted encodings of said repeated data to concur in time with time-slices of complex coordinates of QAM symbols conveying said first CC components of said PCCC in soft-decision form that are said finally transmitted encodings of said repeated data;

a first de-mapper of QAM symbol constellations connected to respond to complex coordinates of selected QAM symbols for reproducing parity bits of said first CC components of said PCCC in soft-decision form, as selected by said selector;

a second de-mapper of QAM symbol constellations connected to respond to complex coordinates of selected QAM symbols for reproducing parity bits of said second CC components of said PCCC in soft-decision form, as delayed by said delay memory;

a maximal-ratio QAM combiner connected for code-combining said complex coordinates of QAM symbols conveying data bits of said second CC components of PCCC as delayed by said delay memory with said complex coordinates of QAM symbols conveying corresponding soft data bits selected from said first CC components of said PCCC in soft-decision form, thus to generate code-combined complex coordinates of QAM symbols that better reproduce data bits of said PCCC in soft-decision form, said code-combining being done responsive to the respective energies of said time-slices supplied from said processor of said unmodulated pilot carrier waves and said any carrier waves modulated by TPS;

a third de-mapper of QAM symbol constellations connected to respond to said code-combined complex coordinates of QAM symbols for reproducing data bits of said PCCC in soft-decision form;

a soft-input/soft-output turbo decoder connected for decoding said PCCC as reproduced in soft-decision form, so as to include said data bits reproduced in soft-decision form by said third de-mapper of QAM symbol constellations, so as to further include said parity bits reproduced in soft-decision form by said first de-mapper of QAM symbol constellations, and so as to still further include soft parity bits reproduced in soft-decision form by said second de-mapper of QAM symbol constellations, thus to generate a turbo decoder response in soft-decision form; and a decoder connected for decoding LRS FEC codewords in said turbo decoder response in soft-decision form to reproduce said 188-byte packets of digital information.

15. The receiver apparatus as set forth in claim 14, wherein said de-mapper of QAM symbol constellations is operable for de-mapping square 256QAM symbol constellations.

16. The receiver apparatus as set forth in claim 1, capable of usefully receiving COFDM transmissions each comprising a plurality of successive time-slices each conveying a convolutional coding (CC) component of said PCCC of convolutionally byte-interleaved LRS codewords, ones of which LRS codewords encode 188-byte internet-protocol-encapulation (IPE) packets of internet-protocol (IP) digital information that utilize MPE-FEC with transverse Reed-Solomon (TRS) additional FEC coding, the data bits of each CC component conveyed by QAM symbols separate from QAM symbols to convey the parity bits of that said CC component, wherein said combinative apparatus comprises:

a selector for selectively reproducing time-slices of complex coordinates of QAM symbols conveying first said CC components of PCCC in soft-decision form that are finally transmitted encodings of repeated data;

delay memory connected for delaying complex coordinates of QAM symbols conveying time-slices of second said CC components of PCCC in soft-decision form that are initially transmitted encodings of said repeated data to concur in time with time-slices of complex coordinates of QAM symbols conveying said first CC components of said PCCC in soft-decision form that are said finally transmitted encodings of said repeated data;

a first de-mapper of QAM symbol constellations connected to respond to complex coordinates of selected QAM symbols for reproducing parity bits of said first CC components of said PCCC in soft-decision form, as selected by said selector;

a second de-mapper of QAM symbol constellations connected to respond to complex coordinates of selected QAM symbols for reproducing parity bits of said second CC components of said PCCC in soft-decision form, as delayed by said delay memory;

a maximal-ratio QAM combiner connected for code-combining said complex coordinates of QAM symbols conveying data bits of said second CC components of PCCC as delayed by said delay memory with said complex coordinates of QAM symbols conveying corresponding soft data bits selected from said first CC components of said PCCC in soft-decision form, thus to generate code-combined complex coordinates of QAM symbols that better reproduce data bits of said PCCC in soft-decision form, said code-combining being done responsive to the respective energies of said time-slices supplied from said processor of said unmodulated pilot carrier waves and said any carrier waves modulated by TPS;

a third de-mapper of QAM symbol constellations connected to respond to said code-combined complex coordinates of QAM symbols for reproducing data bits of said PCCC in soft-decision form;

a soft-input/soft-output turbo decoder connected for decoding said PCCC as reproduced in soft-decision form, so as to include said data bits reproduced in soft-decision form by said third de-mapper of QAM symbol constellations, so as to further include said parity bits reproduced in soft-decision form by said first de-mapper of QAM symbol constellations, and so as to still further include soft parity bits reproduced in soft-decision form by said second de-mapper of QAM symbol constellations, thus to generate a turbo decoder response in soft-decision form; and a decoder connected for decoding LRS FEC codewords in said turbo decoder response in soft-decision form to reproduce said 188-byte IPE packets; said receiver apparatus further comprising apparatus for decoding said TRS additional FEC coding conveyed by said reproduced 188-byte IPE packets to reproduce said internet-protocol (IP) digital information.

17. The receiver apparatus as set forth in claim 16, wherein said de-mapper of QAM symbol constellations is operable for de-mapping square 64QAM symbol constellations.

18. The receiver apparatus as set forth in claim 1, capable of usefully receiving COFDM transmissions each comprising a plurality of successive time-slices each conveying a convolutional coding (CC) component of said PCCC of convolutionally byte-interleaved LRS codewords, ones of which said LRS codewords encode 188-byte internet-protocol-encapulation (IPE) packets of internet-protocol (IP) digital information that utilize MPE-FEC with transverse Reed-Solomon (TRS) additional FEC coding, the data bits of each CC component conveyed by QAM symbols separate from QAM symbols to convey the parity bits of that said CC component, wherein said combinative apparatus comprises:

a selector for selectively reproducing time-slices of complex coordinates of QAM symbols conveying first said CC components of PCCC in soft-decision form that are finally transmitted encodings of repeated data;

delay memory connected for delaying complex coordinates of QAM symbols conveying time-slices of second said CC components of PCCC in soft-decision form that are initially transmitted encodings of said repeated data to concur in time with time-slices of complex coordinates of QAM symbols conveying said first CC components of said PCCC in soft-decision form that are said finally transmitted encodings of said repeated data;

a first de-mapper of 256QAM symbol constellations connected to respond to complex coordinates of selected 256QAM symbols for reproducing parity bits of said first CC components of said PCCC in soft-decision form, as selected by said selector;

a second de-mapper of 256QAM symbol constellations connected to respond to complex coordinates of selected 256QAM symbols for reproducing parity bits of said second CC components of said PCCC in soft-decision form, as delayed by said delay memory;

a first maximal-ratio QAM combiner connected for code-combining said complex coordinates of 256QAM symbols conveying data bits of said second CC components of PCCC as delayed by said delay memory with said complex coordinates of 256QAM symbols conveying corresponding soft data bits selected from said first CC components of said PCCC in soft-decision form, thus to generate code-combined complex coordinates of 256QAM symbols that better reproduce data bits of said PCCC in soft-decision form, said code-combining being done responsive to the respective energies of said time-slices supplied from said processor of said unmodulated pilot carrier waves and said any carrier waves modulated by TPS;

a third de-mapper of 256QAM symbol constellations connected to respond to said code-combined complex coordinates of 256QAM symbols for reproducing data bits of said PCCC in soft-decision form;

a first de-mapper of 64QAM symbol constellations connected to respond to complex coordinates of selected 64QAM symbols for reproducing parity bits of said first CC components of said PCCC in soft-decision form, as selected by said selector;

a second de-mapper of 64QAM symbol constellations connected to respond to complex coordinates of selected 64QAM symbols for reproducing parity bits of said second CC components of said PCCC in soft-decision form, as delayed by said delay memory;

a second maximal-ratio QAM combiner connected for code-combining said complex coordinates of 64QAM symbols conveying data bits of said second CC components of PCCC as delayed by said delay memory with said complex coordinates of 64QAM symbols conveying corresponding soft data bits selected from said first CC components of said PCCC in soft-decision form, thus to generate code-combined complex coordinates of 64QAM symbols that better reproduce data bits of said PCCC in soft-decision form, said code-combining being done responsive to the respective energies of said time-slices supplied from said processor of said unmodulated pilot carrier waves and said any carrier waves modulated by TPS;

a third de-mapper of 64QAM symbol constellations connected to respond to said code-combined complex coordinates of 64QAM symbols for reproducing data bits of said PCCC in soft-decision form;

PCCC selection apparatus for selectively reproducing PCCC in soft-decision form generated by one of first and second sets of de-mappers of QAM symbol constellations, said first set of demappers of QAM symbol constellations comprising said first and said second and said third de-mappers of 256QAM symbol constellations, and said second set of demappers of QAM symbol constellations comprising said first and said second and and said third de-mappers of 64QAM symbol constellations;

a soft-input/soft-output turbo decoder connected for decoding said PCCC as reproduced in soft-decision form by said PCCC selection apparatus, thus to generate a turbo decoder response in soft-decision form; and a decoder connected for decoding LRS FEC codewords in said turbo decoder response in soft-decision form to reproduce said 188-byte packets.

19. The receiver apparatus as set forth in claim 18, said receiver apparatus further comprising:

a separator for selectively reproducing 188-byte IPE packets with MPE-FEC coding separately from selectively reproducing 188-byte packets without MPE-FEC coding, such selective reproduction being controlled by information supplied from said processor of said unmodulated pilot carrier waves and said any carrier waves modulated by TPS;

apparatus for decoding said TRS additional FEC coding conveyed by said selectively reproduced 188-byte IPE packets to reproduce said IP digital information; and a data packet selector for selectively reproducing IP digital information decoded by said apparatus for decoding said TRS additional FEC coding or selectively reproduced by said separator from 188-byte packets without MPE-FEC coding, selective reproduction by said data packet selector being controlled by information supplied from said processor of said unmodulated pilot carrier waves and said any carrier waves modulated by TPS.

* * * * *